(12) United States Patent
Bärtschi et al.

(10) Patent No.: US 12,042,348 B2
(45) Date of Patent: *Jul. 23, 2024

(54) ELECTRICAL APPLIANCE FOR PERSONAL CARE

(71) Applicant: TRISA HOLDING AG, Triengen (CH)

(72) Inventors: Armin Bärtschi, Winznau (CH); Herbert Fischer, Reitnau (CH); Michael Schär, Egolzwil (CH)

(73) Assignee: TRISA HOLDING AG, Triengen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/870,948

(22) Filed: Jul. 22, 2022

(65) Prior Publication Data

US 2022/0354627 A1 Nov. 10, 2022

Related U.S. Application Data

(63) Continuation of application No. 16/859,418, filed on Apr. 27, 2020, now Pat. No. 11,426,265, which is a (Continued)

(30) Foreign Application Priority Data

May 4, 2015 (EP) .................................... 15166214

(51) Int. Cl.
*A61C 17/34* (2006.01)
*A45D 29/05* (2006.01)
(Continued)

(52) U.S. Cl.
CPC .......... *A61C 17/3481* (2013.01); *A45D 29/05* (2013.01); *A45D 29/14* (2013.01);
(Continued)

(58) Field of Classification Search
CPC ..... A61C 17/3481; A61C 17/16; A61C 17/32; A45D 29/05; A45D 29/14; A45D 29/17;
(Continued)

(56) References Cited

U.S. PATENT DOCUMENTS 3,088,148 A 5/1963 Moret
3,369,265 A 2/1968 Halberstadt et al.
(Continued)

FOREIGN PATENT DOCUMENTS

DE 1 204 187 B 11/1965
DE 1 632 389 A1 11/1970
(Continued)

OTHER PUBLICATIONS

Sep. 13, 2016 International Search Report issued in International Patent Application No. PCT/EP2016/058792.
(Continued)

*Primary Examiner* — Nicholas D Lucchesi
(74) *Attorney, Agent, or Firm* — Oliff PLC

(57) ABSTRACT

An electrical appliance for personal care includes a handle with a longitudinal axis, and a plug-on part which can be attached to the handle, wherein a vibration unit having an electric motor and an eccentric element is arranged in the handle, wherein a plug-like coupling structure protrudes from the handle, which plug-like coupling structure forms an interface with a substantially mirror-inverted socket-like coupling structure of the plug-on part, wherein the interface has at least two stages with different circumferential geometry, wherein at least one of the stages has a rotation-preventing device between the handle and the plug-on part, and wherein a stop surface of the handle for the plug-on part extends obliquely with respect to the longitudinal axis of the handle.

38 Claims, 23 Drawing Sheets

Related U.S. Application Data continuation of application No. 15/571,780, filed as application No. PCT/EP2016/058792 on Apr. 20, 2016, now Pat. No. 10,667,892.

(51) Int. Cl.

| | | |
|---|---|---|
| A45D 29/14 | (2006.01) | |
| A45D 29/17 | (2006.01) | |
| A45D 40/26 | (2006.01) | |
| A46B 5/00 | (2006.01) | |
| A46B 9/02 | (2006.01) | |
| A46B 9/04 | (2006.01) | |
| A46B 9/06 | (2006.01) | |
| A46B 13/00 | (2006.01) | |
| A46B 13/02 | (2006.01) | |
| A47K 7/04 | (2006.01) | |
| A61C 15/04 | (2006.01) | |
| A61C 17/16 | (2006.01) | |
| A61C 17/32 | (2006.01) | |
| B26B 21/38 | (2006.01) | |
| A61C 15/00 | (2006.01) | |

(52) U.S. Cl.
CPC .......... *A45D 29/17* (2013.01); *A45D 40/262* (2013.01); *A46B 5/0095* (2013.01); *A46B 9/026* (2013.01); *A46B 9/028* (2013.01); *A46B 9/04* (2013.01); *A46B 9/06* (2013.01); *A46B 13/008* (2013.01); *A46B 13/023* (2013.01); *A47K 7/04* (2013.01); *A61C 15/047* (2013.01); *A61C 15/048* (2013.01); *A61C 17/16* (2013.01); *A61C 17/32* (2013.01); *B26B 21/38* (2013.01); *A46B 2200/1053* (2013.01); *A46B 2200/1066* (2013.01); *A46B 2200/108* (2013.01); *A61C 15/00* (2013.01)

(58) Field of Classification Search
CPC .... A45D 40/262; A46B 5/0095; A46B 9/026; A46B 9/028; A46B 9/04; A46B 9/06; A46B 13/008; A46B 13/023
See application file for complete search history.

(56) References Cited

U.S. PATENT DOCUMENTS

| | | | |
|---|---|---|---|
| 3,685,080 A | 8/1972 | Hubner | |
| 5,365,627 A | 11/1994 | Jousson et al. | |
| 5,617,601 A | 4/1997 | McDougall | |
| 6,829,801 B2* | 12/2004 | Schutz | A61C 17/349 15/28 |
| 7,690,067 B2* | 4/2010 | Schaefer | A61C 17/22 15/22.1 |
| 8,089,227 B2 | 1/2012 | Baertschi et al. | |
| 8,225,449 B2 | 7/2012 | Gatzemeyer et al. | |
| 8,398,326 B2 | 3/2013 | Jimenez et al. | |
| 8,793,829 B2* | 8/2014 | Shimoyama | A46B 13/023 433/118 |
| 9,084,659 B2* | 7/2015 | Bovenkamp | F16H 23/00 |
| 2004/0060138 A1 | 4/2004 | Pfenniger et al. | |
| 2005/0172493 A1 | 8/2005 | Fischer et al. | |
| 2006/0168745 A1* | 8/2006 | Kobayashi | A61C 17/3445 15/22.1 |
| 2009/0183324 A1 | 7/2009 | Fischer et al. | |
| 2010/0263148 A1 | 10/2010 | Jimenez et al. | |
| 2015/0034113 A1 | 2/2015 | Yamagishi et al. | |
| 2015/0182415 A1 | 7/2015 | Olkowski et al. | |
| 2015/0305487 A1 | 10/2015 | Pardo et al. | |
| 2015/0305973 A1 | 10/2015 | Owen et al. | |
| 2017/0151044 A1 | 6/2017 | Okai | |
| 2019/0014901 A1 | 1/2019 | Xi et al. | |

FOREIGN PATENT DOCUMENTS

| | | |
|---|---|---|
| DE | 22 48 162 A1 | 4/1974 |
| EP | 2 218 559 A1 | 8/2010 |
| EP | 2 517 667 A1 | 10/2012 |
| EP | 2 517 668 A1 | 10/2012 |
| JP | S64-004222 A | 1/1989 |
| WO | 2002/054906 A1 | 7/2002 |
| WO | 2005/077616 A1 | 8/2005 |
| WO | 2008/130246 A1 | 10/2008 |
| WO | 2011/073848 A1 | 6/2011 |
| WO | 2013/009361 A1 | 1/2013 |
| WO | 2013/132363 A1 | 9/2013 |

OTHER PUBLICATIONS

Sep. 13, 2016 Written Opinion issued in International Patent Application No. PCT/EP2016/058792.

Aug. 2, 2019 partial European Search Report issued in European Patent Application No. 19165630.

* cited by examiner

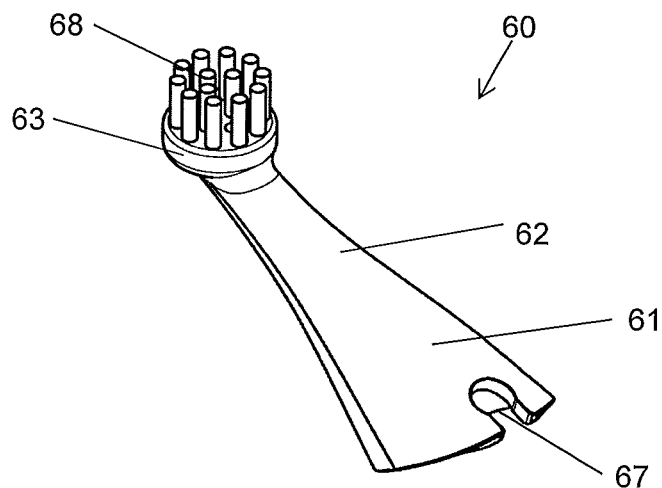
Fig 18a
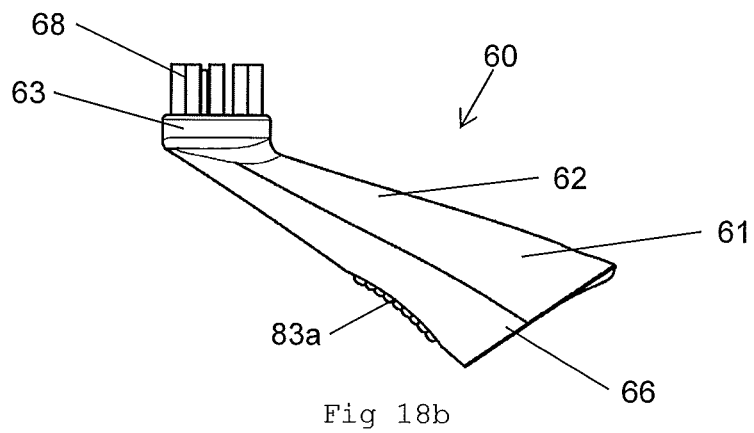
Fig 18b
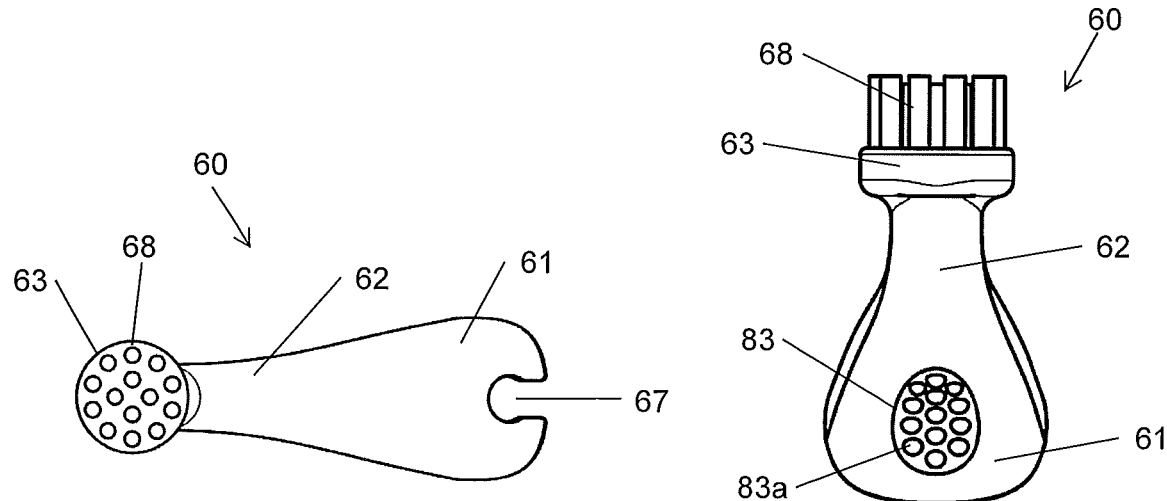
Fig 18c
Fig 18d

ELECTRICAL APPLIANCE FOR PERSONAL CARE

This application is a Continuation of U.S. application Ser. No. 16/859,418 filed on Apr. 27, 2020, which is a Continuation of U.S. application Ser. No. 15/571,780 filed on Nov. 3, 2017, which is the U.S. National Phase of PCT/EP2016/058792 filed Apr. 20, 2016, which claims the benefit of European Patent Application No. 15166214.5 filed on May 4, 2015 with the European Patent Office, the disclosure of which is incorporated herein by reference.

The invention relates to an electrical appliance for personal care, comprising a handle with a longitudinal axis $A_G$, and a plug-on part which can be attached to the handle, wherein a vibration unit having an electric motor and an eccentric element is arranged in the handle, and wherein a plug-like coupling structure protrudes from the handle, which plug-like coupling structure forms an interface with a corresponding socket-like coupling structure of the plug-on part. The invention also relates to the handle itself, the interface or coupling structure, and also various types of plug-on parts themselves.

U.S. Pat. No. 5,365,627 discloses an oral hygiene appliance with a handle and with an automatic stem insertion system. On the drive motor shaft, the oral hygiene appliance has a pair of key-like elevations. A bore in the stem receives the shaft, and slots in the stem receive the key-like elevations. Two sleeves on the stem have a ramp-like structure, in order to receive the key-like elevations and to engage with the latter. When the stem is coupled to the handle, the key-like elevations are inserted into the slots by means of a sliding movement of the key-like elevations onto the ramps. A radially outwardly extending flange is arranged on the base of the shaft and is received by a pair of flexible arms which protrude from the base of the stem and which each have a recess. When the stem is coupled to the handle, the flange comes into engagement with the flexible arms and bends these apart from each other, and, upon a further movement of the stem in the direction of the handle, the flange snaps into the recesses of the arms. As the flange is pulled away from the handle, the flange has the effect that the flexible arms bend apart from each other again in order to release the flange from their recesses.

Further coupling structures for a handle and corresponding plug-on brushes of an electric toothbrush are known from U.S. Pat. No. 3,088,148, WO 2011/073848 A1 and U.S. Pat. No. 3,369,265.

Electric toothbrushes in which the vibration drive in the handle is arranged in different positions with respect to the coupling or interface between the handle and the plug-on brush are known from WO 2008/130246 A1, DE 1 632 389 and U.S. Pat. No. 3,685,080.

The object of the present invention is to make available a universally usable electrical appliance for a very wide variety of uses in personal care, which appliance efficiently ensures a simple and secure mounting and firm hold of the respective plug-on parts and, in addition, ensures an effective transmission of the vibration from the handle to the plug-on part.

According to the invention, this object is achieved by an electrical appliance for personal care, comprising a handle with a longitudinal axis $A_G$, and a plug-on part which can be attached to the handle, wherein a vibration unit having an electric motor and an eccentric element is arranged in the handle, wherein a plug-like coupling structure protrudes from the handle, which plug-like coupling structure forms an interface with a substantially mirror-inverted socket-like coupling structure of the plug-on part, wherein the interface has at least two stages with different circumferential geometry, wherein at least one of the stages comprises a rotation-preventing means or a means for preventing rotation between the handle and the plug-on part, and wherein a stop surface of the handle for the plug-on part extends obliquely with respect to the longitudinal axis $A_G$ of the handle; and, in a first alternative solution, by an electrical appliance for personal care, comprising a handle with a longitudinal axis $A_G$, and a plug-on part which can be attached to the handle, wherein a vibration unit having an electric motor and an eccentric element is arranged in the handle, wherein a plug-like coupling structure protrudes from the handle and forms an interface with a substantially mirror-inverted socket-like coupling structure of the plug-on part, wherein the interface has at least two stages with different circumferential geometry, wherein a stop surface between the handle and the plug-on part extends obliquely with respect to the longitudinal axis $A_G$ of the handle, and wherein the handle has a cam which cooperates with a mirror-inverted recess of the plug-on part in the manner of a snap-fit connection; and, in a second alternative solution, by an electrical appliance for personal care, comprising a handle with a longitudinal axis $A_G$, and a plug-on part) which can be attached to the handle, wherein a vibration unit having an electric motor and an eccentric element is arranged in the handle, wherein a plug-like coupling structure protrudes from the handle, which plug-like coupling structure forms an interface with a substantially mirror-inverted socket-like coupling structure of the plug-on part, wherein the interface has at least two stages with different circumferential geometry, wherein at least one of the stages comprises a rotation-preventing means between the handle and the plug-on part, wherein the electric motor is arranged in the region of the interface, and wherein the rotation axis $A_M$ of the electric motor and the longitudinal axis $A_G$ of the handle enclose an angle $\beta$ of between 3° and 20°, particularly preferably of between 7° and 13°.

In a preferred embodiment of the present invention, the stop surface and the longitudinal axis $A_G$ of the handle enclose an angle $\alpha$ of between 30° and 70°, preferably of between 45° and 55°. By virtue of the thus beveled stop surface, the contact surface available for the coupling between the plug-like coupling structure and the mirror-inverted socket-like coupling structure can be increased (in other words, the contact surface of the interface as such is greater than in the case of a conventional perpendicular configuration). This is desirable in respect of reliable guiding of the plug-on part and in respect of an improved, i.e. higher, pull-off weight.

In another preferred embodiment of the present invention, the dimension from the stop surface to the rear end of the handle is greater on the front face than on the rear face, such that the stop surface extends from the front rearward. This type of configuration has proven advantageous during handling.

The front face is generally also the face of the handle, or of the electrical appliance, on which the thumb is placed during actuation (e.g. for switching on and off). The front face is generally also the face toward which, if appropriate, the bristle zone of a plug-on brush is directed. The rear face is accordingly the face lying 180° opposite.

In another preferred embodiment of the present invention, the stop surface of the handle and the rotation axis $A_M$, preferably inclined with respect to the longitudinal axis $A_G$ of the handle, of the electric motor enclose an angle $\varphi$ of between 35° and 90°, preferably of between 50° and 70°. In this way, the vibration unit, which according to the invention has an electric motor with an eccentric element, can be brought particularly effectively into the region of the interface, preferably into the proximity of the base region of the plug-like coupling structure.

In another preferred embodiment of the present invention, the plug-like coupling structure of the handle and the mirror-inverted socket-like coupling structure of the plug-on part allow straight plugging-on, wherein preferably the longitudinal axis $A_X$ of the plug-like coupling structure is offset parallel to the longitudinal axis $A_G$ of the handle. This configuration has proven particularly advantageous for the handling.

In the region of the plug-like coupling structure, the handle preferably has a cam which interacts with a mirror-inverted recess of the plug-on part in the manner of a snap-fit connection.

Definition of Terms

Handle—is defined as a ready-to-use part consisting of hand part and closure cap and interior;
Hand part—is defined as hand body with interior;
Hand body—is defined as injection-molded part consisting of base body (bodies) and encapsulation body (bodies).

In another preferred embodiment of the present invention, the material from which the hand body or the base body of the hand body (and in particular also the cam) is formed is harder than the material from which the plug-on part or the base body of the plug-on part (and in particular also the recess) is formed. Generally, preference is given in each case to polypropylene materials with different modulus of elasticity (a lower modulus of elasticity in each case gives a softer material). The reason why the material of the plug-on part or of the base body of the plug-on part is chosen to be softer than that of the hand body or of the base body of the hand body lies in the desired longevity of the snap connection: on account of the softer material, the plug-on part or the base body of the plug-on part generates less wear on the cam and, generally, on the entire plug-like coupling structure.

Generally, the frictional forces between the wall of the plug-on part and the surface of the interface or the plug-like coupling structure can thus be kept to a minimum, and the wear caused by the exchange preferably takes place on the base body of the plug-on part.

The plug-like coupling structure of the handle can preferably have a slight distortion, such that the pull-off weight of the snap-fit connection can be increased.

The base body of the hand body is preferably formed from a hard component, namely Total PPH 5042 from Total SA (Total is a trademark of Total SA) or Moplen HP548L from LyondellBasell Industries Holdings B.V. (Moplen is a trademark of LyondellBasell Industries Holdings B.V.), and the hard component of the base body of the plug-on part is preferably formed from PP Tipplen R359 from TVK plc (Tipplen is a trademark of TVK plc.).

The modulus of elasticity of the hard component of the base body of the hand body is between 1300 MPa and 2500 MPa, preferably between 1300 MPa and 1800 MPa. The modulus of elasticity of the hard component of the base body of the plug-on part is between 700 MPa and 1500 MPa, preferably between 900 MPa and 1250 MPa.

In another preferred embodiment of the present invention, the cam in the plug-like coupling structure is tree-shaped, preferably with a straight trunk and a circular crown. In this way, it is possible to provide a particularly effective snap-fit connection to the mirror-inverted recess.

The straight trunk preferably has a width of 2 mm to 4 mm, preferably of 2.5 mm to 3.5 mm. The circular crown preferably has a diameter of 2 mm to 5 mm, preferably of 3 mm to 4.5 mm.

The total length of the cam from its starting point is preferably 4 mm to 7 mm, particularly preferably 5 mm to 6 mm. The distance of the circle midpoint (crown) from the starting point of the cam is preferably 2 mm to 6 mm, preferably 3 mm to 4 mm. The height of the cam (or the offset of the cam from the rest of the surface of the third stage) is preferably from 1 mm to 3 mm, particularly preferably from 1.5 mm to 2.5 mm.

The recess on the plug-on part is mirror-inverted with respect to the cam and preferably has tolerances, with respect to the cam, of 0 mm to 0.4 mm, preferably of 0.15 mm to 0.25 mm. This is advantageous in terms of the desired longevity of the snap-fit connection. More preferably, the cam-matching recess on the plug-on part has in its continuation (i.e. seen in the longitudinal direction of the cam-matching recess toward the free end of the plug-on part) a slit, which further serves to adjust the desired holding strength or the pull-off weight. The length of the slit (i.e. without the cam-matching recess) is 1 mm to 8 mm, preferably 1 mm to 5 mm.

By virtue of the geometric configuration of the cam and of the recess and also by virtue of the corresponding choice of material, it is possible to achieve a pull-off weight of the order of 2 kg to 6 kg, preferably of 2 kg to 4 kg.

The vibration unit with the electric motor and with the eccentric element is preferably arranged in the region of the interface, wherein the rotation axis $A_M$ of the electric motor and the longitudinal axis $A_G$ of the handle enclose an angle $\beta$ of between 3° and 20°. In particular, seen in cross section, the eccentric element protrudes into a front region of the handle, which is in any case partially surrounded by the mouth of the plug-on part. Together with the angle $\beta$, it is thus possible to achieve a particularly efficient transmission of vibrations.

In another preferred embodiment of the present invention, the rotation axis $A_M$ of the electric motor and the longitudinal axis $A_G$ of the handle enclose an angle $\beta$ of between 7° and 13°. In this way, the efficiency of the transmission of vibrations can be further enhanced.

In another preferred embodiment of the present invention, the electric motor is arranged on a carrier element, which is preferably formed from a plastic material. The eccentric element in this case preferably extends over the front edge of the carrier element in order to permit an unimpeded transmission of vibrations.

In another preferred embodiment of the present invention, the electric motor is held in the carrier element by clamping, preferably by lateral clamping on both sides above its rotation axis $A_M$. The electric motor does not have to be clamped over the entire length; the clamping is preferably effected in the rear region of the electric motor at the cable attachment. In this way, the electric motor can be snapped particularly easily into the carrier element or fixed in the carrier element.

In another preferred embodiment of the present invention, the carrier element has a stop (called the front motor stop) for the front end of the electric motor and a stop (called the rear motor stop) for the rear end of the electric motor, wherein both stops preferably end heightwise below the rotation axis $A_M$ of the electric motor.

In this way, a secure hold for the electric motor can be ensured, and the attachment of the cables is not impeded, nor the rotation axis $A_M$ with the eccentric element. The eccentric element preferably protrudes past the front motor stop of the carrier element, thereby ensuring interference-free operation.

As an alternative to the electric motor with an eccentric element bearing directly on the electric motor (as described above), it is also possible to configure the electric motor with an extended and, if need be, flexible axle and to arrange the eccentric element a distance away from the electric motor. In this way, the eccentric element can be introduced farther forward into the coupling structure, since the motor volume does not have to be accommodated directly adjacent.

A flexible axle is understood as an axle which, starting from the motor, continues in a curve toward the eccentric element, i.e. the eccentric element does not lie on a straight line with the motor axle. The flexibility of the axle still permits the rotation movement.

The extended axle can be constructed in one part or in several parts. It can, on the one hand, continue in one piece from the rotation axis $A_M$ of the motor and, on the other hand however, can also be arranged on the rotation axis $A_M$ of the motor.

The extended axle may in itself be insufficiently stable and may be unable to hold the moving eccentric element in a stable position. It may thus be necessary to support the axle. The support can be effected, for example, downstream from the eccentric element as seen from the direction of the motor, by the axle protruding past the eccentric element and being introduced into a socket and thus held in position and guided/mounted.

There is also the possibility of guiding the axle between the motor and the eccentric element. In this case, the guide can be configured such that the axle is driven in, or the guide can be configured such that the axle bears thereon.

The socket is preferably formed in the base body of the hand part and is made of the same material as the base body. However, the socket can also be equipped with supporting/bearing means, for example with metal bushings or ball bearings. These means can be mounted after the injection molding or can be inserted directly into the injection-molding tool and encapsulated.

Preferred Areas of Use

The present invention is preferably used in products for personal care, for example for oral hygiene, shaving or hair removal, care of the scalp, face cleansing and face care, cosmetics and make-up, skin tightening and skin massage, hair care, care of the fingers and feet (manicure and pedicure), etc.

For oral hygiene, uses as a manual toothbrush are preferably provided (here in particular in the form of non-motorized disposable toothbrush, since the coupling structure and the interface can also be used for manual, non-motorized applications). The handle can be used over a long period of time, and it is only the plug-on brush that is replaced.

However, the present invention will particularly preferably be used for electric toothbrushes, in particular for vibrating/sonic toothbrushes.

Other preferred uses in oral hygiene are interdental brushes, interdental cleaning products or tongue cleaners.

In cosmetics, preferred uses are for the application of cosmetic media in a liquid or solid state, e.g. as a mascara brush, a nail varnish brush, and for application or removal of make-up, etc.

A further use is for hair removal by a wet razor or by other suitable means.

Other preferred uses are for face cleansing or face care, foot care (pedicure) and hand care (manicure), in particular nail cleaning and nail care, and removal of hard skin.

Preferred Production

The hand body according to the invention and the plug-on part or base body according to the invention and the encapsulation body of the plug-on part are preferably produced by injection molding in an injection molding tool.

The hand body is preferably produced in a two-station, three-station or multi-station tool (e.g. a helicopter tool). First, the hard component is injected and the base body thus created, after which one or two soft components, each called encapsulation bodies, are injected onto the base body (in the same injection molding procedure), and, finally, the finished hand body is removed in the closed state from the injection molding tool. Certain components in the base body or also the encapsulation bodies can be configured using lateral slides (openings, recesses, etc.). In this case, the injection molding of several soft components in the same step requires a special geometry of the corresponding part, the requirement being that the soft components form explicitly separate volumes or zones and do not directly adjoin each other.

The plug-on parts or plug-on brushes are preferably produced by one-component injection molding (preferably from a hard component). However, it is also possible to produce the plug-on parts by multi-component injection molding and thus use one or more hard and/or soft components and thereby create the base body and several encapsulation bodies.

The plug-on brushes are provided with bristles preferably by anchor-free tufting (AFT), by conventional anchor punching, by in-mold tufting (IMT), by integrated anchor-less production (IAP), or else by the injection of bristles or cleaning elements.

Overall, a small, light and easy-to-handle rod-shaped appliance for personal care and cosmetic applications is created according to the invention. This allows easy transport (for example in a make-up case) and precise application/use.

The volume of the handle (including the closure cap) is between 75 cm$^3$ and 150 cm$^3$.

The weight of the handle is approximately 35 g to 50 g, preferably 40 g to 47 g.

The weight of the plug-on parts is approximately 5 g to 25 g, preferably 7 g to 15 g.

A further embodiment of the invention comprises:

A handle for an electrical appliance for personal care, onto which handle a plug-on part can be mounted, and which handle has a longitudinal axis $A_G$, wherein a vibration unit having an electric motor and an eccentric element is arranged in the handle, wherein a plug-like coupling structure projects from the handle, which plug-like coupling structure which has at least two stages with different circumferential geometry, and which forms the handle-side part for an interface with a mirror-inverted socket-like coupling structure of a plug-on part.

The hand body according to the invention for the handle is preferably formed by injection molding from three material components, i.e. preferably one hard component and two soft components.

The first component is preferably the hard component. The hard component forms the base body of the hand body, which comprises the handle-side, plug-like coupling structure for the interface with the plug-on brush and a corresponding closure structure for the closure cap, which regularly closes the handle. Furthermore, the soft components are applied as encapsulation bodies to the base body. Moreover, the base body preferably encloses the interior of the hand body.

Moreover, the base body preferably has one or more flat spots so that the handle is able to lie in a stable position, and it preferably also has a preferably free position for a vent hole (i.e. the vent hole is not covered in the rest position when the base body is resting with the flat spots on a flat surface).

The vent hole defines a passage through hard and/or soft components from the environment (the exterior) into the interior of the handle or of the hand part/hand body. It is preferably closed by a vent membrane, wherein the vent membrane is applied to the inner face, i.e. in the interior of the hand body. The housing is in this way tightly closed such that no water or dust gets in, and only a gas exchange with the interior takes place. The vent membrane is affixed to the cylindrical inner face of the cavity with an application pin.

The purpose of the vent hole is to make available an overpressure valve and to permit removal of gas from the interior, e.g. gas from an accumulator or a battery.

The injection point for the hard component of the hand body is located on the front face, in the direction of the plug-on part as seen from the thumb grip.

An injection-molded soft component of the hand body preferably forms the switch portion, which represents the functional transition from the inside to the outside. Directly under the switch portion, the switch itself is preferably mounted on a printed circuit board. For this reason, the soft component can be provided with an on/off switch symbol.

The injection point for the first soft component of the hand body is preferably on the front face of the hand body or base body, in the region of the switch portion. The first soft component preferably covers the injection point of the hard component and lies over it.

The second soft component of the hand body preferably serves for coloring of the front portion, for branding (imprint), and also for grippability of the handle. Beside the base body of hard component and of the first soft component, it can bring a further color to the body. The injection point preferably lies on the front face of the hand body or base body, underneath the switch portion. The first soft component forms, with one zone, an island inside the second soft component.

The soft components are generally intended to provide a good hold or a non-slip surface. In addition, the soft components damp the vibrations.

In the front part of the handle, a zone of soft material is applied to each of the front face and the rear face of the appliance, allowing the user to hold the appliance like a rod-shaped writing implement. At least one of the zones is preferably slightly concave. The two zones are preferably produced from the same soft material in one work step.

The eccentric element, which generates the vibrations, is preferably not located between said zones of soft material.

With the closure cap fitted, the length of the handle as far as the end of the interface or of the plug-like coupling structure is preferably 130 mm to 190 mm, particularly preferably 160 mm to 175 mm; without the fitted closure cap, i.e. in the form of the hand part, the length as far as the interface or the plug-like coupling structure is 120 mm to 170 mm, preferably 145 mm to 151 mm.

The handle preferably has a more or less round configuration in cross section, somewhat higher than it is wide, i.e. it usually has a greater vertical extent. Moreover, the handle is preferably waisted in the longitudinal direction. The free end (with respect to the coupling structure for the plug-on part) is generally the widest. The narrowed waist is preferably provided between the free end and the thumb grip or the switch portion. The region of the switch portion or the transition to the neck is preferably the second widest location. This narrowed waist likewise allows the user to hold the appliance like a rod-shaped writing implement and guide it with precision.

The width of the handle is 12 mm to 25 mm, at the widest location preferably 19 to 23 mm, and preferably 12 to 15 mm at the narrowest location.

The height of the handle is 14 mm to 30 mm, at the highest location preferably 20 mm to 25 mm, and preferably 15 mm to 20 mm at the location of least height.

A carrier element is preferably arranged inside the handle or the hand part and serves as a framework for the interior of the handle or of the hand part.

In the design of the carrier element, a distinction is made in principle between a rechargeable accumulator version and a disposable battery version, which versions partly differ in terms of their components, their arrangement and properties.

In the accumulator version and also in the battery version, however, an electric motor with an eccentric element is first of all provided as vibration unit, wherein the electric motor drives the eccentric element and the eccentric element is mounted on the rotation axis $A_M$ (or continuation thereof) of the electric motor such that a vibration is generated (other vibration generators are conceivable).

In the accumulator version, the electric motor preferably has a voltage (in the charged state) of approximately 1.2-1.3 V, a current consumption with eccentric element of 50 mA-600 mA, preferably 200-500 mA, and a speed of 3000 rpm to 16000 rpm, particularly preferably of 13500 rpm.

In the battery version, the electric motor preferably has a voltage of 1.5 V, a current strength of 50 mA-600 mA, preferably 200-500 mA, and preferably a speed of 5000 rpm to 16000 rpm, particularly preferably of 13000 rpm.

If the hand part is directed to a face brush, the appliance is preferably configured as an accumulator version, although a battery version is not ruled out. The speed is from 5000 rpm to 16000 rpm, particularly preferably from 9000 rpm to 11000 rpm.

If the hand part is directed to a use as a nail tool, the appliance is preferably configured as a battery version, although an accumulator version is not ruled out. The speed is preferably from 5000 rpm to 12000 rpm, particularly preferably from 7500 rpm to 9000 rpm.

Both electric motor versions preferably have a cylindrical shape and a length of 13 mm to 20 mm, preferably of 15 mm to 17 mm, and preferably have a diameter of 5 mm to 10 mm, preferably of 6 mm to 7 mm.

The eccentric element is preferably semicylindrical or mushroom-shaped and plugged onto the electric motor shaft. It has a length of 2 mm to 6 mm, preferably of 3 mm to 5 mm. Its diameter is 4 mm to 8 mm, preferably 5 mm to 7 mm. The weight of the eccentric element is between 0.5 g and 5 g, preferably between 0.8 g and 1.5 g. The electric motor shaft can be extended in one piece or in several pieces such that the eccentric element protrudes farther into the coupling structure. The eccentric element can thus be at a distance of 2 mm to 30 mm from the electric motor. The axle can be mounted at the free end inside the coupling structure.

In the mounted state, the electric motor and the eccentric element are arranged in the region of the plug-like coupling structure and thus represent the frontmost functional element in the interior of the handle/hand part and also on the carrier element.

The electric motor or at least the eccentric element preferably lies during use in front of the holding location of the handle, which location is defined by thumb and index finger. The thumb lies in the region of the on/off switch symbol, and the index finger lies on a soft component surface of the rear face. Thumb and index finger can also be placed the other way round depending on the application. Both locations allow the appliance to be held in the manner of a rod-shaped writing implement.

The rotation axis $A_M$ of the electric motor, or the axis of the eccentric element, is preferably arranged at an angle to the longitudinal axis $A_G$ of the handle and preferably also at an angle to the carrier element. This means that the direction of insertion R of the carrier element does not correspond to the direction of the rotation axis $A_M$ of the electric motor.

The electric motor is preferably held on the carrier element from both side by means of clamping elements. The clamping elements are preferably webs which are directed inward on the side walls of the guide and which securely clamp the electric motor above the rotation axis $A_M$ or into which the electric motor is snap-fitted. The front part of the carrier element and the lateral clamping elements or webs preferably have the same inclination with respect to the longitudinal axis $A_G$ of the handle as the rotation axis $A_M$ of the electric motor.

The clamping does not have to be provided along the entire length of the electric motor; it is preferably provided only in the rear part of the electric motor, for example in the region of the cable attachment.

In the longitudinal direction of the carrier element, a front motor stop and optionally also a rear motor stop are provided for the electric motor, which stops preferably each end underneath the rotation axis $A_M$ of the electric motor.

The eccentric element preferably protrudes past the carrier element and past the front motor stop in order to ensure an unimpeded operation.

For the electric motor, without attached plug-on part, the following preferred length and distance ratios apply with respect to the handle (i.e. with the closure cap fitted in place).

The electric motor (reference point is the midpoint of the structural unit composed of electric motor and eccentric element), measured from the rear end of the handle, preferably lies at approximately 75% to 90% of the total length, more preferably at approximately 81% of the total length (the total length is measured from the free end of the plug-like coupling structure to the rear end of the closure cap).

Correspondingly, the electric motor, measured from the free end of the plug-like coupling structure, preferably lies at approximately 10% to 25% of the total length, more preferably at approximately 19% of the total length.

The eccentric element itself (reference point is the midpoint of the eccentric element), measured from the rear end of the handle, preferably lies at approximately 80% to 95% of the total length, more preferably at approximately 86% of the total length of the handle (the total length is measured from the free end of the plug-like coupling structure to the rear end of the closure cap).

Correspondingly, the eccentric element, measured from the free end of the plug-like coupling structure, preferably lies at approximately 5% to 20% of the total length of the handle, more preferably at approximately 14% of the total length of the handle.

For the electric motor, with attached plug-on part, the following preferred length and distance ratios apply with respect to the handle with closure cap and attached plug-on part (e.g. a plug-on brush).

The electric motor (reference point is the midpoint of the structural unit composed of electric motor and eccentric element), measured from the rear end of the handle, preferably lies at approximately 55% to 70% of the total length, more preferably at approximately 62% of the total length (the total length is measured from the middle of the work tip of the plug-on part to the rear end of the hand part).

Correspondingly, the electric motor, measured from the middle of the work tip of the plug-on part, preferably lies at approximately 30% to 45% of the total length, more preferably at approximately 38% of the total length.

The eccentric element itself (reference point is the midpoint of the eccentric element), measured from the rear end of the handle, lies preferably at approximately 60% to 75% of the total length, more preferably at approximately 66% of the total length (the total length is measured from the middle of the work tip of the plug-on part to the rear end of the hand part).

Correspondingly, the eccentric element, measured from the middle of the work tip of the plug-on part, preferably lies at approximately 25% to 40% of the total length of the handle, more preferably at approximately 34% of the total length of the handle.

The configuration and arrangement of the switch is preferably identical in the accumulator version and in the battery version of the carrier element.

The switch preferably serves for switching the respective electrical appliance on and off and if necessary for selecting a defined program or operating mode for the respective electrical appliance. It is preferably arranged in a separate compartment (switch compartment) behind the electric motor on the carrier element.

The switch is preferably a mechanical on/off switch that functions by means of contact interruption. However, it can also be an electrical selector switch (e.g. with the modes: On-Mode 1-Mode 2-Mode X-Off). This is preferably implemented with a pulse switch and a microprocessor. The microprocessor then also defines the predefined program/mode selection. There are possibilities for different modes, for example reduced speeds (sensitive), massage (alternating speed), pulsation (motor switching on/off with pauses) or combinations of these possibilities.

The other components are designed such they are able to operate with both switch variants.

The switch preferably has dimensions in the base surface of about 6 mm×6 mm. Moreover, its height is about 10 mm in the off state and about 9 mm in the on state. This means that, in order to actuate the switch, the latter has to be moved about 1 mm.

In the mounted state, the switch is thus arranged in the switch compartment of the carrier element, wherein it is mounted in a fixed position on a printed circuit board which is arranged or locked onto the underside of the carrier element. The retention of the switch is ensured via the retention of the printed circuit board. The printed circuit board preferably has five outlets for the switch (dual switch).

In the accumulator version, the accumulator stores the energy needed for the operation of the respective electrical appliance.

The accumulator preferably has a cylindrical shape. It is 35 mm to 50 mm long, preferably 40 mm to 45 mm long. Its diameter is 8 mm to 12 mm, preferably 10 mm to 11 mm. It has a capacitance of 400 mAh to 1000 mAh, preferably 700 mAh to 900 mAh, and a voltage of 0.6 to 1.4 V, preferably 1.2 V. The size of the accumulator is preferably AAA. The accumulator is preferably a nickel-metal hydride (NiMH) battery.

In the mounted state, the accumulator is preferably connected rigidly to the printed circuit board. The printed circuit board is preferably mounted or locked onto the underside of the carrier element. The accumulator is preferably mounted on the top of the carrier element. The contact plates or soldering tags of the accumulator are guided through the printed circuit board and then suitably soldered.

To produce a connection to a mains supply and to charge the accumulator, a socket is preferably arranged at the rear end of the carrier element, which socket is exposed by removal of the closure cap.

The socket is preferably a round socket, the basic shape of which is a cylinder. The outer shape of the cylinder is rotationally symmetrical and has a circumferential projection at the socket end. The socket is preferably water-tight and corrosion-resistant, which is achieved by a suitable coating.

In order to fit it in place, the socket is pressed, preferably from the rear, and with its rear face to the front, into a hollow cylindrical socket compartment of the carrier element, until the socket abuts at the front end of the socket compartment (seen in the direction of insertion R) against a corresponding circumferential stop of the socket compartment, with the rear face of the socket preferably abutting against this front stop which preferably ends under the central longitudinal axis of the socket. On the rear face of the socket, terminals are preferably provided via which the socket is connected to the printed circuit board by means of electrical connection lines. A rotation of the socket in the hollow cylindrical socket compartment is suppressed by pressing and friction (i.e. by an interference fit and frictional engagement).

The socket has a diameter of 5 mm to 11 mm, preferably of 7 mm to 9 mm, with elevations/projections issuing from it. The projections serve to improve the anchoring in the carrier element or to prevent the socket from slipping out of the socket compartment. A projection is configured, starting from the rear face of the socket, as a ramp with an adjoining perpendicular face (falling to the original socket diameter), whereby a barb is formed. This projection is configured in the central region of the socket and has a height, from the socket diameter, of 0.1 mm to 0.8 mm, preferably of 0.25 mm to 0.5 mm. Moreover, the socket has at its end—the socket side—likewise a similarly configured projection. The latter has a height, with respect to the socket diameter, of 0.5 to 1.2 m, preferably of 0.7 mm to 0.95 mm.

The socket is mounted in the carrier element or in the socket compartment by means of the socket being pressed into the structure. The described barbs come into effect and prevent the socket from slipping out of the socket compartment. The socket compartment is slightly longer than the socket itself, such that the latter is preferably recessed by 0.2 mm to 1.5 mm, preferably 0.5 mm to 1 mm. Thus, the projection or barb can also act optimally on the socket-side end of the socket.

In the standard variant, the connection to the mains supply is configured such that a plug is inserted into the socket. This plug is connected by a cable to the power pack, which in turn is connected to the main supply, i.e. at the plug socket.

In one variant, the connection to the mains supply is achieved via a USB port (5 V). For this purpose, the connection is configured such that a plug is inserted into the socket. This plug is connected by a cable to a USB plug, which in turn is connected to a USB port. The latter can be, for example, from the PC or from a corresponding power part on the mains supply. This affords the possibility of charging by PC. This variant can also be realized with the same printed circuit board/with the same components.

In a further variant, inductive charging is provided. However, this variant has a different construction. Here, the closure cap is not intended to be removable by the user and, in addition to the handle, a (separate) charging station is required. The closure cap of the handle has a recess for the ferrite core of the charging station, and the handle is charged by being placed onto the charging station or the ferrite core thereof.

One or more LEDs can be accommodated in the hand part. By the strength of the light coming from the LEDs, it is possible for the housing to be lit through without special recesses. It may at most be necessary that the housing in this zone does not exceed a certain maximum thickness.

The LEDs are preferably mounted either between the accumulator and the front stop of the socket or in direct proximity to the switch.

By means of LEDs, various events can be visualized. Features here are On/Off, color, blink rate. It is possible, for example, to display timer functions, contact pressure, accumulator status.

A microprocessor with a timer function can be integrated in the electronics. For example for indication of a change of the treatment field (quadrant timers in the case of toothbrushes; timers for different face zones in the case of a face brush), for indication of the maximum cleaning duration, for setting an auto-off function which stops the appliance, because longer treatment is not required.

The timer can be indicated for example via said LEDs or also via the motor power.

If a microprocessor is used, a pulse switch is used instead of the mechanical on/off switch, which pulse switch sends an electrical impulse to the microprocessor.

Preferred Carrier Element for Accumulator Version

The carrier element has a basically straight configuration. The electric motor compartment is preferably located at the front end, seen in the direction of insertion R, and, on account of its beveled construction (ramp-shaped web with straight underside for oblique supporting of the electric motor and correspondingly beveled side walls with similarly obliquely arranged clamping elements (in the form of webs) for snap-fitting of the electric motor), ensures the above-described inclination of the electric motor with respect to the longitudinal axis $A_G$ of the handle (angle β).

A cable feed-through is preferably arranged behind the electric motor compartment (it is shorter in the accumulator version than in the battery version). The cable feed-through is preferably adjoined by the switch compartment (the latter is longer in the accumulator version than in the battery version, but the switch is in each case substantially at the same location; this means that it is at the same location relative to the handle, since of course it has to be operated by the switch portion).

This is preferably followed by the accumulator compartment, which is in turn adjoined by the cable feed-through. This is preferably followed by the socket compartment. Located at the end of the carrier element is the (likewise) hollow cylindrical socket terminal compartment, which however has a greater diameter than the socket compartment.

Arranged on the underside of the carrier element is the printed circuit board, which is held by a printed circuit board retainer (preferably by latching lugs on the underside of the carrier element). Provided on the outside of the socket and terminal compartment is a contact plate, the carrier element contact plate (in the direction toward the closure cap). Moreover, a seal (for example in the form of a sealing ring) is preferably provided in front of (in the direction of insertion R) and above the contact plate (i.e. the carrier element contact plate).

A difference in relation to the battery version is that the printed circuit board in the accumulator version is longer and thus forms a kind of carrier for the accumulator.

The printed circuit board preferably functions as a connection element to the various electrical components (i.e. the various connection elements and contact elements). Moreover, it serves as a carrier or retainer for some of the electrical components, in particular for the pulse switch and microprocessor and for further structural parts required for the function thereof.

Moreover, in the accumulator version, the printed circuit board is preferably rigidly connected to the electric motor by one or more cables. The switch is preferably connected directly to the printed circuit board. The accumulator is preferably connected directly to the printed circuit board, specifically via soldering tags. The socket is preferably in turn connected to the printed circuit board by one or more cables. Furthermore, the printed circuit board is rigidly connected to the contact plate of the carrier element.

In another preferred embodiment, the charging current is limited via resistors on the printed circuit board (e.g. by means of two resistors arranged in series, wherein the total resistance is divided into two serial resistances for thermal reasons).

Preferred Carrier Element for Battery Version

The electric motor with eccentric element and the switch correspond to those of the accumulator version in terms of dimensions.

The battery by means of which the energy required for operation is made available is generally in the form of a replaceable AAA battery (1.5 V). The shape of the battery is preferably cylindrical. The battery is preferably 42 mm to 43 mm long (without pole cap). The diameter is approximately 10 mm to 11 mm.

With the closure cap opened, the battery is inserted from the rear into a battery compartment of the carrier element. The cap is then mounted on the hand part and, by rotation of the closure cap, the latter is locked and, moreover, the circuit is closed.

In the mounted state, the battery is connected indirectly to the printed circuit board, specifically via a first (front) contact plate, the battery contact plate, at the first pole, and via a second (rear) contact plate, the carrier element contact plate, to the closure cap. The circuit is closed via the closure cap.

The carrier element contact plate is provided both in the accumulator version and in the battery version. In both cases, the power line between the printed circuit board and the closure cap is produced by this contact plate. On account of the shorter printed circuit board in the battery version, the carrier element contact plate of the battery version is correspondingly longer in order to create the length compensation. In the accumulator version, the carrier element contact plate is correspondingly shorter.

The carrier element preferably in turn has a basically straight configuration. The electric motor compartment is preferably located at the front end, seen in the direction of insertion R, and, on account of its beveled construction (ramp-shaped web with straight underside for oblique supporting of the electric motor and correspondingly beveled side walls with similarly obliquely arranged clamping elements (in the form of webs) for snap-fitting of the electric motor), ensures the above-described inclination of the electric motor, or of the rotation axis $A_M$ of the electric motor, with respect to the longitudinal axis $A_G$ of the handle (angle $\beta$).

Arranged behind the electric motor compartment is preferably in turn a cable feed-through (the latter is preferably longer in the battery version than in the accumulator version). The cable feed-through is preferably adjoined in turn by the switch compartment (the latter is preferably shorter in the battery version than in the accumulator version, although the switch is in each case arranged substantially at the same location).

Arranged behind the switch compartment is a contact plate compartment for the first contact plate, called the battery contact plate, which leads to a first battery pole. The contact tongue or the contact region of the battery contact plate accordingly protrudes into the adjoining battery compartment.

In contrast to the accumulator version, the carrier element is here configured such that the battery is pushed in from the rear and then guided laterally. The rear region of the battery compartment preferably has a hollow cylindrical shape. It is adjoined by a terminal compartment of slightly greater diameter. A seal does not necessarily have to be arranged on the outside of the terminal compartment, since there is less risk of contact with splashing water here.

The printed circuit board is again held on the underside of the carrier element by means of a printed circuit board retainer (e.g. latching lugs), preferably underneath or at least partially underneath the switch compartment and contact plate compartment. The second contact plate, the carrier element contact plate, to the closure cap is arranged on the outside of the terminal compartment.

In the battery version too, the printed circuit board serves as a connection element of the various electrical components, i.e. of the various connection elements and contact elements, and moreover as a carrier or retainer for some of the electrical components (but not for the battery).

In the battery version, the printed circuit board is preferably shorter. The printed circuit board is moreover rigidly connected to the electric motor (via corresponding connection cables). The printed circuit board is also preferably connected directly to the switch, the battery contact plate and the carrier element contact plate, which is lastly connected to the closure cap.

A length compensation is created in particular on the carrier element, such that the same closure cap can be used for the accumulator version and the battery version. Correspondingly, certain components on the carrier element also have to be adapted according to the design variant in order to support the length compensation.

Preferred Closure Cap

The closure cap is identical in the accumulator version and in the battery version. Its function is firstly to close off the interior. This is done by pushing it into the rear opening of the hand part and then turning it, as a result of which the circuit is closed by the contact plate of the closure cap. There is then a corresponding contact with the carrier element contact plate (on the carrier element) to the closure cap, and at the same time with a contact point of the socket (accumulator version) or with a contact point/battery pole of the battery (battery version). Moreover, by turning the closure cap, the latter is held and fixed in relation to the hand part.

For this purpose, a corresponding contact plate of the closure cap has two elements, firstly a lateral protrusion for fixing with respect to the hand part and for closing the circuit, and secondly a spring tongue for contacting the socket, or the contact element of the socket, or the battery and for closing the circuit.

This contact plate of the closure cap has a length of 11 mm to 15 mm, preferably of 12.5 mm to 13.5 mm, with a plate thickness of 0.2 mm to 0.5 mm, preferably of 0.25 mm to 0.35 mm. The plate width is such that it is not the same over the whole contact plate, since certain parts have to be wider in order to ensure the holding in the closure cap. The width of the contact plate is 2 mm to 10 mm, preferably 3 mm to 7 mm.

The holding and fixing is effected preferably by the same contact plate, the contact plate of the closure cap, as the above-described contacting (bayonet catch).

The closure cap moreover serves to seal off the interior from splashes of water and, in the mounted state, forms part of the outer surface in the rear region of the handle.

The closure cap can have a cylindrical configuration extending in the longitudinal direction of the handle and/or can have a round spherical end. Moreover, for example, notches can be provided on the outside of the closure cap, which notches, for example, improve the hold during turning.

The total length of the closure cap is 30 mm to 40 mm, preferably 33 mm to 36 mm. The length of the outside (i.e. of the part lying to the outside after fitting) is 15 mm to 20 mm, preferably 17 mm to 19 mm. The length of the inside (i.e. the part lying to the inside after fitting) is 14 mm to 20 mm, preferably 15 to 17 mm (corresponding to the length of insertion).

The external diameter of the closure cap is 18 mm to 21 mm. The diameter of the first guide, i.e. of the first part of the part lying to the inside after fitting, is 13 mm to 17 mm. The diameter of the second guide, i.e. of the second part of the part lying to the inside after fitting, is 9 mm to 12 mm.

Preferred Assembly of Carrier Element

When assembling the interior of the hand body, the ready-assembled carrier element is preferably first of all pushed into the hand body. The pushing is done from behind into the hand body in the direction of insertion R; the direction of insertion R is preferably parallel to the later longitudinal axis $A_G$ of the handle. In the battery version, a battery is then pushed (additionally thereafter) into the battery compartment of the carrier element. Thereafter, the closure cap is fitted onto the rear end of the hand part. The handle is then ready for operation.

Rotation of the carrier element inside the handle is prevented by the substantially rectangular or at least partially rectangular geometry of the carrier element (in cross section) and by suitable stops. On the rearmost circumference of the carrier element, outwardly protruding cams are preferably arranged which press against the inner face of the hand body. This has a clamping effect. In addition, the cams press at least partially into soft-component locations and thus provide clamping. Two cams are preferably provided on the front and rear respectively, i.e. preferably a total of 4 cams. Measured at their highest point, the cams protrude vertically by 0.3 mm to 0.6 mm, preferably by 0.4 mm to 0.5 mm, above the surface from which they issue. In length they form a profile, wherein the height decreases linearly to the surface from which they issue. The length of the cams (in the direction of insertion R) is 0.7 mm to 1.1 mm, preferably 0.8 mm to 1 mm. In principle, these cams can also be designated again as barbs.

The carrier element can be positioned lengthwise by stops. On the one hand, the surface of the motor bears on the base body of the hand body in the assembled state, and, on the other hand, a transition in the cross section, which likewise acts as a stop, is present at the transition from the switch compartment to the respectively adjoining compartment (at the opposite end in the direction of insertion). This transition is configured laterally to the left and right and acts only there, not over the entire circumference.

Moreover, in the accumulator version, clamping is achieved underneath the accumulator on the carrier element. Projections are formed on the carrier element and provide clamping with respect to the base body of the hand body.

Preferred Assembly of Closure Cap

For assembly, the closure cap is preferably introduced into the (rear) opening of the hand part and rotated (i.e. in order to close the circuit).

The length of insertion is approximately 14 mm to 20 mm, preferably 15 mm to 17 mm. The rotation of the closure cap is between 30° and 60°, preferably between 40° and 50°.

A rear stop surface on the base body of the hand body preferably interacts with a stop shoulder on the closure cap. The stop shoulder on the closure cap is preferably formed at the transition from the outside to the inside, that is to say at the transition from the part of the closure cap lying to the outside in the assembled state to the part of the closure cap lying to the inside.

The substantially cylindrical opening in the base body of the hand body serves as an insertion counterpart and sealing counterpart for the closure cap.

The closure cap for its part is preferably composed of a cylindrical part with an incorporated groove which is provided with a seal.

Furthermore, a stop shoulder at the rear end of the carrier element (i.e. inside the hand body) preferably interacts with a further stop shoulder in the closure cap. This stop shoulder is formed at the inserted end of the closure cap.

The rearmost cylindrical part of the carrier element has longitudinal recesses into which the contact plate of the closure cap is inserted (i.e. to form the bayonet catch).

The longitudinal recesses of the carrier element continue in the form of lateral openings in which the carrier element contact plate is inserted. Upon rotation of the closure cap, the contact between the contact plate of the closure cap and the carrier element contact plate is then produced and the circuit is thus closed.

As has been described, the functional components in the handle are powered via a rechargeable accumulator or via a replaceable battery.

In the solution with the rechargeable accumulator, the procedure for charging the accumulator is as follows. The closure cap is rotated and then pulled in order to remove it from the discharged or partially discharged appliance. The connection of a power pack connected to the mains is then effected by plugging the plug of the power pack into the socket of the hand part. Charging therefore then takes place. After the charging procedure, the plug is removed, the closure cap is fitted back in place, and the appliance or the handle is ready for operation again.

The solution with the battery is slightly different. When the battery is empty or inadequately charged, the closure cap is likewise removed. The empty battery is then taken out and replaced by another battery. The closure cap is fitted back in place, and then appliance or the handle is ready for operation again.

Preferred Embodiment of Plug-Like Coupling Structure (Handle Interface)

The handle-side part of the interface according to the invention (i.e. the plug-like coupling structure) preferably has three stages. These three stages are arranged lengthwise in succession. At least in the circumferential regions, they each have clearly defined transitions. The longitudinal axis $A_K$ of the plug-like coupling structure preferably runs parallel to the longitudinal axis $A_G$ of the handle. In principle, however, embodiments are also possible in which the two axes are collinear.

The first stage of the plug-like coupling structure preferably has a thread-in profile which is ramp-shaped in longitudinal cross section. The second and third stages preferably each have a substantially constant diameter, that is to say there is no change of diameter within the respective stage. However, the individual stages are not always round or approximately round.

The plug-like coupling structure has a specific geometry in each of the different stages. However, some geometric features continue over different stages, as is explained in detail further below.

The length of the plug-like coupling structure, measured from the free end to the starting point of the cam, is 20 mm to 40 mm, preferably 27 mm to 33 mm.

The plug-on part can be plugged onto or driven into the plug-like coupling structure according to the invention only in one position. In other words, a plug-on part cannot be plugged on incorrectly or the wrong way round.

The geometry of the first stage, with preferably two substantially round or circular sub-elements, already prevents incorrect insertion into a plug-on part. The two sub-elements have different diameters. A groove is in each case arranged laterally between the two sub-elements such that, in the frontal view, the first stage has a configuration similar to an 8-shaped configuration.

Moreover, as regards their diameter, the arrangement of the individual stages is preferably not concentric.

The arrangement corresponds (approximately) to three cylinders, which lie more or less on one surface. Seen in cross section, the following picture is obtained:

The midpoint of the succeeding stage in each case lies higher than the midpoint of the preceding stage (seen from the direction of the free end, i.e. from stage 1 to stage 3 via stage 2). The individual stages are thus oriented slightly downward or toward the rear face of the hand part. However, their undersides are not entirely on one line. Instead, there is preferably a minimal step between the individual stages.

The underside of the second stage preferably protrudes slightly past the underside of the first stage, and the underside of the third stage preferably protrudes slightly past the underside of the second stage.

Preferred Embodiment of the First Stage

As has already been mentioned, the first stage is located at the free end of the plug-like coupling structure; it therefore also represents the first stage upon insertion into the mirror-inverted plug-on part.

The first stage preferably first of all has a longitudinal guide in the form of two lateral grooves, which represent the transitions between the two sub-elements, such that, in the frontal view, the first stage has a configuration similar to an 8-shaped configuration.

The two sub-elements preferably have different diameters, wherein the upper sub-element of the first stage preferably has a greater diameter than the lower sub-element. The diameter of the sub-elements preferably remains substantially constant over the whole of the first stage. By contrast, the cross-sectional surface area preferably increases from the free end almost to the end of the first stage (and it remains constant only for a short transition region to the second stage).

Seen in the longitudinal direction, the upper sub-element therefore defines, together with the insertion bevel, a ramp-like shape (i.e. for itself and also for the first stage as a whole).

As a further component of the longitudinal guide, a preferably angular groove is formed in the top of the upper sub-element (preferably in the rear half thereof as seen in the longitudinal direction). On account of the ramp-like shape of the upper sub-element, this groove does not have the same depth everywhere. The depth increases in the direction of the second stage and preferably remains constant for a short transition region to the second stage. The bottom of the groove is at the same distance from the longitudinal axis $A_G$ of the handle along the entire length. The change of depth results from the formation of the insertion bevel.

A further stabilizing element in the form of a substantially rectangular elevation can moreover be integrated as a component of the longitudinal guide on the top of the upper sub-element, i.e. on the ramp-like shape. This elevation can serve for compensation of tolerances and can improve the clamping in the plug-on part. The shape is configured with the elevation running in the direction away from the free end. The rectangular elevation has a width of 1.5 mm to 4 m, preferably of 2 mm to 3 mm, and a length of 3 mm to 8 mm, preferably of 4 mm to 5 mm. The height of the element is between 0.1 mm and 2 mm, preferably between 0.2 mm and 1 mm.

A further groove of the longitudinal guide is provided on the underside of the first stage, or on the underside of the lower sub-element, which further groove remains constant at least over the whole of the first stage. This lower groove preferably has a round shape.

The first stage also provides an insertion bevel which, however, preferably does not extend over the whole of the first stage. As has already been explained above, a flat portion is provided in a short transition region to the second stage. This results in the first stage having the substantially 8-shaped configuration in the frontal view. The cross section of the first stage (i.e. in the frontal view) is preferably mirror-symmetrical, i.e. mirrored on the left-hand side and right-hand side in the longitudinal direction of the handle.

The diameter of the upper sub-element is 3 mm to 6 mm, preferably 4 mm to 5 mm. The diameter of the lower sub-element is 2 mm to 5 mm, preferably 3 mm to 4 mm. The spacing of the circle midpoints is 2 mm to 4 mm, preferably 2.5 mm to 3 mm.

The length of the first stage is 8 mm to 20 mm, preferably 10 mm to 15 mm. The height of the first stage, at the free end, is 2 mm to 4 mm, preferably 2.5 mm to 3.5 mm, and, toward the handle, 4 mm to 8 mm, preferably 5 mm to 7 mm.

The width of the first stage, at the free end, is 2 mm to 4 mm, preferably 2.5 mm to 3.5 mm, and, toward the handle, 3 mm to 6 mm, preferably 4 mm to 5 mm.

The geometric elements that continue between the first stage and second stage preferably firstly include the groove on the top face. In interaction with a plug-on part, it primarily serves to ensure correct insertion. A relatively large tolerance is preferably provided between a corresponding ridge of the plug-on part and the groove.

The groove on the underside also preferably continues between the first stage and second stage. It assists the correct guiding of the plug-on part. If necessary, both continuing grooves also act in the manner of a rotation-preventing means.

Preferred Embodiment of the Second Stage

The second stage of the plug-like coupling structure is arranged between the first stage and the third stage.

It preferably has a substantially round basic shape in the form of an at least approximately rectilinear cylinder. It primarily ensures longitudinal guiding of the corresponding plug-on part.

On its top face, the second stage has a groove which, as has been described above, continues from the first stage. The groove preferably also extends along the entire length of the second stage, i.e. as far as the transition from the second stage to the third stage.

The end of the groove forms a kind of stop. The groove has a depth of between 1 mm and 3.5 mm, preferably of between 2 mm and 3 mm. The groove interacts with a corresponding round ridge on the underside of the interior of the corresponding plug-on part.

The second stage also has a groove on its underside, which groove continues from the first stage. This groove also extends along the entire length of the second stage. Its depth is between 0.2 mm and 1.2 mm, preferably between 0.5 mm and 0.9 mm.

Moreover, on its outer circumference, the second stage preferably has several shallow recesses, which function in particular as vent elements. They are intended to carry off the air in the cavity when the plug-on part is plugged onto the plug-like coupling structure. These shallow recesses preferably likewise extend along the entire length of the second stage.

Two circumferential recesses are preferably formed on the left-hand side of the second stage and, preferably with mirror symmetry, two recesses are formed on the right-hand side of the second stage. However, it is also possible for more or fewer recesses to be provided at a uniform spacing.

The recesses decrease slightly in width in the direction of the third stage, for example in the manner of run-in bevel.

Corresponding circumferential projections are formed between the recesses.

The depth of the recesses preferably likewise decreases slightly in the direction of the third stage.

The width of the recesses is between 1.1 mm and 2.1 mm, preferably between 1.35 mm and 1.55 mm.

All four recesses are preferably identical in length (running out to the outer radius of the second stage).

The depth of the recesses is between 0.1 mm and 0.6 mm, preferably between 0.2 mm and 0.4 mm.

The cross-sectional shape of the second stage is generally round. At the front end or free end of the second stage, the cross section begins with a chamfer, i.e. a slightly conical beveling or rounding. The length of the chamfer is preferably approximately 2 mm.

The length of the second stage is 2 mm to 8 mm, preferably 4 mm to 6 mm. The diameter of the second stage is 5 mm to 10 mm, preferably 6.5 mm to 8.5 mm.

Preferred Embodiment of the Third Stage

Adjoining the second stage, the third stage of the plug-like coupling structure forms the rearmost stage of the coupling structure and finally adjoins the actual holding region in the handle.

In contrast to the stages mentioned above, the third stage basically has no geometric elements continuing from a preceding stage.

The third stage has a generally round basic shape, preferably in the form of a rectilinear cylinder, which again provides for longitudinal guiding. However, the third stage has an oblique end (i.e. with the handle). Since the diameter of the handle in the region of the oblique end of the third stage is greater than the diameter of the third stage (or of the aforementioned cylinder), an oblique stop surface is formed for a corresponding plug-on part. The stop surface is visible as a line in the side view.

A cam is preferably mounted on the underside of the third stage (i.e. the height of the cam is basically defined by the outside of the third stage and the outside of the hand part outside the plug-like coupling structure).

The stop surface is at an angle $\alpha$ of 30° to 70°, preferably of 45° to 55°, with respect to the longitudinal axis $A_G$ of the handle and with respect to the longitudinal axis $A_K$ of the plug-like coupling structure. The third stage, and with it the entire plug-like coupling structure (i.e. the handle-side part of the interface), is thus longer on the rear face than on the front face.

On its outer face, the third stage also has several circumferential recesses (with corresponding circumferential projections between these) which again function as vent elements (analogously to that of the second stage). Two such recesses (or projections) are again preferably provided on the right-hand side and two recesses on the left-hand side of the third stage.

The recesses (or projections) are preferably arranged with mirror symmetry (particularly preferably through 90° to each other). These recesses (or projections) are also preferably offset (in the circumferential direction) relative to the recesses (or projections) of the second stage. The recesses (or projections) each extend substantially along the entire length of the third stage.

The recesses again decrease in width in the manner of run-in bevel.

The depth of the recesses likewise decreases in the direction of the handle. The depth is 0.2 mm to ca. 0.8 mm, preferably 0.35 mm to 0.6 mm (optionally 0 mm at the run-out, i.e. close to the stop surface).

The width of the recesses is between 1.8 mm and 2.8 mm, preferably 2 mm to 2.3 mm.

The length of the recesses is different on account of the oblique stop surface. Every two recesses are identical, the lower two being longer than the upper two.

The cross-sectional shape is substantially round or substantially circular.

The length of the third stage on the top face is 2 mm to 7 mm, preferably 3 mm to 5 mm. The length of the third stage on the underside is 8 mm to 17 mm, preferably 10 mm to 15 mm. The diameter of the third stage is preferably between 7 mm to 14 mm, preferably between 9 mm and 11 mm.

The configuration of the third stage is generally such as to permit a flush termination with the outer face of the plug-on part, that is to say between handle and plug-on part. This results in a continuous surface of the outer envelope. Moreover, the third stage also serves as a support surface for taking up forces via the stop surface.

The electric motor is preferably positioned with respect to the plug-like coupling structure such that the eccentric element, seen in longitudinal section, protrudes into the third stage. The electric motor also preferably protrudes, at any rate partially, into the region of the third stage.

This is occasioned by the oblique configuration of the third stage (rear face or underside with the cam is longer than the front face or top).

The vibrations are therefore generated mainly in the region of the cam or of the snap-fit connection to the plug-on part (i.e. the eccentric element preferably lies in this region).

Arranging the motor in the region of the interface brings significant advantages in terms of the transmission of vibrations. These advantages are particularly distinct when the stop surface of the handle and the rotation axis $A_M$, inclined with respect to the longitudinal axis $A_G$ of the handle, of the electric motor enclose an angle φ of between 35° and 90°, preferably of between 50° and 70°.

The interaction of the aforementioned geometric elements on the handle with the corresponding elements on the plug-on brush affords the following advantages: An oblique stop surface is set against a straight insertion contour and insertion direction R.

In this way, the pressure that occurs or the force that arises from the use can be taken up optimally. This is based mainly on the fact that the contact surface is greater (i.e. in relation to a "straight" cylindrical structure). This results in better transmission, or more distributed surface contact, with less pressure.

Moreover, the plug-on part on the front during use (e.g. the use as a toothbrush plug-on part) is pressed into the snap fit, i.e. the force resulting from the use closes the connection mechanism. This gives a reliable connection and prevents the plug-on part from loosening or tearing away from the snap fit.

Moreover, an enlarged contact surface of this kind between the plug-on part and the handle results in much better transmission of vibrations.

For the rotation-preventing means that are provided according to the invention, corresponding elements are located at least on the first stage and the second stage and make unwanted turning or jamming practically impossible. Moreover, the elements of the rotation-preventing means are preferably combined at least in part with elements that are provided to assist insertion and, optionally, for longitudinal guiding.

The transitions between the stages also serve as rotation-preventing means, since the cross sections are not arranged concentrically.

The substantially 8-shaped cross section of the first stage (i.e. the two sub-elements of different radius), together with the grooves on the top face and on the underside, has the effect that a corresponding plug-on part can be plugged on only in one position.

Seen in longitudinal section, the third stage of the plug-like coupling structure is at least partially overlapped by a soft component (e.g. TPE) of the hand body. The cross section is thus composed at least in part of soft component. However, the cross section preferably is not composed only of soft component, but also of a combination of hard and soft components.

The soft component is preferably arranged at least on the front face of the handle. This affords advantages in cosmetic applications in particular, since the handle in these applications is not held in the same way as when using a toothbrush.

A further embodiment of the invention comprises:

A plug-on part for an electrical appliance for personal care, which plug-on part can be attached to a handle, wherein the plug-on part has a base region and a head region which are connected by a neck region, wherein the plug-on part comprises a socket-like coupling structure which has at least two stages of different circumferential geometry and which forms the plug-on part side of an interface with a mirror-inverted plug-like coupling structure of a handle.

The plug-on part according to the invention thus comprises a base region and head region which are connected by a neck region. The base region and optionally a part of the neck region comprise the socket-like coupling structure, i.e. the plug-on part side of the interface.

This is of the same design for all cases of use and all embodiments of the plug-on parts according to the invention (i.e. substantially mirror-inverted with respect to the plug-like coupling structure of the handle).

The socket-like coupling structure is formed on the inside of the plug-on parts and is preferably divided into three stages, namely a first stage (the counterpart to the third stage of the handle), a second stage (the counterpart to the second stage of the handle), and a third stage (the counterpart to the first stage of the handle). The recess for the cam of the handle is preferably formed starting from the oblique stop surface of the plug-on part.

The first stage preferably comprises circumferential recesses and circumferential projections. The recesses and projections are preferably formed symmetrically with respect to each other, wherein the projections of the first stage of the plug-on part preferably come into contact with the corresponding circumferential projections of the third stage of the handle. Accordingly, the corresponding recesses of the plug-on part likewise lie directly alongside the recesses of the hand part and, between them, they form a cavity.

To this extent, there is no (complete) mirror inversion as regards the first stage of the socket-like coupling structure and the third stage of the plug-like coupling structure.

The same also applies in respect of the second stage of the socket-like coupling structure, which again preferably has circumferential recesses and circumferential projections, wherein the circumferential projections of this second stage preferably come into contact with the circumferential projections of the second stage of the plug-like coupling structure of the handle. Accordingly, here too, the corresponding recesses of the plug-on part likewise lie directly alongside the recesses of the hand part and, between them, they form a cavity.

The cavities formed between the recesses serve to allow the air to escape when the plug-on part is fitted onto the hand part or the socket-like coupling structure is fitted onto the plug-like coupling structure.

The second stage of the socket-like coupling structure preferably has an angular ridge on the top, which ridge preferably corresponds in its configuration to the angular groove of the plug-like coupling structure. The angular ridge preferably continues from the second stage to the third stage of the socket-like coupling structure, such that it comes completely into engagement with the angular groove.

A round ridge is preferably arranged on the underside of the second stage of the socket-like coupling structure, which ridge preferably corresponds to the round groove on the underside of the lower sub-element of the first stage and second stage of the plug-like coupling structure. The round ridge also preferably continues past the third stage of the socket-like coupling structure.

The round ridge likewise serves as a guiding structure, although it can also have a technical effect. Specifically, the round ridge can provide greater strength in the case of thin-walled parts or relatively thin-walled parts such as plug-on parts.

The third stage of the socket-like coupling structure preferably has an eight-shaped opening, on each of the sides of which a tapering rib is preferably formed. The tapering ribs preferably correspond to and engage with the two grooves between the upper sub-element and the lower sub-element of the first stage of the plug-like coupling structure.

The coupling structure can also contain coupling elements or zones of soft material. These can provide a certain prestressing within the coupling. The soft material can be provided on the plug-on part and/or on the hand part.

Depending on the type of use, the neck region of the plug-on part according to the invention can be differently configured (i.e. for example in terms of length, angle, etc.), but not in terms of the interface part.

The longitudinal axis $A_A$ of the plug-on part designates the longitudinal axis of the socket-like coupling structure. This longitudinal axis lies in the base region of the plug-on part. The longitudinal axis $A_B$ of the head region lies accordingly in the head region. The angle lying between $A_A$ and $A_B$ is designated by $\Delta$.

The angle $\Delta$ is generally between 10° and 30°, particularly preferably between 15° and 25°.

The head region of the plug-on part according to the invention is in principle differently configured for each type of use.

The plug-on part can likewise have zones of soft material. These zones can simplify the haptics, damp vibrations or indicate where the plug-on part is held (for example when plugging it onto or removing it from the hand part).

The tolerances of the plug-on part according to the invention (i.e. in particular of the base region) in relation to the handle lie between 0 mm and 0.4 mm, preferably between 0.15 mm and 0.25 mm.

The plug-on part preferably has, at least for certain personal care applications, grip hollows that serve to improve its hold. These grip hollows can have zones of soft material.

The grip hollows can be formed on one or more sides (e.g. always lying opposite each other on the plug-on part; always lying opposite a functional element or the application side), in each depending on the position/arrangement of the functional elements of the head region.

The grip hollows are preferably designed as depressions with a round or oval shape (finger hollows). More preferably, the grip hollows are also provided with a structure (e.g. with knobs or lamellas, which can be made of hard and/or soft components. The grip hollow as a whole, together with its structure, can be made of hard and/or soft components.

Furthermore, it is possible to dispense with the actual hollow and to provide only a structure that improves the hold. For example, the structure can contain knobs, lamellas, etc., as base element. The shape or the cross section of the base element can be round, oval, generally n-sided, banana-shaped, etc. The height of the individual elements is between 0.2 mm and 2 mm, preferably between 0.5 mm and 1.5 mm.

Several base elements can be integrated in the structure. They can be identical or different. The arrangement can be regular or irregular.

Several surfaces separate from each other on a plug-on part can be occupied by structures, i.e. different grip positions can be realized, for example. A single such surface has a width of 4 mm to 12 mm, preferably of 6 mm to 10 mm, with a length of 5 mm to 35 mm, preferably of 8 mm to 22 mm.

Examples of use of the grip hollows would be in the cosmetics area or for hair removal for instance, where the appliance has to be guided with greater precision, or in the area of oral hygiene by interdental cleaning, where precise guiding is likewise necessary. Generally, the grip hollows are always expedient when the appliance is intended to be held like a pen or when it is intended to be maneuvered and held with particular precision.

Preferred Embodiments of Plug-on Parts

Plug-on Brushes (or Plug-on Toothbrushes)

Plug-on brushes are used in particular for cleaning the teeth.

Since, as has been described above, the base region (with the socket-like coupling structure) is the same for all embodiments, it is not described again here.

In the case of plug-on brushes, the head region and the neck region can be configured in different ways. In particular, the angles of the brush head can differ, and the brush heads themselves can differ.

Protective elements can also preferably be provided in the head region. In the case of a two-component plug-on brush, these protective elements are formed from soft component, for example, and at least partially surround the brush head in order to soften blows of the plug-on part in the mouth.

As regards the neck region, the following are preferably configured differently: the angle with respect to the longitudinal axis of the plug-on part, or the longitudinal axis of the brush head corresponding thereto, the cross section of the neck region, and the length of the neck region, i.e. the distance of the brush head from the handle.

The brush head can be variably configured for different requirements by means of different bristle application methods (see above). There are also many possible variations as regards the bristle arrangement in the bristle zone, the bristles themselves, and the size of the head. As an auxiliary part, a head shield can also be provided in order to protect against soiling during storage, e.g. in a make-up bag. This also applies to all the embodiments of plug-on parts.

Moreover, it is possible to configure the rear face of the head part with tongue-cleaning elements, for example in the form of knobs or lamella structures. With these, the tongue can likewise be cleaned during teeth cleaning or thereafter.

The length of the plug-on brushes is generally between 50 mm and 100 mm, preferably between 60 mm and 90 mm, more preferably between 70 mm and 80 mm.

Interdental Plug-on Parts

In the case of interdental plug-on parts, the direction of action is first of all varied. Depending on requirements, this can be along the longitudinal axis $A_G$ of the handle or transversely with respect to the longitudinal axis $A_G$ of the handle. The vibration has a different action depending on the direction. Here too, the plug-on part can be a two-component plug-on part with protective or cleaning elements made of soft component (cf. above).

Various functional elements come into consideration in the case of the interdental plug-on part, in particular an interdental brush. The latter can be designed as a screwed-in brush, or it can be a suitable injection molding (see WO 2014/005659 A1 for example). A toothpick (e.g. made of wood, encapsulated or mounted) can also be provided as a functional element. Furthermore, the interdental plug-on part can be a so-called flosser, i.e. a plastic part provided with a piece of dental floss. See below for description.

Flosser Plug-on Parts (or Dental Floss Plug-on Parts)

Flosser plug-on parts can have different directions of action. Depending on requirements, these can run along the longitudinal axis $A_G$ of the handle or transversely with respect to the longitudinal axis $A_G$ of the handle. Thus, depending on the direction, the vibration has a different effect and, moreover, the ergonomics of use are different.

Here too, the plug-on part can be a two-component plug-on part with protecting or cleaning elements made of soft component (cf. above).

The flosser plug-on part is designed such that a base body of the plug-on part is created that is composed of base region, neck region and head region. The so-called flosser is then mounted on the head region. For this purpose, two holding arms, preferably made of a hard component, are formed, between which a piece of an interdental cleaning element, e.g. dental floss, is tensioned.

The orientation is preferably such that the arms are oriented perpendicularly with respect to the longitudinal axis $A_G$ of the handle. Moreover, the holding arms are preferably oriented such that the interdental cleaning element tensioned between them extends parallel to the longitudinal axis. The holding arms are preferably formed in one piece with the hard component of the base body of the plug-on part. Alternatively, they can also be mounted, for example in correspondingly configured recesses in the base body.

Between the holding arms, the interdental cleaning element has a length of 15 mm to 25 mm, preferably of 17 mm to 22 mm. Measured from the surface of the head region, the holding arms have a length of 8 mm to 20 mm, preferably of 10 mm to 17 mm. This height preferably corresponds to the depth of the free region between the interdental cleaning element and the head region, measured perpendicularly with respect to the longitudinal axis $A_G$ of the handle.

The interdental cleaning element can be made of polyamide (PA), in particular PA6, PA6.6, PA6.10, PA6.12, polytetrafluoroethylene (PTFE), polyethylene (PE) or polyester. The interdental cleaning element can be coated or uncoated. Thus, the interdental cleaning element can be waxed or unwaxed. Examples of waxes are beeswax (cera alba), cera microcristallina or Vinapas® from Wacker Chemie AG.

Moreover, the interdental cleaning element can also be impregnated or have a further coating. The impregnation or coating can serve to provide taste (e.g. mint). Furthermore, the impregnation or coating can also include an active ingredient such as fluoride (sodium fluoride or ammonium fluoride) or chlorhexidine.

In addition, the interdental cleaning element can also be a volume dental floss. This is characterized by a fibrous body which, during use, expands or swells and thus becomes voluminous.

For the design of the actual functional element of the flosser plug-on part, reference is made to WO 2014/169398 A1.

For the interdental use of the plug-on parts, i.e. in the case of interdental plug-on parts and flosser plug-on parts, a further embodiment is conceivable/possible. A plug-on part can be designed which permits the alternate application of an interdental brush/interdental cleaner/flosser (see above for options). Here, a base part of the plug-on part can be designed as a reusable part, while the brush/cleaning element/flosser itself can be replaced. It is thus possible to change the brush/cleaning element/flosser more often than the base part. The base part would in this case comprise the base region, the neck region, and a head region with retention mechanism.

The replaceable part, i.e. the interdental brush/interdental cleaner/flosser can be designed such that it can also be used in principle without the base part, for example in a manual use with no electrical assistance.

Moreover, the base part can be configured such that the interdental brush/interdental cleaner/flosser can be mounted in different positions. For example, by different retaining directions of the retention mechanism.

Tongue Cleaner

Tongue cleaners are used in oral hygiene to clean the tongue. Here, a plug-on part with a tongue cleaner is provided. In the present case, the plug-on part only has the function of the tongue cleaner and is not provided with any further functions, for example a bristle zone.

The direction of action of the tongue cleaner is either along the longitudinal axis $A_G$ of the handle or transverse to the longitudinal axis $A_G$ of the handle, wherein the vibration again has a different effect depending on the direction.

In a two-component plug-on part, protective elements made of soft component can once again be provided which are arranged at least partially around the variable head and serve to damp the blows of the plug-on part in the mouth.

Moreover, the tongue cleaner is preferably equipped with cleaning elements made of one or more hard components and/or soft components. The cleaning elements can be configured, for example, in the form of lamellas or surfaces with knobs.

If lamellas are provided as cleaning elements, they can be produced from one or more components. The lamellas can be produced from a soft component, a hard component or a combination thereof. The orientation of the lamellas is preferably transverse to the longitudinal axis $A_G$ of the handle (although a lengthwise orientation is also possible).

The tongue cleaner can also be designed as a multi-piece plug-on part. The multi-piece design can be one in which part of the cleaning structure or the entire cleaning structure does not have to be replaced at the same rate as the base body/carrier, i.e. the part that provides the interface to the handle. For example, a part or all of the cleaning structure can be designed to be used just once. That is to say, the element that is provided to be used just once is repeatedly replaced, whereas the rest of the product can be used several times, i.e. has a lower replacement rate. For example, it is possible for just the base body/carrier to be kept in use over a longer time, or it is also possible for certain cleaning elements, e.g. lamellas, to be mounted on the carrier and used for longer.

Examples of elements that have a shorter duration of use are fresh strips made of degrading material (e.g. with water), i.e. elements that dissolve upon contact with water and thus release their active agent in one go. To allow these elements to be connected to the base body/carrier, they can themselves be configured such that they can be applied directly, or they can be applied to an interface portion such that the interface portion is mounted and is exchanged as a whole together with the discussed element thereon.

Face Brushes

Another type of use concerns plug-on parts in the form of face brushes. These are used in particular for facial cleansing and for massaging in creams and oils, and also generally for massaging the skin.

In particular, the neck region is somewhat shorter here than in the case of the plug-on toothbrushes, for example. The treatment head lies in practice above the interface, whereas in the plug-on toothbrushes the interface generally lies in line with the treatment head. That is to say, the bristle zone lies above the interface, and the interface protrudes at least partially below the bristle zone.

The head region is generally larger in the face brush than in the plug-on toothbrush.

Together with the shortened neck region, however, the overall product still has an easily manageable length.

The length of the face brush plug-on parts is preferably between 30 mm and 60 mm, i.e. between 30 mm and 45 mm in a small size and between 45 mm and 60 mm in a large size.

The width of the face brush plug-on parts is preferably 20 mm to 60 mm, i.e. 20 mm to 35 mm in a small size and 35 mm to 60 mm in a large size.

The outer shape of the head region is preferably roundish and can, for example, be circular, ellipsoid, tear-shaped, round, kidney-shaped or oval. Angular configurations are possible but less preferable. For example, these include n-angle shapes. The face brush plug-on parts can in principle have a plastic part as carrier, on which various materials are arranged.

The head region can be made flexible. In the base body, in the region of the bristle arrangement of the brush, elements can be formed that give the base body flexibility. The following list of options is not exhaustive:

Notches or film hinges on the top and/or underside. A thinner material connection brings a possibility of movement.

Closed recesses from the top to the underside. The recess can be designed, for example, as an enclosed slit. Thus, for example, a horseshoe-shaped portion can be formed which surrounds an inner part equipped with the interface. A flexible outer ring is thus formed.

Open recesses from the top to the underside. For example, slits which are oriented in the direction of the outer edge of the bristle zone and are then open there.

The recesses can be covered with a material film of hard material or soft material. Always on condition that flexibility is still possible.

The surface in which the bristles are introduced is preferably a flat, continuous surface. However, the surface can also have a topography, e.g. an undulating shape, a longitudinal or transverse convexity. Non-continuous forms with surface discontinuities can also be realized.

The bristle zone (bristle longitudinal axis) is mounted at an angle to the longitudinal axis of the handle. The angle between the bristle longitudinal axis and the longitudinal axis of the handle is from 30° to 90°, preferably from 50° to 70°.

The base surface of the bristle zone is arranged at an angle of 0° to 50°, preferably of 0° to 30°, with respect to the rotation axis of the eccentric element.

The longitudinal axes of the bristles are at an angle of 60° to 80°, preferably of 50° to 90°, with respect to the rotation axis of the eccentric element.

The angle adopted by the bristle zone with respect to the longitudinal axis, and thus also with respect to the handle, is such as to permit an ergonomic use. The angle allows the treatment surface (skin) to be reached without the hand touching the treatment surface.

The continuation of the interface or of the stages in the direction of the longitudinal axis of the handle leads through the bristle zone. The bristle zone (i.e. the bristles) thus lies in the continuation of the interface and covers the latter completely (viewed in the direction of the longitudinal axis).

The rear face of the plug-on brush is designed such that it protrudes past the rear surface of the plug-on brush.

The face brush plug-on part preferably has, on its rear face, a flattened region which, together with elements on the hand part, is intended to provide the support for placing the product onto a surface.

Moreover, the face brush plug-on part is designed such that its removal from the hand part is easy. This can be achieved for example by:

A narrowed waist: as is described in connection with the nail treatment attachment (nail care plug-on part).

Holding geometry by treatment element: the base surface of the bristle zone can be designed such that a good grip is possible. This can, for example, be slightly wider than the actual plug-on geometry. This results in a discontinuity of width, which as it were creates a narrowed waist, which contributes to better handling.

Zones of soft material in the narrowed waist or provided holding geometry

The flexibility in the head region has the effect that a certain part of the bristle zone is statically connected to the handle via the plug-on part, and that another part is flexible.

Between 10 and 40, preferably between 15 and 30, bristle holes/bristle tufts are accommodated on the static part. Between 30 and 70, preferably between 35 and 55, bristle holes/bristle tufts are introduced into the flexible part.

The ratio of the number of bristle holes/bristle tufts on the static part to the number of bristle holes/bristle tufts on the flexible part is preferably 25% to 75%, preferably 40% to 60%.

The surface area of the static part measures between 400 $mm^2$ and 800 $mm^2$, preferably between 500 $mm^2$ and 600 $mm^2$. The surface area of the flexible part measures between 800 $mm^2$ and 1500 $mm^2$, preferably between 1100 $mm^2$ and 1300 $mm^2$.

The flexibility of the face brush is such that a weight of 50 gram to 3000 gram is applied to the tip in order to obtain a movement.

The design of the static part is such that it has substantially the same width as the interface. Preferably the same width or wider, such that there is no contact with the rest of the body of the plug-on part during the movement arising from the flexibility.

The brush is provided with bristles preferably by providing conventional bristle holes. However, puck tufts are also conceivable (for example as in the make-up brush according to US 2015/0034113).

Fine bristles (i.e. finer bristles than in a standard toothbrush application) are preferably used, wherein the bristle diameter can be from 0.075 mm to 0.225 mm. Particularly fine bristles have a diameter of less than 0.175 mm.

In principle, the face brushes have a greater number of bristles than the toothbrushes, since the bristle diameters are much smaller, and since the brush head is larger and also has more bristle holes.

The design of the bristle zone can, for example, be such that a ring of one bristle type is placed around a zone of another bristle type. Bristle types are here understood as bristles with defined properties (color, length, diameter, material, etc.). Thus, soft bristle tufts can be arranged around hard bristle tufts.

There is also the possibility of providing injection-molded bristles for a massage head. However, these are then less suitable for massaging in creams, etc.

For certain facial applications, however, it is also possible for a face brush plug-on part (of the same shape) to be provided with a head region without bristles or bristle holes. The head region is almost identical; only the functional element on the head region is different. The plug-on part as such is produced from the materials already mentioned, with the exception of the functional element.

The head region or the functional element can be formed from metal, for example, or can have a metal covering. The metal serves in particular to cool the skin. The metal can also have a structure or a structured surface (e.g. knobs, grooves or diamond shapes) for massaging the skin.

Alternatively, the head region or the functional element can also be formed from stone or ceramic, which provides a specially pleasant sensation during cooling of the skin.

Furthermore, a face brush plug-on part with a head region without bristles or bristle holes can also be provided with a sponge as functional element, for example for applying creams.

As another alternative, a grinding attachment (possibly of slightly greater dimensions) can be provided as functional element, with which, for example, hard skin can be ground away (in particular from the feet).

In the embodiments with metal or stone as functional element, it is also possible for the head region to be heatable by means of a suitable heating element. A separate battery can be used for this purpose, or a coupling can be effected via the interface (the interface is then provided with corresponding contact elements in order to power the functional element from the direction of the hand part).

Nail Care Plug-on Part

For nail care, a nail care plug-on part or a set of nail care plug-on parts can be made available.

Corresponding plug-on parts or functional elements can be used as nail brush for polishing the varnished nails or for polishing the untreated nails (polishing brush) and also for cleaning the nails of dirt or grease, in particular under the nail margins (cleaning brush).

Moreover, grinding and polishing attachments are provided for grinding the nail margins or for grinding away nail varnish/glue/gel for extensions. A further embodiment comprises a nail varnish brush for applying nail varnish.

The neck and head region is again differently designed according to the type of use.

In the case of the nail brushes, injection-molded bristles can be provided, such that a multi-component plug-on part is obtained with a base body (preferably made of a hard component) and injection-molded bristles (preferably made of a further component). In addition, further elements can be realized as encapsulation bodies, for example made of hard and/or soft components.

Alternatively, bristles punched into the base body are also possible. In such embodiments too, the base body can be provided with further components as encapsulation bodies.

In the case of the grinding and polishing attachments, a corresponding inset (i.e. with grinding and/or polishing means) is commonly provided in the body of the plug-on part. The inset can be exchangeable, for example by means of hook-and-loop strips or adhesive strips, etc. However, it can also be fixed in the body of the plug-on part, for example by means of adhesive bonding. Alternatively, grinding or polishing means can be embedded directly in the plastic and can be processed during the injection-molding procedure.

The fastening surface of the inset with the grinding and polishing surface can be realized in the body on a plane surface or can be slightly recessed with a depression in the body. A margin can form on the surface around the inset. This margin has a width of 0.1 mm to 0.7 mm, preferably of 0.3 mm to 0.5 mm. The margin also has a height of 0.1 mm to 0.7 mm, preferably of 0.1 to 0.4 mm. These values are dictated by the tolerances of the positioning of the inset during production.

Moreover, however, the grinding and polishing surface can also occupy the entire plane surface and thus terminate only at the edge, i.e. as it were marginless.

The surface of the grinding and polishing attachments is preferably a plane, continuous surface. It has a size of 30 mm$^2$ to 1800 mm$^2$, preferably of 180 mm$^2$ to 750 mm$^2$. The length measures 10 mm to 60 mm, preferably 30 mm to 50 mm, with a width of 3 mm to 30 mm, preferably 6 mm to 15 mm.

The shape of the actual grinding and polishing surface can be any closed contour. For example, circles, ovals, n-polygons can be realized.

The grain of the grinding and polishing surface is between 100 μm and 5000 μm (grain size); the preferred grain sizes are between 150 μm and 300 μm, between 350 μm and 450 μm and between 3500 μm and 4500 μm. The grain size defines the function, with lower grain sizes resulting in a rougher grinding and polishing surface, while higher grain sizes provide a finer grinding and polishing surface.

The actual grinding and polishing surface can be configured as a plane, continuous surface. The continuity must always be present, but other continuous profiles can also be realized. For example, a concave, convex or combined crown, a concave or convex lengthwise bending, a transverse bending or an undulating shape.

The grinding and polishing surface can adopt different positions with respect to the main axis of the handle. Thus, it can be oriented in parallel or can adopt a wide variety of angles. Generally, the surface is preferably oriented toward the rear face of the hand part.

In grinding and polishing attachments, grip hollows or structures that improve the hold are in most cases integrated in the attachment. The structures are arranged on the attachment in such a way as to permit precise maneuvering. The structures that improve the hold are preferably located in the rear, i.e. behind the grinding and polishing element.

To make the plug-on part easier to fit onto and remove from the hand-held appliance, the carrier body, i.e. the base body of the plug-on part, preferably has a narrowed waist. The body can thus be easily grasped and better pulled away from the hand part. The narrowed waist is preferably configured such that, when the plug-on part is arranged on the hand part, the waist extends between the left-hand side and the right-hand side. The minimum cross section has a width of 7 mm to 15 mm, preferably of 8.5 mm to 11.5 mm. The narrowed waist is preferably rounded or has a round continuous shape.

A nail care plug-on part can have a means, preferably an edge, for pushing back the cuticle. The edge is designed as a relatively sharp edge. The edge has a useful length of at least 3 mm, preferably of at least 5 mm, and is exposed in order to allow manipulations on the nails. That is to say, the edge has to be exposed, at least at some locations, for the actual treatment to be possible.

The edge or the two surfaces leading to the edge adopt an acute angle. The angle is less than 80°, preferably less than 60°.

The edge for the cuticle treatment can be flat or profiled. For example, it can have an undulating shape to a certain extent.

On the plug-on part, the scraping edge is preferably mounted at the front free end.

In the nail varnish brush, the bristles are arranged in the longitudinal or transverse direction of the plug-on part.

The nail care plug-on parts can be designed as individual attachments or as combined attachments. In the combined attachments, the different sides of the plug-on part have different functional elements.

Mascara Brush Plug-on Part

Screwed-in or injection-molded bristles are preferably used on the mascara brush plug-on parts. The direction of action is either in the longitudinal direction of the handle or transverse to the longitudinal axis $A_G$ of the handle, wherein the vibrations have a different effect depending on the direction.

The mascara brush plug-on parts are designed similarly to the interdental plug-on parts.

Massage Brush Plug-on Parts

The massage brush plug-on parts generally have a design similar to the face brushes and have a slightly larger treatment head. They are provided for massage applications on the whole body.

Massage Roller Plug-on Parts

Massage roller plug-on parts are designed such that the plug-on part is equipped with a massage element, for example with one or more massage rollers or balls.

In principle, the rollers or balls are arranged on the plug-on part. The rollers or balls are preferably provided with a rotation axle, permitting rotation about the axis. The axle is anchored in the plug-on part and carries these elements. For ball elements, it is also possible to accommodate these in a ball guide, in the same way as in a deodorant roller.

The axle of the massage balls can adopt almost any orientation with respect to the longitudinal axis $A_G$ of the handle. The axle of the massage rollers preferably adopts a direction perpendicular to the longitudinal axis $A_G$ of the handle.

Massage rollers are preferably configured as straight cylindrical elements, frustoconical elements or conical elements. The axle is oriented such that, in the case of the cylinder, it extends parallel to the cylinder axis, preferably centrally, although the arrangement can also be eccentric. In the case of the conical/frustoconical arrangement, the axle preferably extends parallel to the height, preferably centrally, although the arrangement can also be eccentric.

The massage roller can be designed such that the application surface is not smooth and instead has elevations and/or depressions. It is also possible for the surface to be made of different materials, for example in one-component or multi-component injection molding, or from metal.

The jacket surface of the cylinder is preferably designed as the application surface. Application in this way permits rolling on the skin. It is moreover possible for the free base surface also to be designed as the application surface, in which case, in addition to the rolling application, punctiform application is also possible, or use can be made of the rotation.

Wet Razor Plug-on Parts

Finally, wet razor plug-on parts are also provided which are used for wet shaving with vibration assistance. The plug-on part is here preferably formed as a blade holder.

Here, the size of the handle according to the invention affords ergonomic advantages for older users in particular.

To change the blade, it is possible to replace the entire plug-on part (i.e. when the blade is mounted in a fixed state) or only the blade itself (i.e. when the blade is detachable). Changing the whole plug-on part affords handling advantages for older users in particular.

Sponge Plug-on Part

It is possible to create plug-on parts for beauty applications, in which a treatment element with a sponge-like structure is mounted in the head region.

The size of the sponge-like structure can depend on the actual area of application. For example, the sponge-like structures for use on the face can be very different compared to uses on the rest of the body. A smaller structure is preferably provided for use on the face.

The sponge-like structure can be made of a wide variety of materials with different pore sizes, etc.

It is also possible for the sponge-like structure in the head region to be arranged around the plug-on part. In this case, the actual base body of the plug-on part, with base region, neck region and head region, forms the carrier structure in the interior of the sponge-like structure.

In all plug-on parts, it is also possible to form flat spots that allow the handle, with attached plug-on part, to be laid down or stored in a stable position. Of course, these flats spots can or must correspond to the one or more flat spots on the handle.

Serum Applicator Plug-on Part

For cosmetics, a serum applicator plug-on part can be designed by means of which liquid or viscous media, for example, can be applied.

This plug-on part is preferably designed such that a base body of the plug-on part can be used for several applications and a replacement part is mounted in the head region of the plug-on part.

In addition to the medium, the replacement part can also comprise other application elements, for example bristles or a sponge. Thus, a replacement part can be plugged for use onto the base body and is then discarded after use.

The medium can be integrated in the replacement part in different forms. For example in the form of a ball that dissolves upon contact with water, or as a ball that is punctured. In this case, when the replacement part is mounted, means are arranged in the base body that break open the ball and thus allow the medium to escape and be applied.

The aforementioned exchangeability of the functional element, without changing the base body of the plug-on part, can in principle be realized not only, as specifically described, for interdental plug-on parts and flosser plug-on parts, but also in the field of cosmetic applications of the kinds already described.

All in all, the present invention makes available an electrical appliance for personal care or a universal handle for different personal care applications, on which plug-on parts according to the invention can be applied for a wide variety of uses.

For all uses, it is possible to provide protective attachments, so-called shields, that protect the plug-on part and the functional elements mounted thereon, for example bristles, from soiling. These head shields are normally provided as separately formed elements and are not directly connected to the plug-on part.

For all uses, it is also possible to provide a stand/holder in which the handle can be stored. For example, the holder can be designed such that the hand part is placed vertically in the latter, and, around the recess for the handle, further projections are formed on which the plug-on parts can be stored. It is thus possible, for example, that the plug-on parts for different uses can be stored together with the handle. The holder can be designed most simply as a one-component or multi-component injection-molded part.

Moreover, this stand can be configured as a charger, such that, for example, handles with rechargeable accumulators can be charged inductively in the stand.

Various plastics can be used for the realization of the electrical appliance according to the invention or of the handle according to the invention and the plug-on parts according to the invention.

Possible examples from the field of thermoplastics comprise the following hard components:
  styrene polymers such as styrene acrylonitrile (SAN), polystyrene (PS), acrylonitrile butadiene styrene (ABS), styrene methylmethacrylate (SMMA) or styrene butadiene (SB);

polyolefins such as polypropylene (PP) or polyethylene (PE), in particular also in the form of high-density polyethylene (HDPE) or low-density polyethylene (LDPE);

polyesters such as polyethylene terephthalate (PET) in the form of acid-modified polyethylene terephthalate (PETA) or glycol-modified polybutylene terephthalate (PETG), polybutylene terephthalate (PBT), acid-modified polycyclohexylenedimethylene terephthalate (PCT-A) or glycol-modified polycyclohexylenedimethylene terephthalate (PCT-G);

cellulose derivatives such as cellulose acetate (CA), cellulose acetate butyrate (CAB), cellulose propionate (CP), cellulose acetate phthalate (CAP) or cellulose butyrate (CB);

polyamides (PA) such as PA 6.6, PA 6.10 or PA 6.12; polymethyl methacrylate (PMMA); polycarbonate (PC); polyoxymethylene (POM); polyvinyl chloride (PVC); polyurethane (PUR).

Possible examples from the field of thermoplastic elastomers (TPE) comprise the following soft components:

thermoplastic polyurethane elastomers (TPE-U); thermoplastic styrene elastomers (TPE-S) such as styrene-ethylene-butylene-styrene copolymer (SEBS) or styrene-butadiene-styrene copolymer (SBS); thermoplastic polyamide elastomers (TPE-A); thermoplastic polyolefin elastomers (TPE-O); thermoplastic polyester elastomers (TPE-E).

Moreover, the aforementioned thermoplastics polyethylene (PE) and polyurethane (PU) can be used both as hard component and also as soft component.

PP is particularly suitable as hard component. Preference is given to PP with a modulus of elasticity of 1000-2400 N/mm$^2$, more preferably with a modulus of elasticity of 1300-1800 N/mm$^2$.

A TPE-S is preferably used as soft component. The Shore A hardness values of the soft component are preferably below 90 Shore A. The soft components form a material bond with the hard component by means of overmolding in a two-component or multi-component injection molding method.

Examples of materials for the production of injection-molded bristles comprise:

polyamide elastomer (e.g. Grilflex ELG 5930 from Ems-Chemie AG); polyester elastomer (e.g. Riteflex 672 RH Nat or Riteflex RKX 193 RF Nat from Ticona Polymers or Hytrel 7248 from DuPont. The bristle materials for the injection-molded bristles have a Shore A hardness of 0 to 100, preferably from 30 to 80 Shore A.

Conventional bristles (tapered or cylindrical) are in the present case preferably produced from polyamide (PA) or polyester (PBT).

Rubber-elastic massaging and cleaning elements are in the present case produced from a soft component.

It is also possible in principle to use bioplastics, i.e. plastics that are produced from renewable raw materials.

A particularly preferred hard component for the plug-on parts according to the invention is PP Tipplen R359 from TVK plc. (Tipplen is a trademark of TVK plc.). A particularly preferred hard component for the handle according to the invention is Total PPH 5042 from Total SA (Total is a trademark of Total SA) or alternatively Moplen HP548L from LyondellBasell Industries Holdings B.V. (Moplen is a trademark of LyondellBasell Industries Holdings B.V.).

Possible embodiments of the present invention are shown in the accompanying figures by way of example and purely for the purpose of illustration. The individual embodiments can be combined wholly or in parts with other embodiments of the invention without departing from the scope of the invention. Similarly, the following description of individual figures can be carried over to other figures that show the same or similar embodiments and are possibly described in less detail.

In the figures:

FIG. 1b shows a side view of the electrical appliance according to the invention from FIG. 1a;

FIG. 1c shows a plan view of the electrical appliance according to the invention from FIG. 1a;

FIG. 1d shows a bottom view of the electrical appliance according to the invention from FIG. 1a;

FIG. 1e shows a cross-sectional view of the electrical appliance according to the invention from FIG. 1a;

FIG. 2c shows a side view of the handle according to the invention from FIG. 2a;

FIG. 2d shows a plan view of the handle according to the invention from FIG. 2a;

FIG. 2e shows a bottom view of the handle according to the invention from FIG. 2a;

FIG. 3b shows a side view of the plug-on part according to the invention from FIG. 3a;

FIG. 3c shows a plan view of the plug-on part according to the invention from FIG. 3a;

FIG. 3d shows a bottom view of the plug-on part according to the invention from FIG. 3a;

FIG. 7b shows a further perspective view of the plug-on part according to the invention from FIG. 7a;

FIG. 7c shows a plan view of the plug-on part according to the invention from FIG. 7a;

FIG. 7d shows a side view of the plug-on part according to the invention from FIG. 7a;

FIG. 8b shows a side view of the plug-on part according to the invention from FIG. 8a;

FIG. 8c shows a bottom view of the plug-on part according to the invention from FIG. 8a;

FIG. 8d shows a plan view of the plug-on part according to the invention from FIG. 8a;

FIG. 9b shows a plan view of the plug-on part according to the invention from FIG. 9a;

FIG. 9c shows a bottom view of the plug-on part according to the invention from FIG. 9a;

FIG. 10b shows a plan view of the plug-on part according to the invention from FIG. 10a;

FIG. 11b shows a plan view of the plug-on part according to the invention from FIG. 11a;

FIG. 12b shows a plan view of the plug-on part according to the invention from FIG. 12a;

FIG. 12c shows a bottom view of the plug-on part according to the invention from FIG. 12a;

FIG. 13b shows a plan view of the plug-on part according to the invention from FIG. 13a;

FIG. 13c shows a bottom view of the plug-on part according to the invention from FIG. 13a;

FIG. 15b shows a side view of the plug-on part according to the invention from FIG. 15a;

FIG. 15c shows a front view of the plug-on part according to the invention from FIG. 15a;

FIG. 15d shows a plan view of the plug-on part according to the invention from FIG. 15a;

FIG. 17b shows an exploded perspective view of the plug-on part according to the invention from FIG. 17a;

FIG. 17c shows an exploded plan view of the plug-on part according to the invention from FIG. 17a;

FIG. 18a shows a perspective view of a fifteenth embodiment of a plug-on part according to the invention;

FIG. 18b shows a side view of the plug-on part according to the invention from FIG. 18a;

FIG. 18c shows a plan view of the plug-on part according to the invention from FIG. 18a on a handle;

FIG. 18d shows a front view of the plug-on part according to the invention from FIG. 18a;

FIG. 19b shows a side view of the plug-on part according to the invention from FIG. 19a;

FIG. 19c shows a plan view of the plug-on part according to the invention from FIG. 19a;

FIG. 19d shows a bottom view of the plug-on part according to the invention from FIG. 19a.

FIG. 1a is a perspective view of a first embodiment of the electrical appliance according to the invention for personal care, here in the form of an electric toothbrush.

Figure 1A:
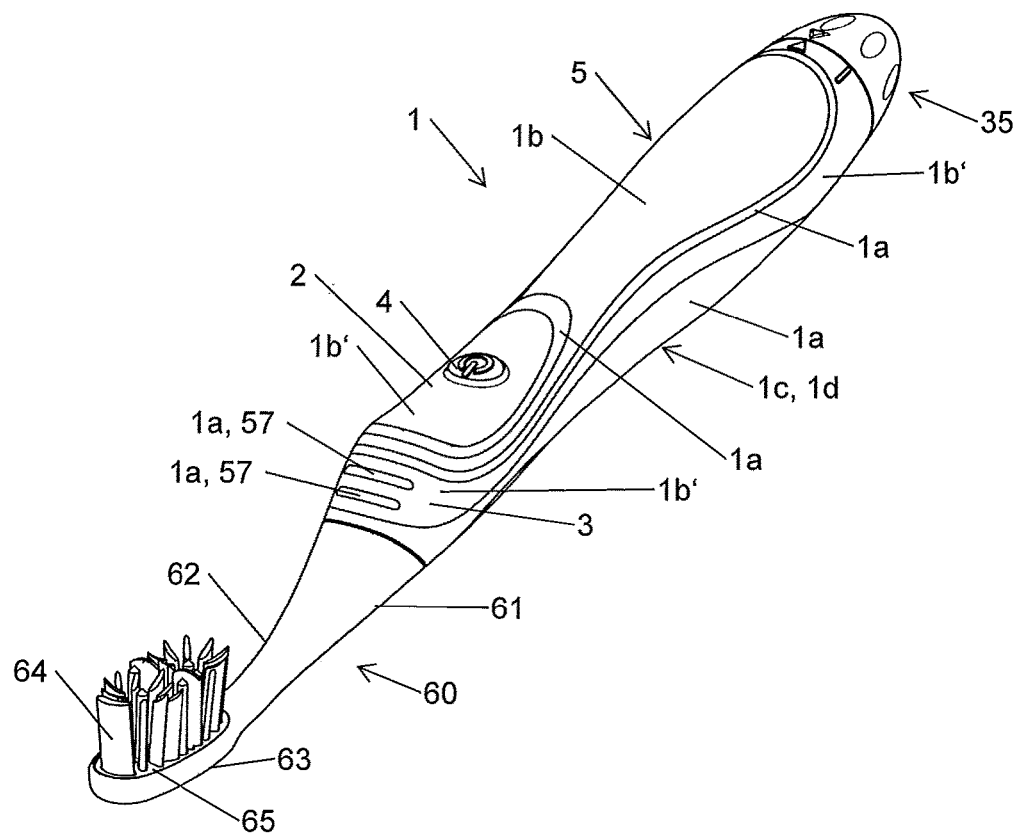
FIG. 1a shows a perspective view of a first embodiment of an electrical appliance according to the invention for personal care.

The electric toothbrush is composed mainly of the handle 1, consisting of hand part 1c and closure cap 35, and the plug-on part 60. The hand part 1c consists mainly of the base body 5, which comprises at least one hard component 1a, and also the encapsulation body, which comprises one or more soft components 1b, 1b', and the interior.

In the present case, the switch portion 2, parts of the front portion 3, and the rear portion 3a (cf. FIG. 1d) are in particular formed from a soft component 1b'. Moreover, a portion made of soft component 1b is formed on the front face. This can be the same soft component in each case, although it is also possible, if so required, to use different soft components. As regards the materials in question, reference is made to the general description given above.

The on/off switch symbol 4 for the electric toothbrush is also arranged in the region of the switch portion 2. The on/off switch symbol 4 represents the location that has to be pressed in order to actuate the switch 24 in the interior of the hand part. The front portion 3 comprises two or more webs 57, which are formed from the hard component 1a and which, together with the surrounding soft component 1b' of the front portion 3, provide a particularly good grip. The front portion 3 is adjoined by the plug-on part 60, here in the form of a toothbrush plug-on part.

The plug-on part comprises a base region 61, with which it is attached to the base body 5 made of the hard component 1a of the handle 1, or to the plug-like coupling structure 40 of the handle 1, and a head region 63, and also a neck region 62 connecting the base region 61 to the head region 63.

In the present case, a carrier lamina 65, with cleaning elements 64 arranged thereon, is mounted in the head region 63. The cleaning elements 64 can be bristles or bristle tufts and/or soft elastic cleaning and massaging elements (these are preferably formed or injected from a soft component). The bristles or bristle tufts are preferably applied by anchor-free tufting (AFT).

Figure 1B:
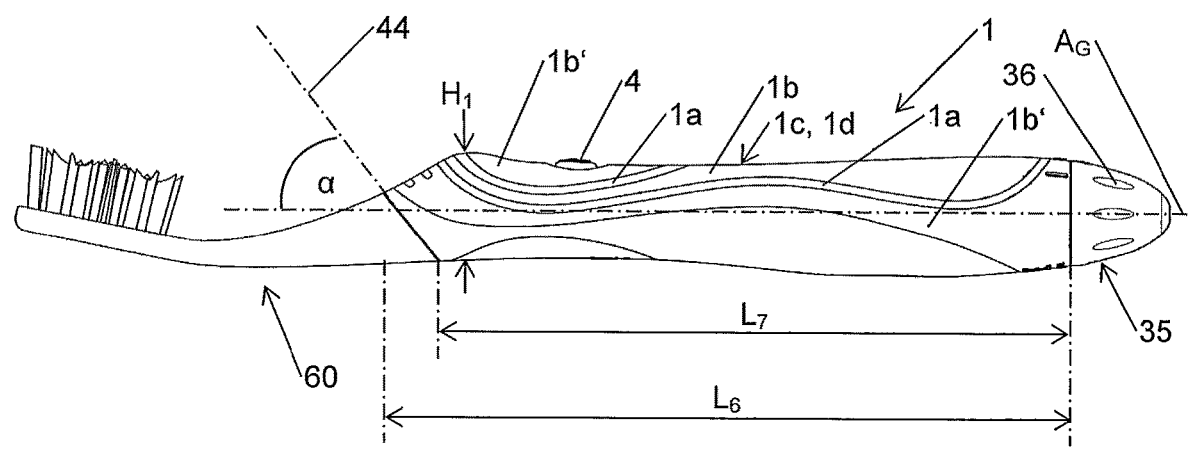

FIG. 1b shows a side view of the electric toothbrush from FIG. 1a. The longitudinal axis of the handle 1 is here designated by $A_G$. The transition region between the handle 1 and the plug-on part 60 comprises an oblique stop surface 44, which encloses an angle α with the longitudinal axis $A_G$ of the handle. In the present illustration, this transition can be seen as a line on account of the angle.

The length from the stop surface 44 to the grip end (on the front face or top of the hand part 1c without closure cap 35) is designated by $L_6$, and the length from the stop surface 44 to the grip end (on the rear face or underside of the hand part 1c without closure cap 35) is designated by $L_7$, where at all times $L_6 > L_7$.

At its rear end, the closure cap 35 has notches 36 which serve to ensure that the user's fingers do not slip so easily when turning the closure cap 35. At its highest point, in the region of the front portion 3, the handle 1 has a maximum height $H_1$. The on/off switch symbol 4 can be seen again in the region of the switch portion 2.

Figure 1C:
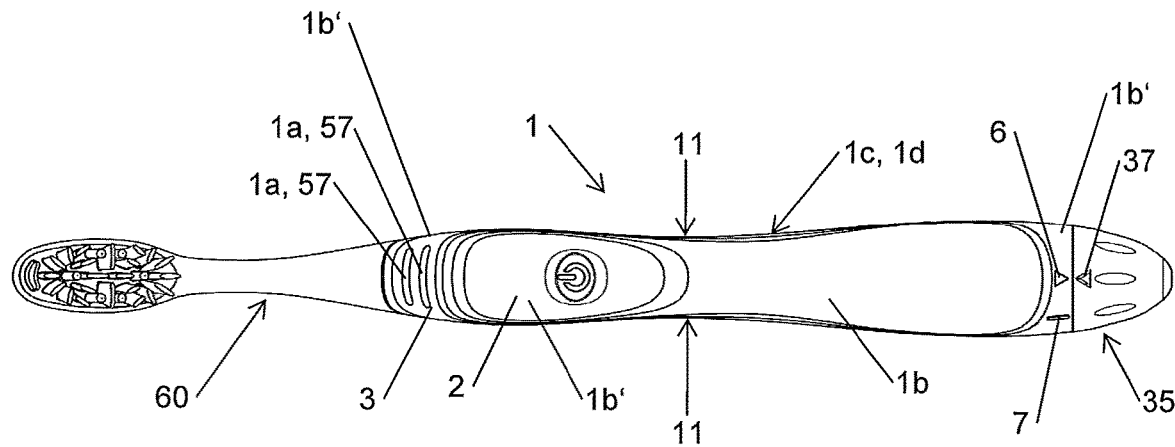

FIG. 1c show a plan view of the electric toothbrush according to the invention from FIG. 1a. The plug-on part 60, the hand part 1c and the closure cap 35 can be seen once again.

In the transition region from the hand part 1c to the closure cap 35, the markings 6 and 7 are applied on the hand part 1c, and the marking 37 is applied on the closure cap 35. The two triangular markings 6 and 37 lie directly opposite each other, which in the present case means that the corresponding contact plates of the hand part 1c and of the closure cap 35 are in contact, which is explained in greater detail further below.

When the closure cap 35 is turned such that the marking (on the hand part 1c) and the marking 37 (on the closure cap) lie opposite each other, this then means in the present case that the corresponding contact plates of the hand part 1c and of the closure cap 35 are not in contact.

It will also be seen that the top of the handle 1 is formed mainly from the soft component 1b and also has a soft component 1b' in the region of the switch portion 2 and in the region of the front portion 3. The soft component 1b' of the front portion 3 extends as far as the grip end, and the markings 6 and 7 are applied in the region of this soft component 1b'. The webs 57 are formed from the hard component 1a.

Approximately at the middle of the handle 1, the latter has a narrowed waist 11, which again improves the grip of the electric toothbrush (i.e. the ergonomics are optimized and the toothbrush thus rests more comfortably in the hand).

Figure 1D:
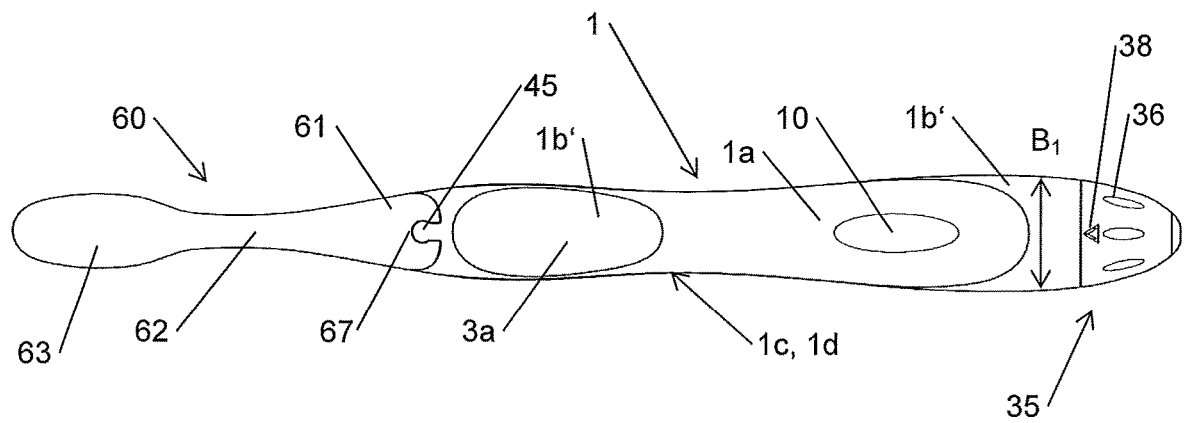

FIG. 1d shows a bottom view of the electric toothbrush according to the invention from FIG. 1a. It will be seen that the closure cap 35 also has a triangular marking 38 on the rear face. Notches 36 are likewise present on the rear face of the closure cap 35. The closure cap 35 has a mirror-symmetrical configuration and, since it can be applied in two positions to the handle 1c, the triangular marking 38, on the one hand, and the notches 36 (which are arranged all around the closure cap 35), on the other hand, are also visible on the rear face.

On its rear face, the hand part 1c has a flat spot 10, which allows the hand part 1c or the electric toothbrush to be set down in a stable position. Behind the flat spot 10, i.e. in the direction of the closure cap 35, the hand part 1c has its maximum width $B_1$. The rear face of the hand part 1c is formed predominantly from the hard component 1a. However, the rear face also has regions provided with soft component 1b', namely the rear portion 3a and the end of the hand part 1c.

The soft component 1b' again serves to provide the electric toothbrush with better grip, for example since the index finger does not slip so easily when the handle 1 is being held.

In the region of the transition from the handle 1 to the base region 61 of the plug-on part 60, a cam 45 is located on the handle 1, which cam 45 engages with a corresponding recess 67 on the plug-on part 60. With these two elements (cam 45 and recess 67), the pull-off weight for the plug-on brush can be increased or adjusted in respect of safety. The pull-off weight is set depending on the tolerance between the two elements and depending on the associated choice of material.

Figure 1E:
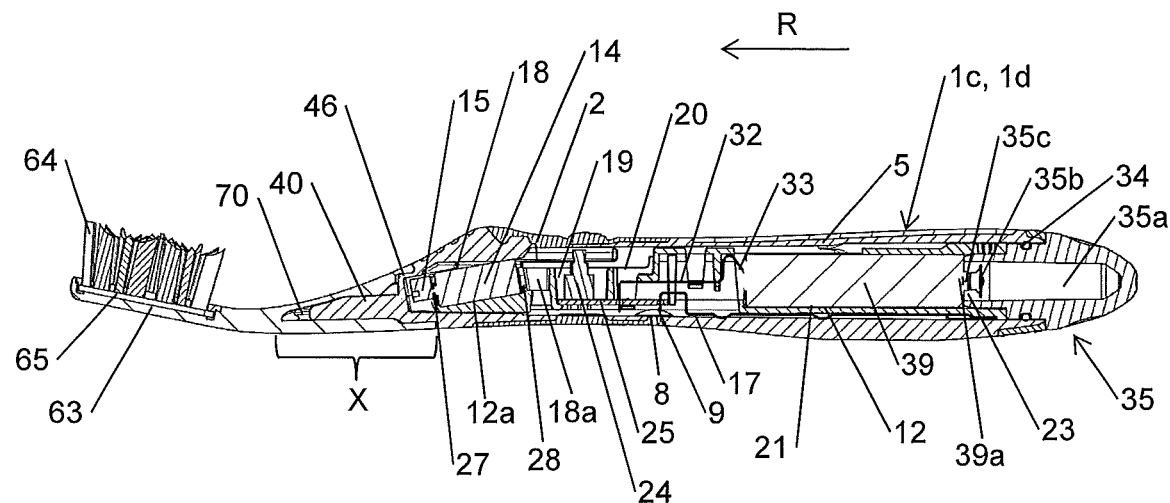

FIG. 1e shows a cross-sectional view of the electric toothbrush according to the invention from FIG. 1a. This concerns the battery version. In the interior of the base body 5 or of the hand body 1d, a carrier element 12 is arranged, on or at which all the essential components of the electric drive are arranged.

The closure cap 35 of the electric toothbrush is fitted onto the hand part 1c. The closure cap 35 has a cap cavity 35a, into which the battery pole 39a of the battery 39 protrudes. To contact the battery pole 39a, the closure cap has a contact plate 35b with a spring plate element 35c. The contact plate 35 lies transversely with respect to the cap cavity 35a and at least partially closes the latter. To the side of the cap cavity 35a, the contact plate 35b is held in the corresponding side wall in a recess and in the adjoining side wall. The contact plate 35b cuts into the side wall to provide a hold, such that frictional engagement is obtained. The spring plate element 35c of the contact plate 35b is oriented in the direction of the battery 39 and thus contacts the battery pole 39a.

The contact plate 35b moreover produces the contact with the contact plate 17 of the carrier element, such that the electrical circuit is closed.

A sealing ring 34 is arranged on the outside of the closure cap 35 and helps to seal off the interior of the handle from splashes of water, etc. The region of the carrier element 12 that overlaps the front region of the closure cap 35 at the rear end of the handle is designated as the terminal compartment 23.

Arranged downstream from the terminal compartment 23 in the direction of insertion R is the battery compartment 21 of the carrier element 12, into which a battery 39 is fitted. The front pole of the battery 39 touches the contact tongue 33 of the corresponding battery contact plate 32. The battery contact plate 32 is arranged in the contact plate compartment 20 of the carrier element 12, which contact plate compartment 20 is located directly downstream from the battery compartment 21 in the direction of insertion R. Moreover, the battery contact plate 32 is connected to the printed circuit board 25.

The contact plate 17 of the carrier element is also arranged, at least partially, inside the contact plate compartment 20, and it is likewise connected to the printed circuit board 25, wherein the contact plate 17 of the carrier element then extends further along the lower outside of the carrier element 12, along the battery compartment 21, and, on the outside of the terminal compartment 23, is further guided radially in a semicircular shape along the outer circumference of the carrier element 12 or of the terminal compartment 23, where it protrudes into openings in the outside of the terminal compartment in order to interact with the contact plate 35b of the closure cap 35 in the manner of a bayonet catch known per se (not shown here).

Provided downstream from the contact plate compartment in the direction of insertion R is the switch compartment 19 in which the switch 24 is arranged, the latter being operated by pressing the on/off switch symbol 4 of the switch portion 2. The switch 24 is applied directly to the printed circuit board 25.

Provided downstream from the switch compartment 19 in the direction of insertion R is a cable feed-through 18a for the cables that run from the rear face of the electric motor 14 to the underside of the printed circuit board and are suitably soldered there (the cables are not visible in the illustration).

The electric motor 14, finally, is arranged in the motor compartment 18 of the carrier element 12, specifically in an inclined position which is defined by the bevel 12a of the carrier element 12, on which bevel 12a the underside of the electric motor 14 bears. With its front face or front edge, the electric motor bears on a front motor stop 27 of the carrier element 12; the electric motor 14 bears with its rear face on the rear motor stop 28 of the carrier element 12.

The eccentric element 15 arranged on the rotation axis $A_M$ of the electric motor 14 protrudes past the front motor stop 27 and into the base region 46 of the plug-like coupling structure 40. This arrangement has proven particularly efficient for the transmission of vibrations.

In the present cross-sectional view, it will also be seen how the plug-like coupling structure 40 of the handle and the mirror-inverted, socket-like coupling structure 70 of the plug-on part 60 form the interface X between the handle 1 and the plug-on part 60.

The carrier lamina 65, on which the cleaning elements 64 are arranged, can be seen in the head region 63 of the plug-on part 60.

As regards the specific dimensions, materials and other configurations, reference is also made to the above general description regarding the battery version.

Figure 1F:
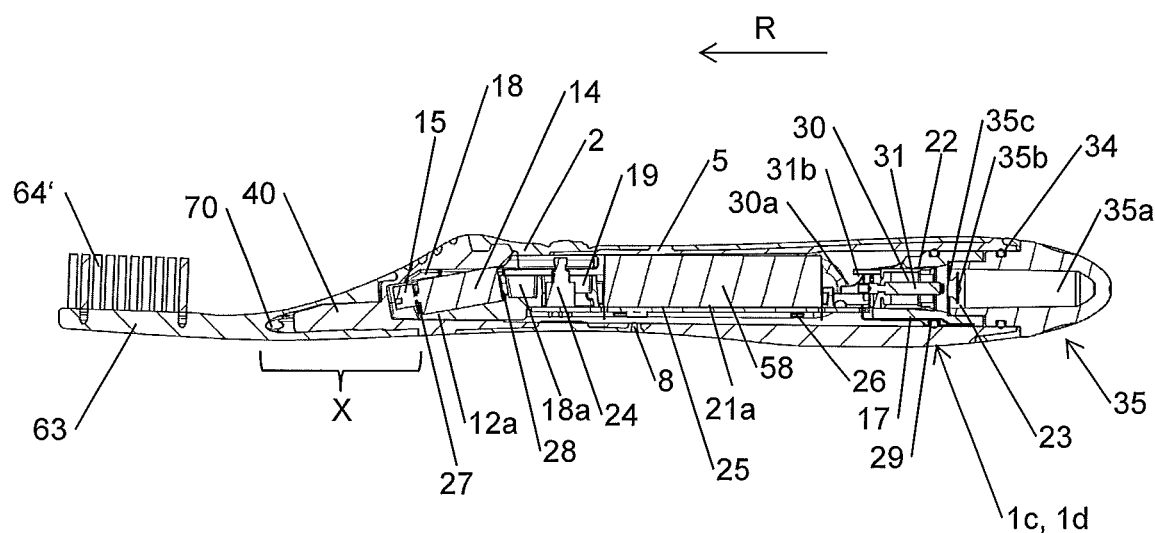
FIG. 1f shows a cross-sectional view of a second embodiment of an electrical appliance according to the invention for personal care.

FIG. 1f now shows a cross-sectional view of a second embodiment of the electric toothbrush according to the invention, namely the accumulator version.

Here too, the closure cap 35 is again fitted onto the rear end of the hand part 1c. The contact element 31 of the socket 30 protrudes into the cap cavity 35a of the closure cap 35, specifically once again in that region of the terminal compartment 23 formed in the region of the overlap between the carrier element 12 and the front end of the closure cap 35.

A sealing ring 34 is again provided on the outside of the closure cap 35 and helps to protect the interior of the handle 1 from splashes of water, etc. The socket 30 is arranged rigidly in the socket compartment 32 of the carrier element 12, which circumferentially encloses the socket 30 for the most part. Moreover, the socket compartment 22 has a front stop 31b for the socket 30, wherein the socket 30 abuts against this with its rear face. The front stop of the socket 30 in the direction of insertion R is designated by 31b.

A seal 29 (i.e. a sealing ring) is also mounted on the carrier element 12, above the contact plate 17 of the carrier element, and provides further sealing of the interior against splashes of water. Moreover, this seal 29 also damps undesired oscillations.

At the front end of the socket 30 in the direction of insertion R (the actual rear face of the socket 30), there are two socket terminals 30a, which are connected to the printed circuit board 25 via cables (not shown). The accumulator 58 is mounted rigidly on the printed circuit board 25 or soldered to the latter and is thus mounted on the carrier element 12, with at least part of it bearing directly on the latter. The underside of the carrier element 12 is provided with several latching lugs 26, with which the printed circuit board is held on the carrier element 12.

The accumulator compartment 21a is in turn followed by the switch compartment 19. Here too, the switch 24 is mounted directly on the printed circuit board and is preferably soldered to the latter five times. In this embodiment too, a cable feed-through 18a is provided through which cables are routed from the rear end of the electric motor 14 to the printed circuit board 25.

The cable feed-through 18a is slightly shorter than the corresponding cable feed-through 18a in the battery version. Correspondingly, the switch compartment 19 in the accumulator version is slightly longer. The electric motor 14 is again arranged in an inclined position in the motor compartment 18 and is supported at its underside by the bevel 12a of the carrier element 12.

The eccentric element 15 arranged on the rotation axis $A_M$ of the electric motor again protrudes past the front motor stop 27 and into the base region 46 of the plug-like coupling structure 40 (i.e. as in the battery version described above).

In the accumulator version too, the plug-like coupling structure 40 and the substantially mirror-inverted, socket-like coupling structure 70 form the interface X. In this embodiment, the head region 63 of the toothbrush plug-on part 60 has a slightly different shape than in the battery version.

Instead of a carrier lamina mounted in the head region and having cleaning elements 64 in the form of bristles or bristle tufts that are applied by the AFT method, here the bristle tufts 64' are punched directly into the head region 63 using the conventional method. Moreover, the longitudinal axis $A_B$ of the head region has a lesser inclination with respect to the longitudinal axis $A_G$ of the handle. However, the toothbrush plug-on part of the battery version can also be used in the accumulator version. Further details concerning the corresponding plug-on part are to be found in the description of FIG. 4; the plug-on parts in question correspond to each other.

As regards the specific dimensions, materials and other configurations, reference is also made to the above general description regarding the accumulator version.

Figure 2A:
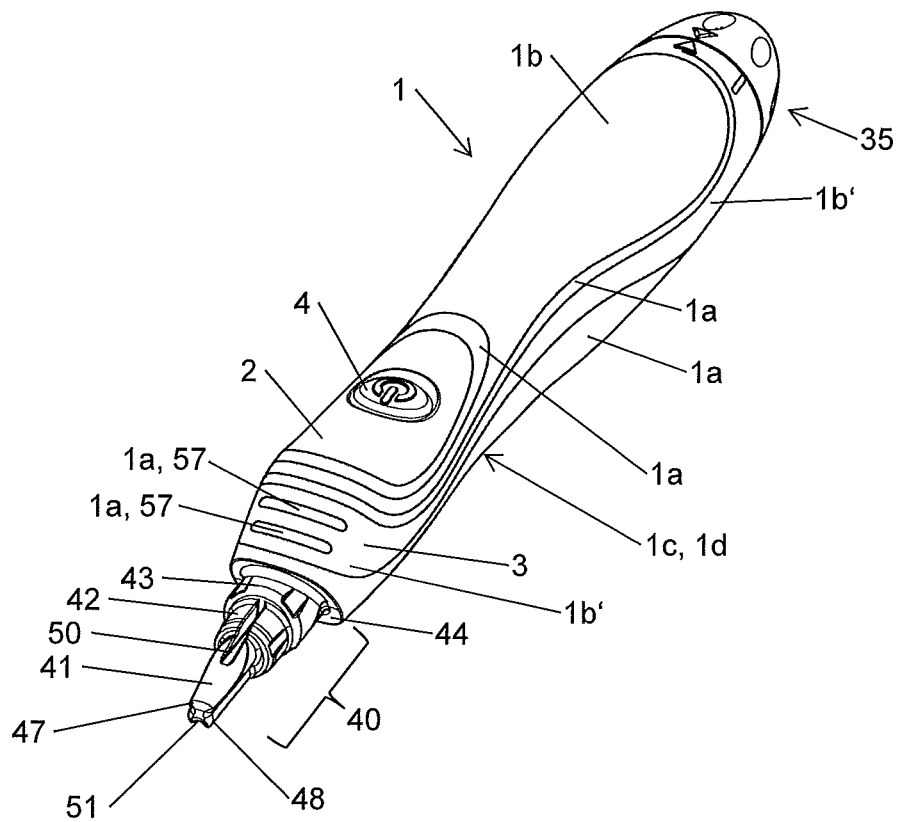
FIG. 2a shows a perspective view of a handle according to the invention.

FIG. 2a now shows a perspective view of a handle 1 according to the invention, that is to say a hand part 1c with closure cap 35, but without plug-on part 60.

The figure shows in particular the oblique stop surface 44 of the handle 1, which stop surface 44 is adjoined by the front portion 3 with the combination of hard component and soft component. The plug-like coupling structure 40 protrudes horizontally from the oblique stop surface 44, i.e. substantially parallel to the longitudinal axis $A_G$ of the handle 1. This coupling structure 40 is divided into three stages, namely the first stage 41 at the free end, the second stage 42, and the third stage 43, which transitions into the oblique stop surface 44.

The first stage 41 is divided into an upper sub-element and a lower sub-element 48. The first stage 41 climbs in the shape of a ramp in the direction of the second stage. Approximately at the half-way point of the first stage 41, an angular groove 50 begins which also continues over the entire second stage 42 as far as the abutment against the third stage 43.

Seen from the front, the upper and the lower sub-elements 47, 48 together have an approximately tooth-shaped contour (at the free end), which assumes an approximately eight-shaped configuration at the end of the first stage in the direction of the handle. The second stage 42 and the third stage 43 are substantially round and substantially cylindrical.

Figure 2B:
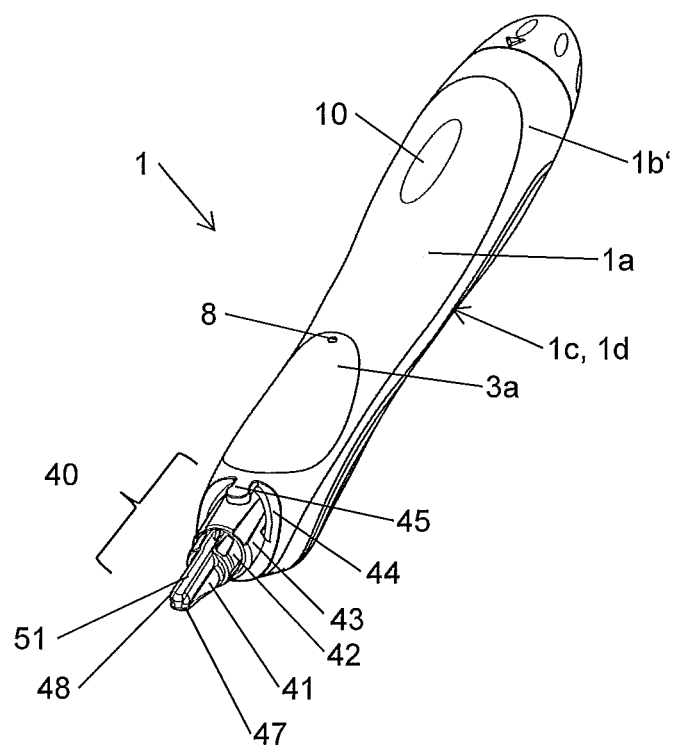
FIG. 2b shows a perspective view of the handle according to the invention from FIG. 2a, when rotated through 180°.

FIG. 2b illustrates a perspective view of the handle 1 from FIG. 2a when rotated through 180°. This shows once again the flat spot 10 for setting down the handle 1, and the rear portion 3a which, in contrast to the flat spot 10, is formed from a soft component 1b.

Moreover, a vent hole 8 is provided at that end of the rear portion 3a in the direction of the closure cap 35 (applies to all the embodiments). Gases can escape from the interior of the handle 1 through this vent hole 8.

The cam 45 issues from the oblique stop surface 44, on the underside of the handle 1, and comprises approximately one third of the length of the underside of the third stage 43.

On the underside of the lower sub-element 48 of the first stage 41, a round groove 51 is provided which continues over the entire second stage 42. The angular groove 50 on the top of the upper sub-element 47 and the round groove 51 on the underside of the lower sub-element 48 serve in particular for safe and rotation-free insertion into the corresponding socket-like coupling structure 70 of a plug-on part 60 according to the invention.

Figure 2C:
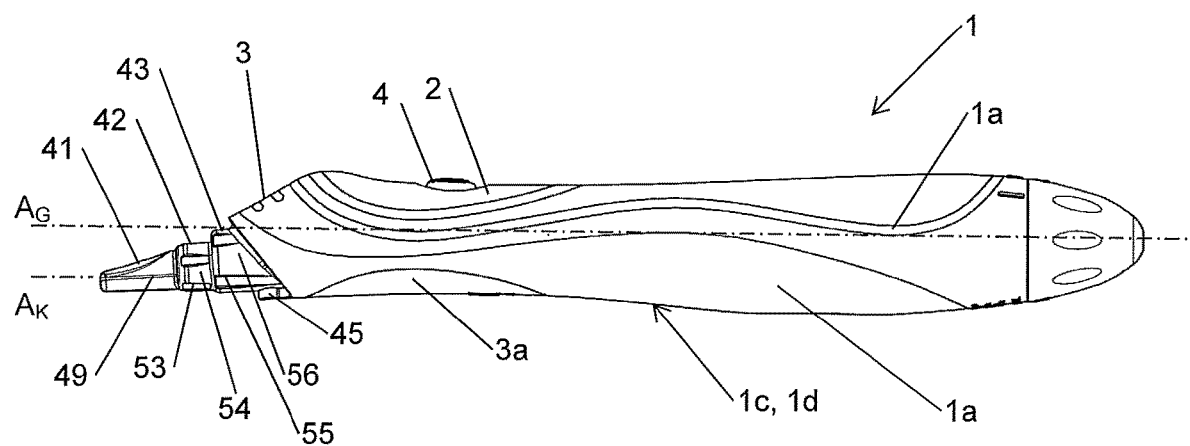

FIG. 2c shows a side view of the handle 1 according to the invention from FIG. 2a. This again shows the cam 45 on the underside of the third stage 43, and also a circumferential projection 56 of the third stage, and a circumferential recess 55 of the third stage. The second stage 42 also has circumferential projections and circumferential recesses, which are generally arranged offset in relation to the circumferential projections or recesses of the third stage 43. Moreover, the longitudinal axis $L_K$ of the plug-like coupling structure 40 is offset in parallel to the longitudinal axis $A_G$ of the handle 1.

The first stage additionally has a groove 49 which extends between the upper sub-element 47 and the lower sub-element 48, and which also extends along the entire length of the first stage 41. The groove 49 is designed more or less in the form of a notch, which leads to the eight-shaped configuration in particular of the rear end of the first stage.

Figure 2D:
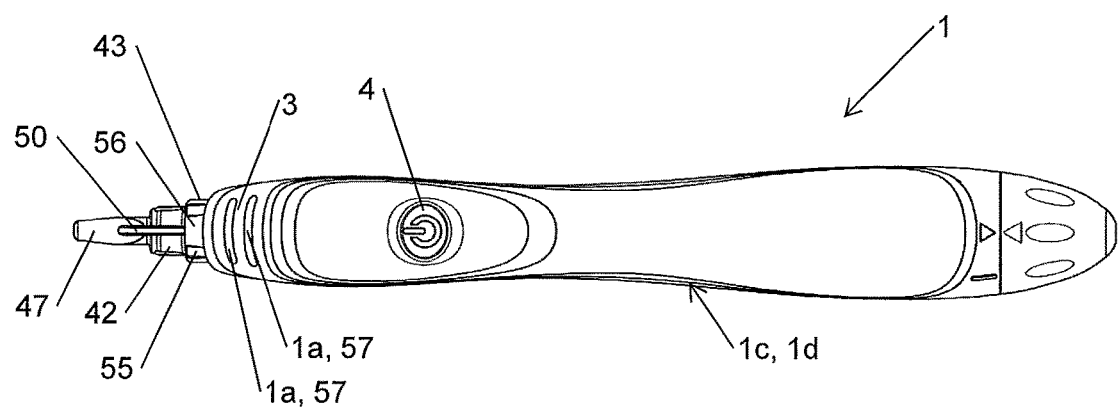

It will be seen from the plan view in FIG. 2d that the angular groove 50 begins just after the half-way point of the first stage 41 or of the upper sub-element 47 and continues as far as the abutment to the third stage 43. The figure also once again shows the circumferential recesses 55 and the circumferential projections 56 of the third stage.

Figure 2E:
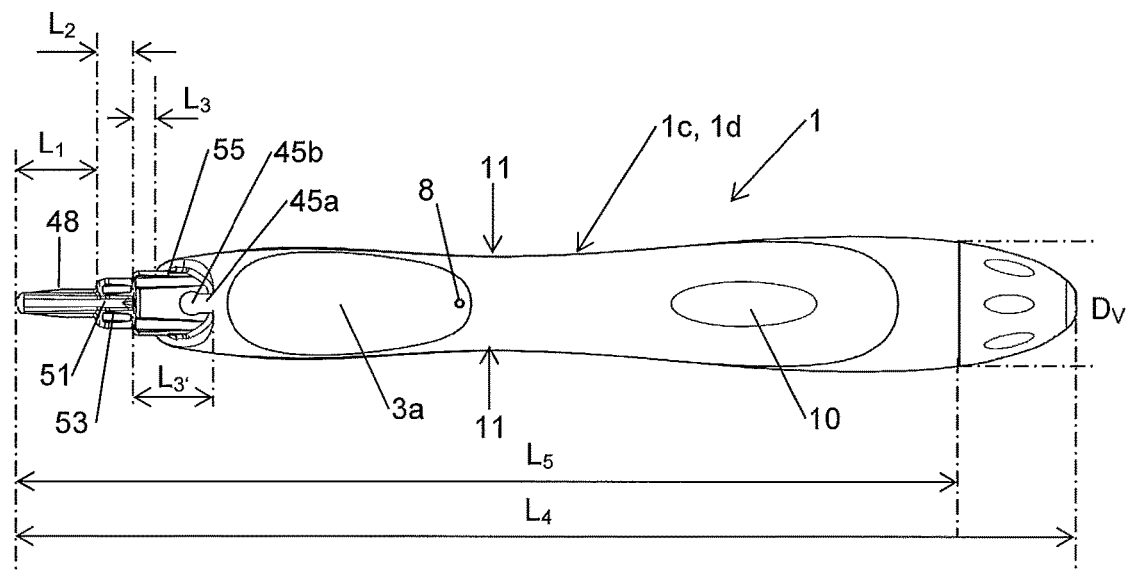

From the bottom view of the handle 1 according to the invention shown in FIG. 2e, it is possible to discern the length ratios of the individual stages of the plug-like coupling structure 40 of the handle 1. The first stage 41 has a length $L_1$, the second stage has a length $L_2$, and the third stage has a length $L_3$ on the top and a length $L_3$, on the underside. The first stage 41 is longer than the second stage 42 and approximately the same length as the third stage 43 on its underside. The third stage 43 is correspondingly longer than the second stage 42 on its underside, but it is slightly shorter than the second stage 42 on its top.

The cam 45 can once again be seen on the underside of the third stage 43, which cam 45 is divided into the trunk 45a and the crown 45b. This design ensures particularly good locking engagement with the mirror-inverted recess 67 of the plug-on part 60.

At its end located toward the closure cap 35, the rear portion 3a again has the vent hole 8. Moreover, the narrowed waist 11 and the flat spot 10 can once again be seen.

The maximum diameter of the closure cap 35 is designated by $D_V$. The length of the handle 1 according to the invention with closure cap 35, measured from the free end of the plug-like coupling structure 40 as far as the rear end of the closure cap 35, is designated by $L_4$, and the total length of the handle 1 without closure cap, i.e. measured from the free end of the plug-like coupling structure 40 as far as the rear end of the handle, is designated by $L_5$.

As regards the specific dimensions, materials and other configurations, reference is also made to the above general description concerning the handle.

Figure 2F:
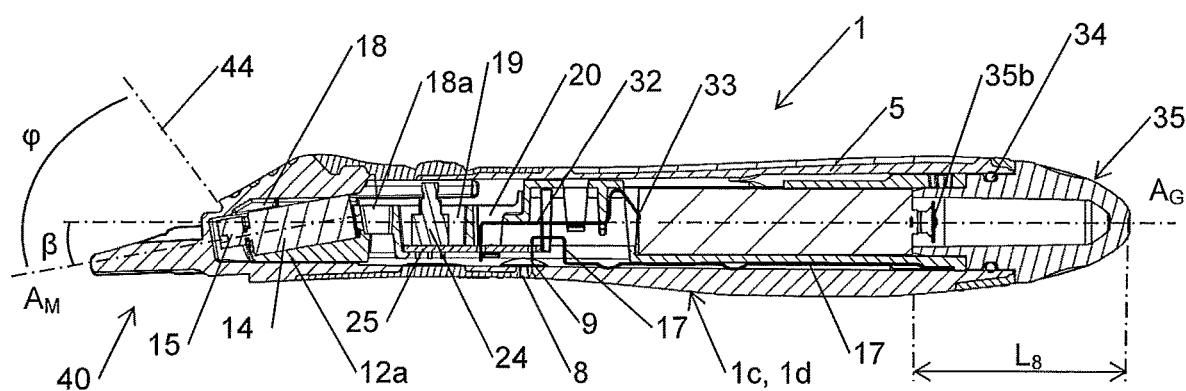
FIG. 2f shows a cross-sectional view of the handle according to the invention from FIG. 2a (corresponding to the embodiment of the electrical appliance according to the invention shown in FIG. 1e)

FIG. 2f shows a cross-sectional view of the handle according to the invention from FIG. 2a and corresponds to FIG. 1e (but without plug-on part 60). In addition, the total length of the closure cap is also designated here, specifically by $L_8$. The figure moreover shows that, between the longitudinal axis $A_G$ of the handle and the rotation axis $A_M$ of the electric motor, an angle $\beta$ is formed which corresponds to the inclination of the electric motor 14.

The embedding of the eccentric element 15 in the base region 46 of the plug-like coupling structure 40, which is achieved in this way, permits a particularly efficient transmission of vibrations. Moreover, the rotation axis $A_M$ of the electric motor 14 forms an angle $\varphi$ with the stop surface 44 of the handle 1, which angle is likewise adapted for optimal transmission of vibrations (cf. specific figures in the above general description).

The figure also shows that the vent membrane 9, which prevents gases from being able to penetrate the interior of the handle 1 from the outside, is provided at the location where the contact plate 17 of the carrier element is secured on the printed circuit board 25. The remaining reference signs in each case designate the same components, as they also do in all the other embodiments.

Figure 3A:
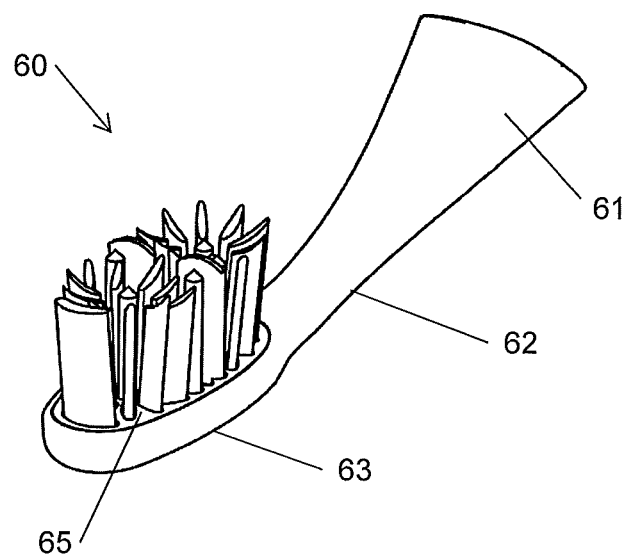
FIG. 3a shows a perspective view of a first embodiment of a plug-on part according to the invention.

FIG. 3a illustrates a perspective view of a first example of a plug-on part 60 according to the invention for a toothbrush. This plug-on part 60 again has a base region 61 and a head region 63, which are connected by a neck region 62. In this embodiment, a carrier lamina 65 is mounted in the head region 63, and the cleaning elements 64 are arranged on said carrier lamina 65 (AFT method).

Figure 3B:
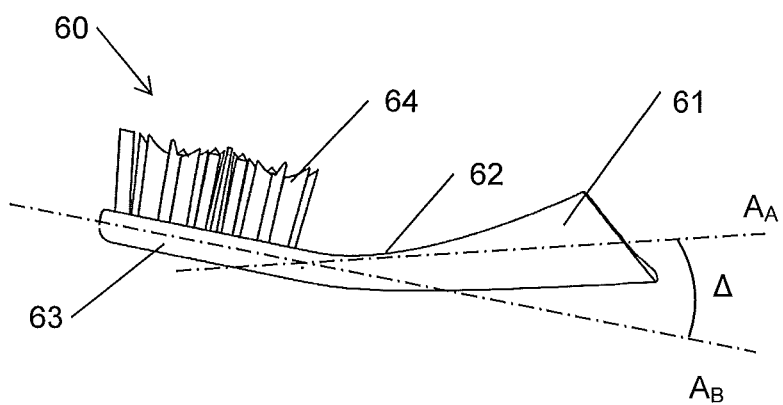

FIG. 3b is a side view of the plug-on part 60 according to the invention from FIG. 3a for a toothbrush. It will be seen that in this embodiment the base region 61 (or the base region 61 and the neck region 62) is at an angle with respect to the flat head region 63. The angle is defined as the angle between the longitudinal axis $A_A$ of the plug-on part and the longitudinal axis $A_B$ of the head region and is designated by A. The dimensions for the angle can be taken from the above description.

Figure 3C:
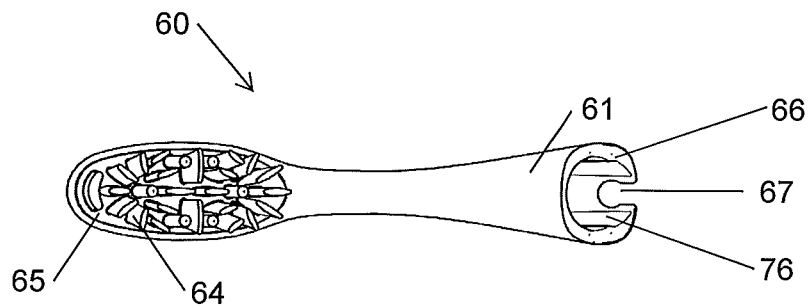

FIG. 3c shows a plan view of the plug-on part 60 according to the invention from FIG. 3a for a toothbrush. This figure again shows the cleaning elements 64 arranged on the carrier lamina 65. It moreover shows the oblique stop surface 66 on the base region 61 of the plug-on toothbrush 60. On the inner side, circumferential recesses 76 adjoin the recess 67 of the plug-on toothbrush 60, which recess 67 has a mirror-inverted design in relation to the cam 45 of the handle 1.

Figure 3D:
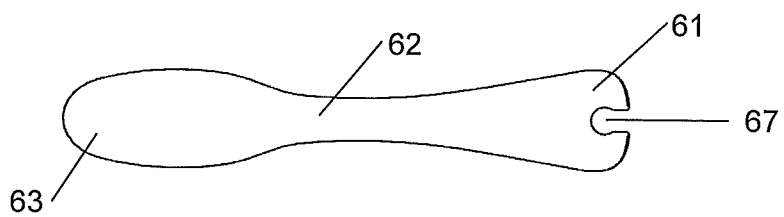

FIG. 3d is a bottom view of the plug-on part 60 according to the invention for a toothbrush. This figure again shows the head region 63, the neck region 62, and also the base region 61 with the recess 67.

Figure 3E:
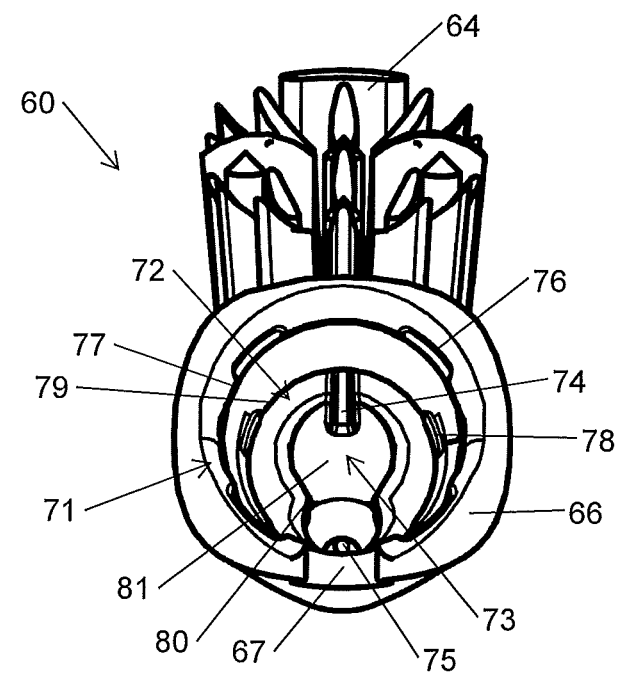
FIG. 3e shows a rear view of the plug-on part according to the invention from FIG. 3e.

FIG. 3e is a rear view of the plug-on part 60 according to the invention for a toothbrush, i.e. it illustrates the interior of the plug-on part 60 for a toothbrush.

The interior mainly comprises the socket-like coupling structure 70, which is correspondingly divided into three stages, namely the first stage 71 (the counterpart to the third stage of the handle), the second stage 72 (the counterpart to the second stage of the handle), and the third stage 73 (the counterpart to the first stage of the handle). The figure also shows the recess 67 for the cam 45 of the handle 1, which recess 67 is formed starting from the oblique stop surface 66.

The first stage comprises circumferential recesses 76 and circumferential projections 77. The recesses and projections are formed symmetrically with respect to each other, wherein the projections 77 of the first stage 71 of the plug-on part 60 come into contact with the corresponding circumferential projections 56 of the third stage 43 of the handle 1. This has the effect that the air can escape when the plug-on part is plugged onto the coupling structure 40 of the handle 1.

To this extent, there is no (complete) mirror inversion here as regards the first stage 71 of the socket-like coupling structure and the third stage 43 of the plug-like coupling structure 40. The same also applies in respect of the second stage 72 of the socket-like coupling structure 70, which again has circumferential recesses 78 and circumferential projections 79, wherein the circumferential projections 79 of this second stage 72 come into contact with the circumferential projections 54 of the second stage 42 of the plug-like coupling structure 40 of the handle 1. This configuration likewise serves to allow air to escape.

However, the second stage 72 of the socket-like coupling structure 70 has an angular ridge 74 on the top, which ridge 74 corresponds in its configuration to the angular groove 50 of the plug-like coupling structure 40. The angular ridge 74 accordingly continues from the second stage 72 to the third stage 73 of the socket-like coupling structure 70, such that it can come completely into engagement with the angular groove 50 of the plug-like coupling structure 40 of the handle 1.

A round ridge 75 is correspondingly arranged on the underside of the second stage 72 of the socket-like coupling structure 70, which ridge 75 corresponds to the round groove 51 on the underside of the lower sub-element 48 of the first stage 41 of the plug-like coupling structure 40. The round ridge 75 also continues past the third stage 73 of the socket-like coupling structure 70.

The third stage 73 of the socket-like coupling structure 70 accordingly has an eight-shaped opening 81, on each of the sides of which a tapering rib 80 is formed, wherein the tapering ribs 80 correspond to and engage with the two grooves 49 between the upper sub-element 47 and the lower sub-element 48 of the first stage 41 of the plug-like coupling structure 40.

The above-described embodiment of the socket-like coupling structure 70 moreover applies to all the plug-on parts according to the invention.

Figure 4:
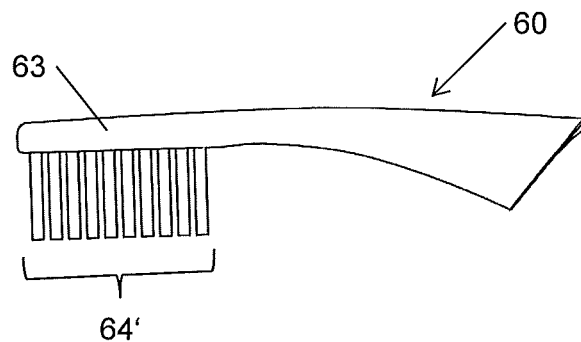
FIG. 4 shows a side view of a second embodiment of a plug-on part according to the invention.
Figure 5:
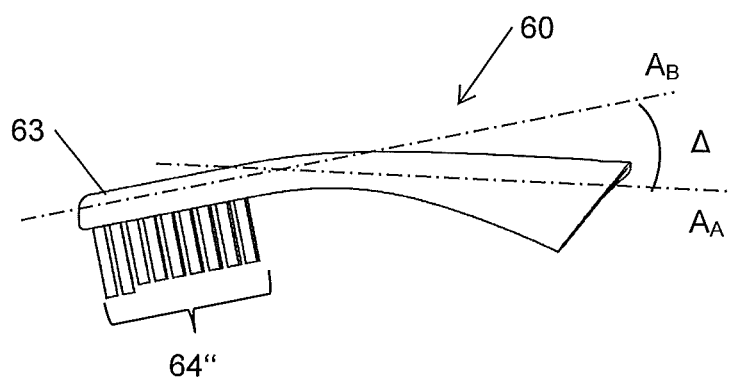
FIG. 5 shows a side view of a third embodiment of a plug-on part according to the invention.

FIGS. 4 and 5 show side views of further embodiments of a toothbrush plug-on part 60 according to the invention. The embodiment according to FIG. 4 has conventional bristle tufts 64' in the head region 63. The plug-on part 60 has practically no angle here. The angle Δ is as it were 0°.

In the embodiment according to FIG. 5, the bristle tufts 64" have different lengths. In particular, the bristle tufts 64" arranged toward the free end of the head region 63 are slightly longer than the other bristle tufts. Moreover, the plug-on part 60 has an angle Δ between the longitudinal axis $A_A$ of the plug-on part and the longitudinal axis $A_B$ of the head region. The dimensions for the angle can be taken from the above description.

Figure 6:
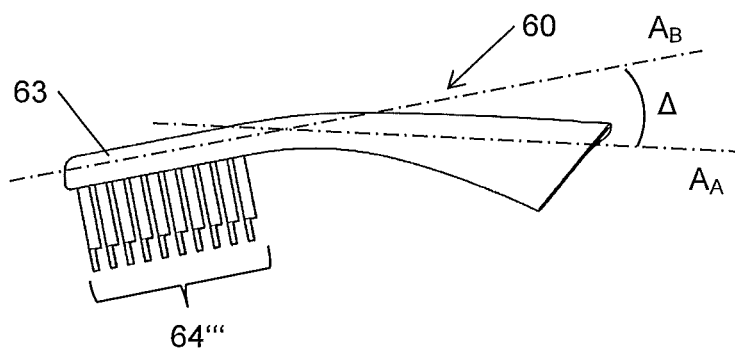
FIG. 6 shows a side view of a fourth embodiment of a plug-on part according to the invention.

In the embodiment according to FIG. 6, the bristle tufts 64''' arranged in the head region 63 each have a stepped shape at their free end. Such configurations serve in particular for improved cleaning of the interdental spaces. In this embodiment too, the plug-on part 60 has an angle Δ. The dimensions for the angle can be taken from the above description.

FIGS. 7a to 7d illustrate a further embodiment of a plug-on part 60 according to the invention, here in the form of a face brush.

As will be seen, the neck region 62 is considerably shortened in the case of the face brush (i.e. in particular compared to the plug-on parts for a toothbrush), such that the head region 63 lies in practice above the interface X (i.e. in the plugged-on state).

The face brush has a bristle zone 68, which can be formed from several bristle tufts or which can be a continuous zone or carpet of individual bristles lying against each other. The bristles in this type of use are generally very fine, in order to avoid any skin irritation.

The base region 61 of the face brush once again has the recess 67 of mirror-inverted shape relative to the cam of the handle. The stop surface 66 again has the corresponding bevel. Here too, a socket-like coupling structure 70 is of course provided in the interior of the plug-on part, of which FIG. 7c shows the circumferential recesses 76 of the first stage 71.

Figure 7A:
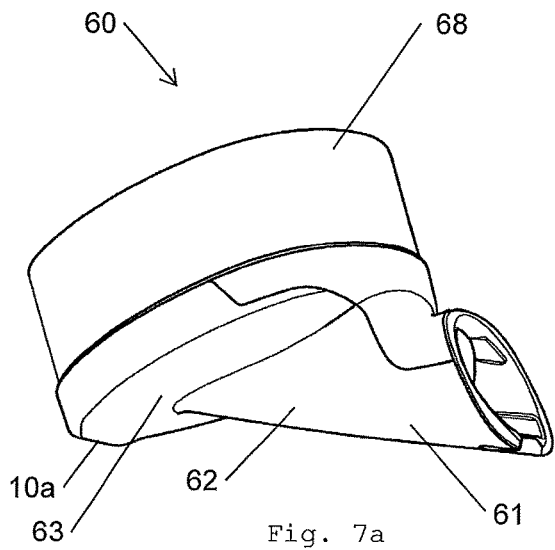
FIG. 7a shows a perspective view of a fifth embodiment of a plug-on part according to the invention.
Figure 7B:
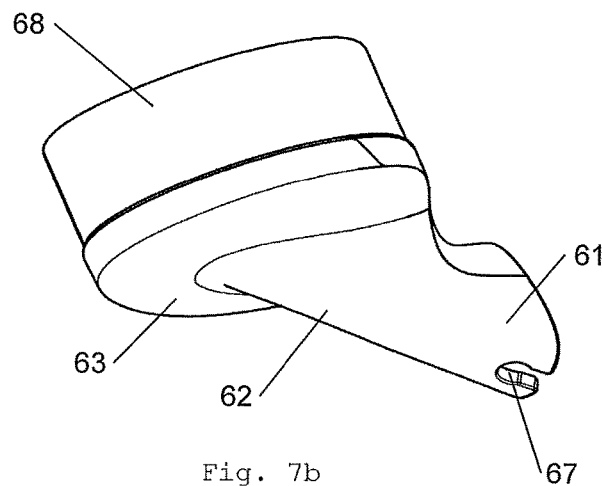
Figure 7C:
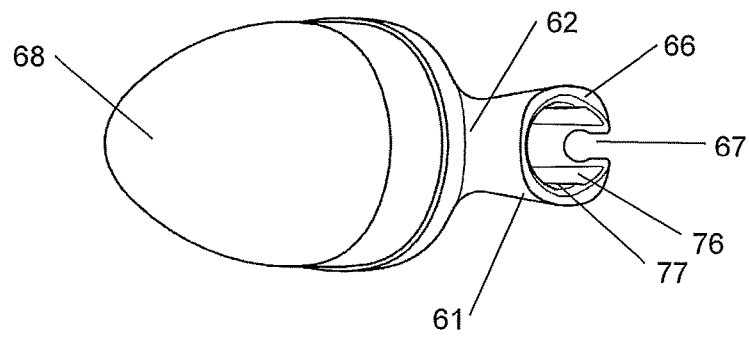
Figure 7D:
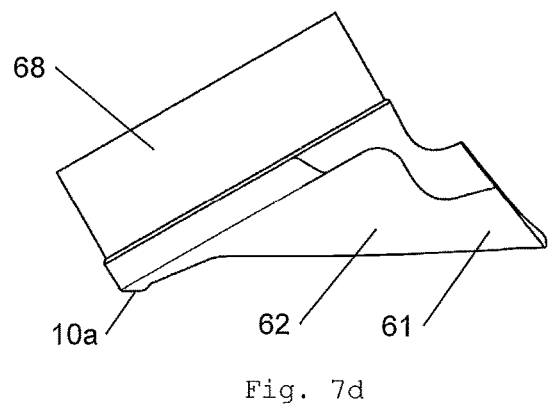
Figure 8A:
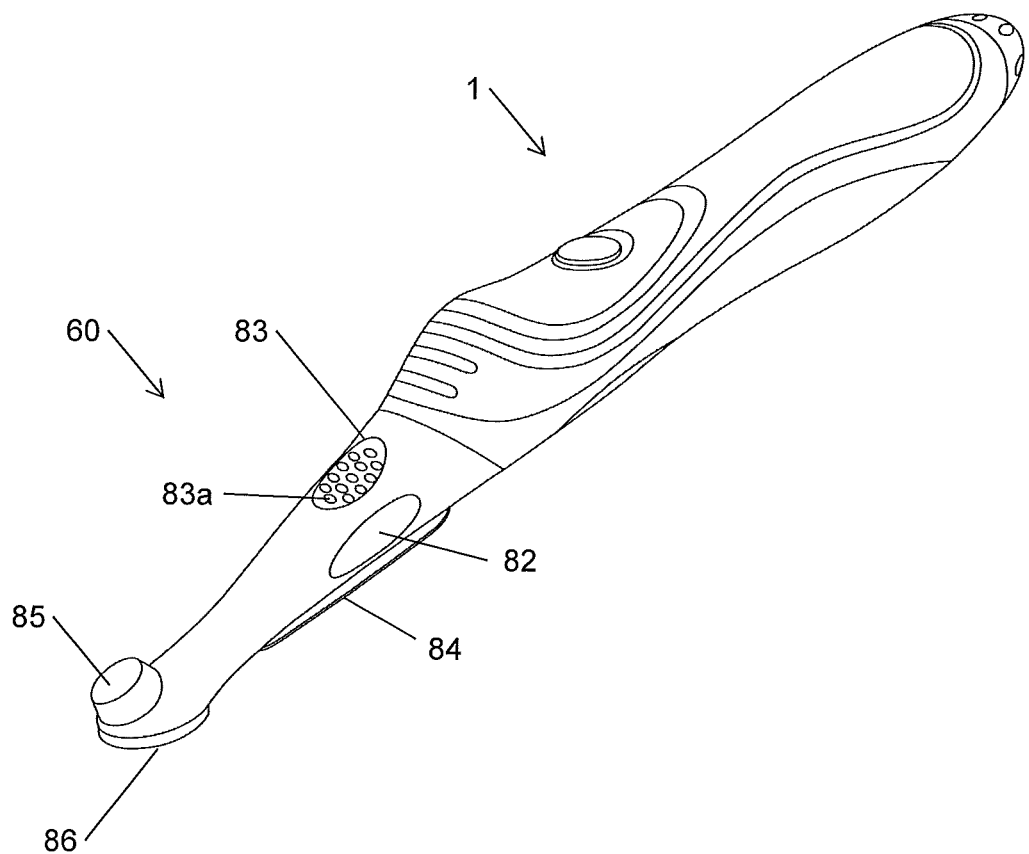
FIG. 8a shows a perspective view of a sixth embodiment of a plug-on part according to the invention.
Figure 8B:
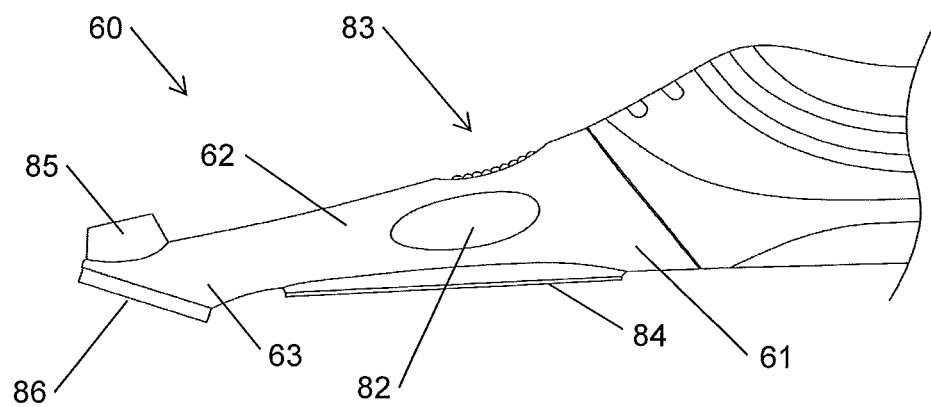
Figure 8C:
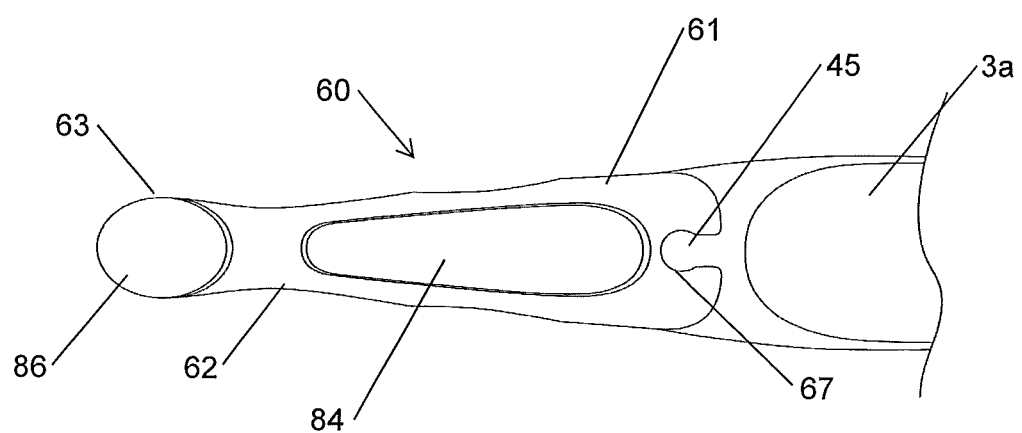
Figure 8D:
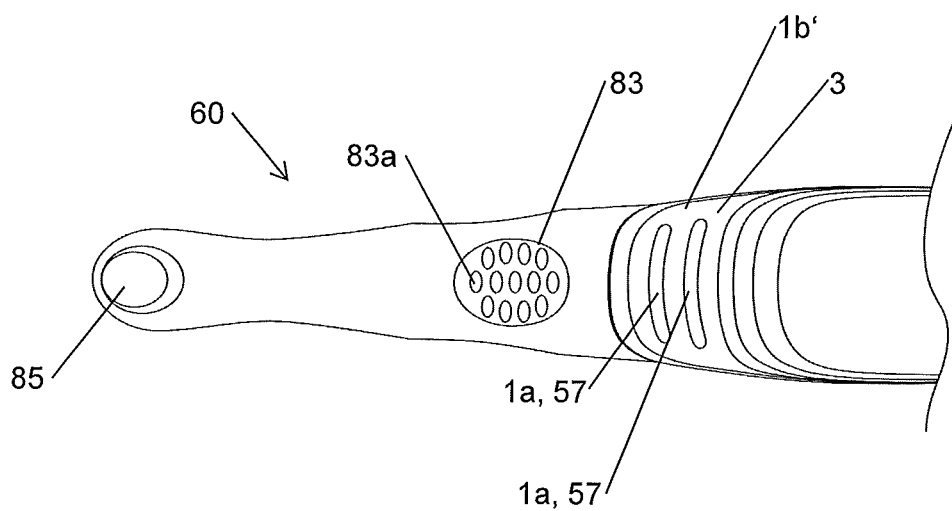

Moreover, the flat spot 10a on the plug-on part can be seen especially in FIGS. 7a and 7d. This flat spot 10a corresponds to the one or more flat spots 10 on the handle 1.

FIGS. 8a to 8d show a nail tool as a further embodiment of a plug-on part according to the invention.

The plug-on part 60 again has a base region 61, in which once again the recess 67 is formed for receiving the cam 45 of the handle. On the underside of the nail tool, a first attachment 84 is formed, which is preferably designed as a nail file. This extends substantially over the base region 61 and also the neck region 62 of the nail tool.

On the underside, at the free end of the nail tool, a treatment element 86 is arranged which can have the configurations cited above in the general description (for example grinding, polishing or varnishing means). The treatment element 86 is arranged on the underside of the head region 63. On the top of the head region 63, a second attachment 85 is arranged which, for example, can be configured as an exchangeable disk for lubricant gel, etc.

Since the appliance has to be guided with particular precision for this application as a nail tool, grip hollows 82, 83 are provided on the top and on the side walls of the plug-on part. In particular, a grip hollow 83 with knobs 83a is provided on the top. The lateral grip hollows 82 do not have a knob structure here and are shaped as depressions.

The grip hollows 82, 83 and also the knobs 83a can be formed from hard and/or soft component.

In this way, it is possible to significantly improve the gripping and guiding of the appliance. The webs 57 and the soft component of the front portion 3 can serve here as additional support for a guiding finger or guiding parts of the hand.

As regards the specific dimensions, materials and other configurations, reference is also made to the above general description concerning the face brush plug-on part.

Figure 9A:
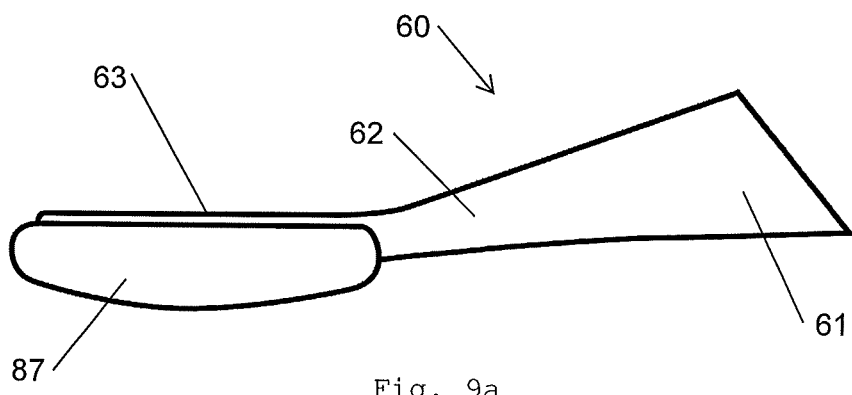
FIG. 9a shows a side view of a seventh embodiment of a plug-on part according to the invention.
Figure 9B:
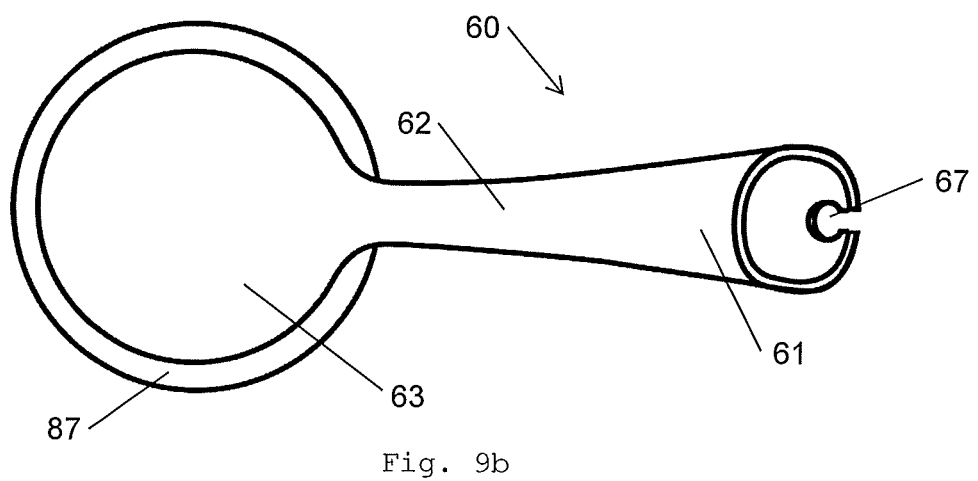
Figure 9C:
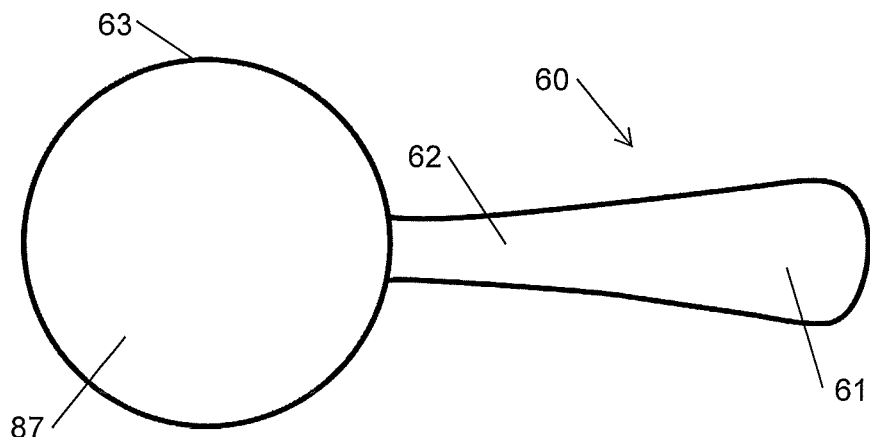

As a further embodiment of a plug-on part according to the invention, FIGS. 9a to 9c show a plug-on part with a sponge-like structure.

The plug-on part 60 again has a base region 61, in which once again the recess 67 for receiving the cam 45 of the handle is formed.

A treatment element 87 of sponge-like structure is arranged on the underside at the free end of the plug-on part 60. The treatment element 87 is arranged on the underside of the head region 63.

As regards the specific dimensions, materials and other configurations, reference is also made to the above general description.

Figure 10A:
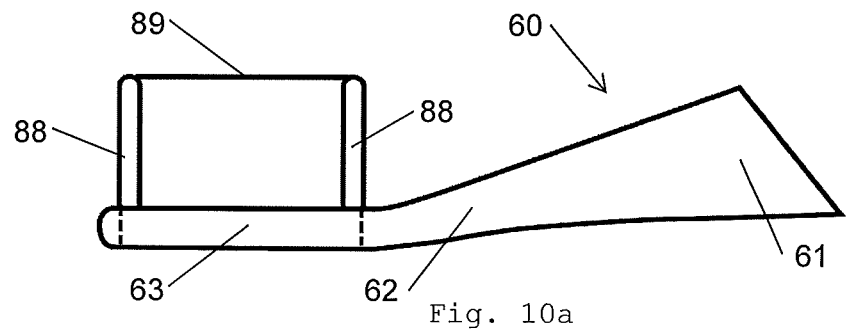
FIG. 10a shows a side view of an eighth embodiment of a plug-on part according to the invention.
Figure 10B:
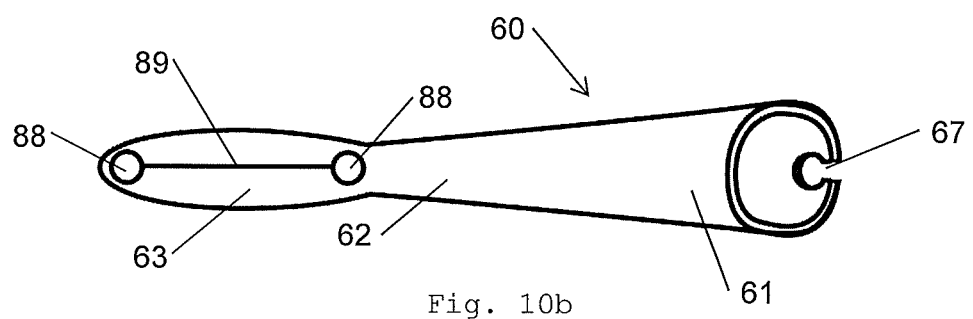

As a further embodiment of a plug-on part according to the invention, FIGS. 10a and 10b show a flosser plug-on part. The plug-on part 60 again has a base region 61, in which once again the recess 67 for receiving the cam 45 of the handle is formed. Two holding arms 88 are formed on the top face at the free end, and a piece of dental floss 89 is tensioned between them.

The holding arms 88 are arranged directly on the top face of the head region 63.

The described exchangeability of the functional element without changing the base body of the plug-on part is indicated by the two broken lines in the head region. In the base body a recess can be arranged into which the functional element, i.e. the actual flosser, is mounted exchangeably.

As regards the specific dimensions, materials and other configurations, reference is also made to the above general description.

Figure 11A:
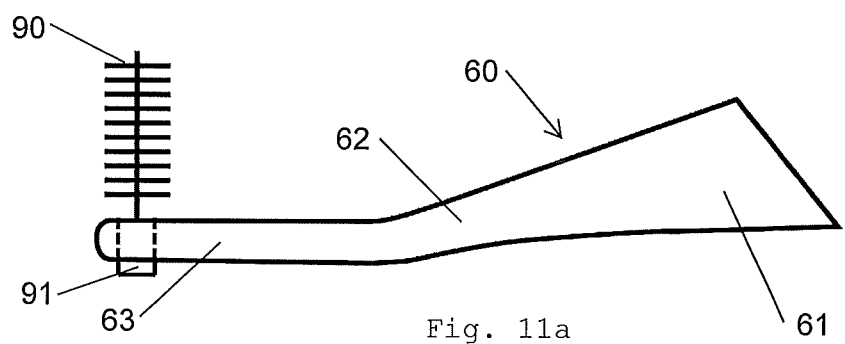
FIG. 11a shows a side view of an ninth embodiment of a plug-on part according to the invention.
Figure 11B:
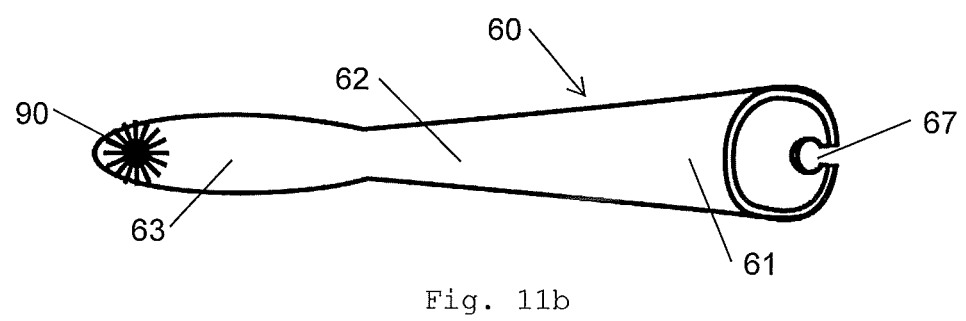

As a further embodiment of a plug-on part according to the invention, FIGS. 11a and 11b show an interdental plug-on part. The plug-on part 60 again has a base region 61, in which once again the recess 67 for receiving the cam 45 of the handle is formed.

The functional element is configured so as to provide exchangeability. The carrier element 91 of the interdental brush is rigidly connected to the interdental brush 90. The arrangement of the carrier element 91 of the interdental brush in the head region of the plug-on part 60 results in the functioning plug-on part.

The functional element is exchangeable as described above. The exchangeability of the functional element without changing the base body of the plug-on part is indicated by the two broken lines in the head region. In the base region a recess can be formed into which the functional element or the carrier element 91 of the interdental brush, which element is connected to the interdental brush 90, can be introduced. The exchange mechanism can be embodied in various known ways, for example by a screw connection or a bayonet catch.

As regards the specific dimensions, materials and other configurations, reference is also made to the above general description.

Figure 12A:
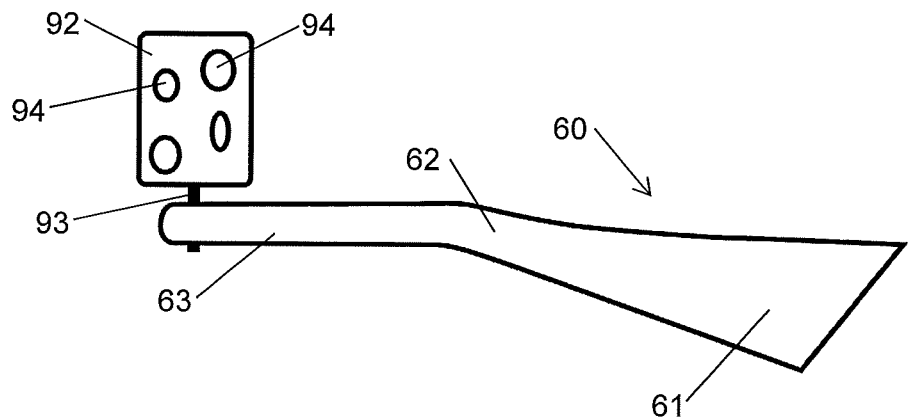
FIG. 12a shows a side view of an tenth embodiment of a plug-on part according to the invention.
Figure 12B:
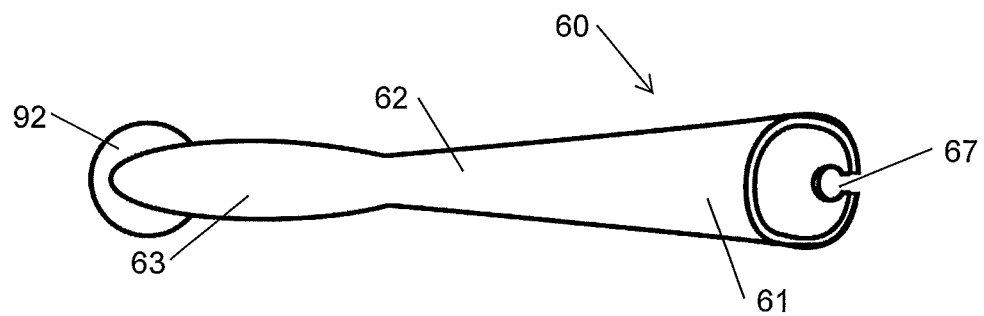
Figure 12C:
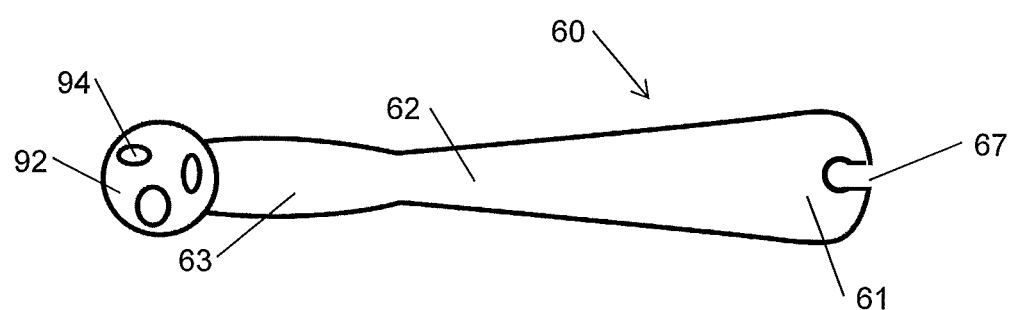

As a further embodiment of a plug-on part according to the invention, FIGS. 12a to 12c show a massage roller plug-on part. The plug-on part 60 again has a base region 61, in which once again the recess 67 for receiving the cam 45 of the handle is formed.

The massage roller plug-on part 60 has, in the head region 63, an actual massage roller, i.e. a cylinder 92 which is mounted on the rotation axle 93 of the massage roller. The rotation axle 93 of the massage roller is fixed in the head region of the plug-on part 60 and is not exchangeable. On the surface of the massage roller, wells 94 are formed which serve for massage purposes. The wells 94 are arranged on the cylinder and also on the free base surface.

Figure 13A:
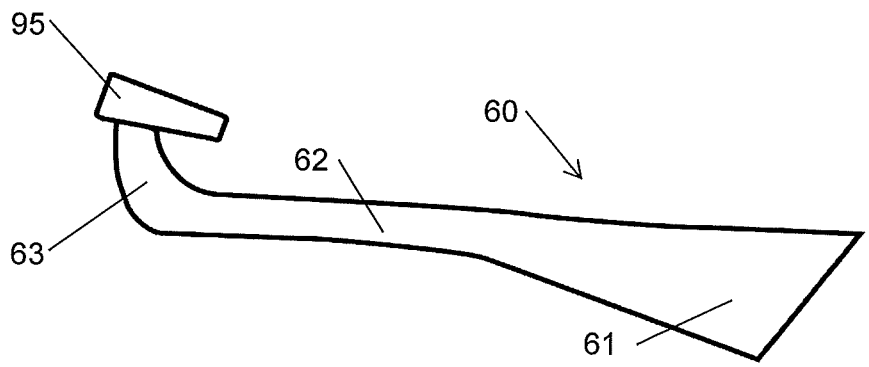
FIG. 13a shows a side view of an eleventh embodiment of a plug-on part according to the invention.
Figure 13B:
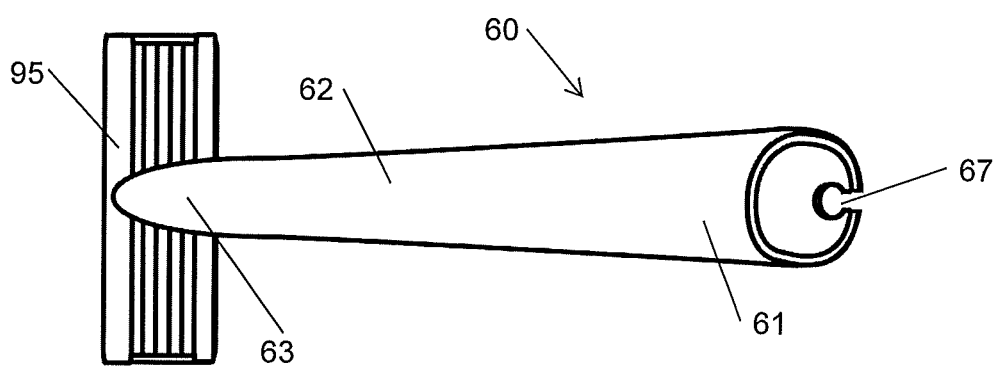
Figure 13C:
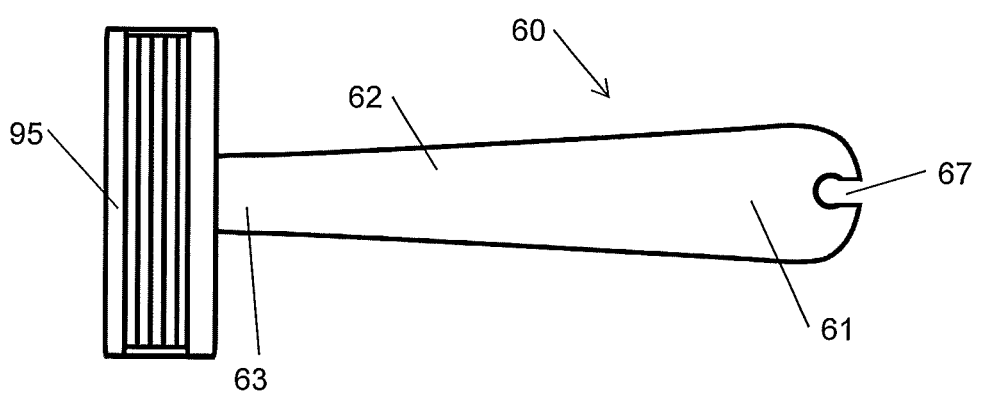

As a further embodiment of a plug-on part according to the invention, FIGS. 13a to 13c show a wet razor plug-on part. The plug-on part 60 again has a base region 61, in which once again the recess 67 for receiving the cam 45 of the handle is formed.

The blade 95 of the wet razor is arranged on the head part 63 and can be mounted so as to be exchangeable or fixed, as has already been described above.

Figure 14A:
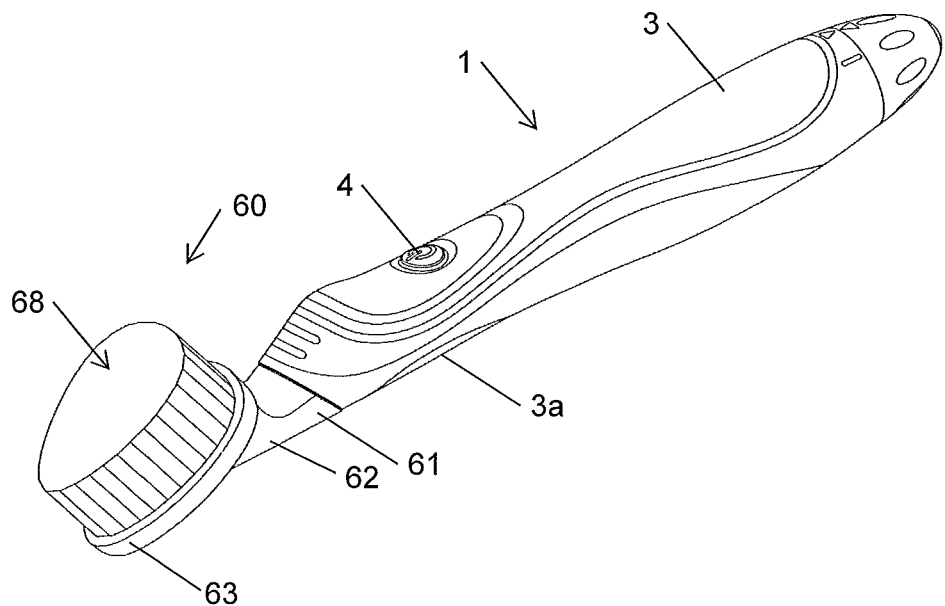
FIG. 14a shows a perspective view of the plug-on part from FIG. 7a on a handle.
Figure 14B:
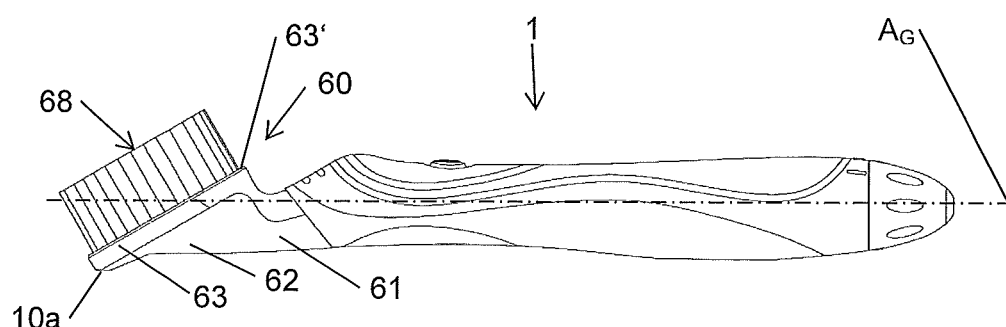
FIG. 14b shows a side view of the plug-on part from FIG. 7a on a handle.
Figure 14C:
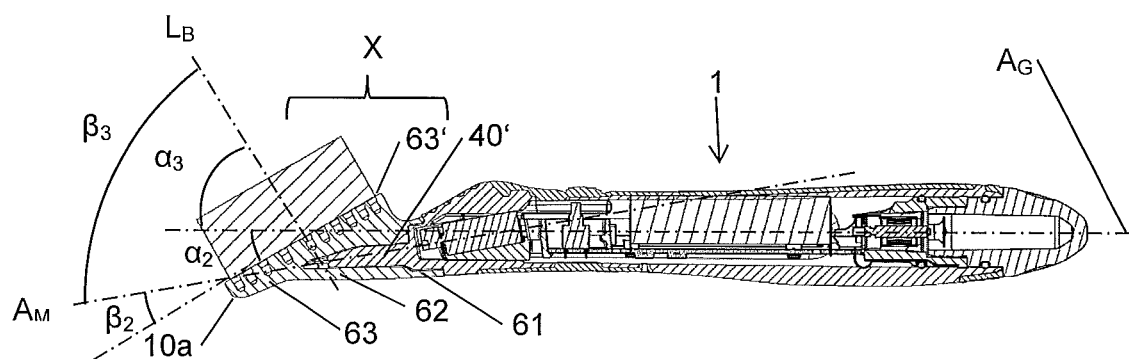
FIG. 14c shows a cross-sectional view of the plug-on part from FIG. 7a on a handle.

In FIGS. 14a to 14c, the embodiment of the plug-on part 60 in the form of a face brush from FIGS. 7a to 7d is shown mounted on a handle 1.

The considerably shortened neck region 62 has the effect that the head region 63 in practice lies above the interface X. The head region 63 has a base surface 63' (bristle exit surface).

It will also be noted that the bristle zone 68 of the face brush plug-on part 60 protrudes above the rear surface of the plug-on brush. It will likewise be noted that the (imaginary) continuation of the plug-like coupling structure 40 of the handle 1 intersects the bristle zone or the bristles.

It will be seen that the flat spot 10a, which corresponds to the flat spot on the rear face of the handle 1, is formed on the rear face of the plug-on part.

It will be seen that, in the fitted state, the bristle head is greater than the interface X and thus forms an element providing good handling when fitting and removing the face brush plug-on part 60 onto and from the handle 1.

The longitudinal axis $A_G$ of the handle 1 encloses the angle $\alpha_2$ with the base surface 63' and encloses the angle $\alpha_3$ with the longitudinal axis $L_B$ of the bristles. The rotation axis $A_M$ of the vibration motor 14 encloses the angle $\beta_2$ with the base surface 63' and encloses the angle $\beta_3$ with the longitudinal axis $L_B$ of the bristles.

Not all reference signs are shown in the drawing, since the drawing of the hand part 1 corresponds to FIG. 1f, and the reference signs for this same hand part 1 are identical.

FIGS. 15a to 15d show a further embodiment of a plug-on part 60 according to the invention for use as a face brush.

These figures show a plug-on part 60 with a recess 69 in the bristle zone, which recess 69 gives the head region a certain flexibility. A closed recess 69 is shown which reaches from the top of the plug-on part 60 to the underside of the plug-on part 60.

The outer part of the bristle zone 68 is arranged in a horseshoe shape around a tongue at the center. The connection 69' to the left and right of the central tongue is the only connection of the horseshoe-shaped part to the actual plug-on part. Flexibility is thereby achieved, and the outer ring can move flexibly.

Figure 15A:
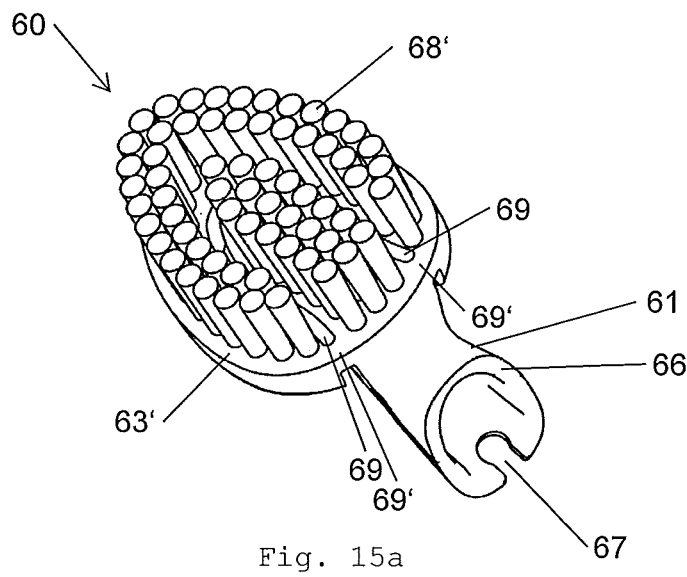
FIG. 15a shows a perspective view of a twelfth embodiment of a plug-on part according to the invention.
Figure 15B:
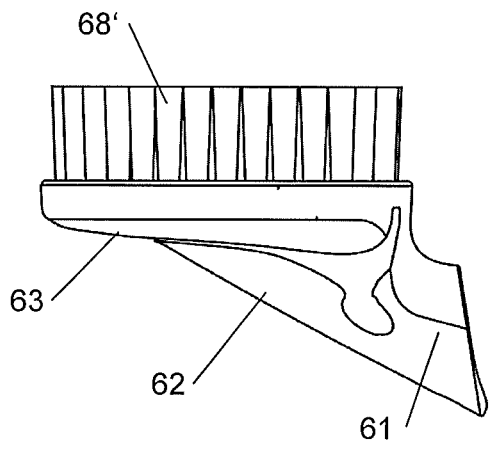
Figure 15C:
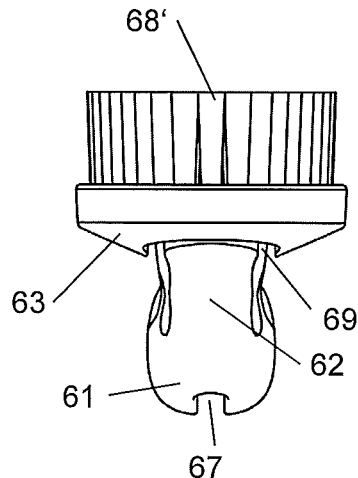
Figure 15D:
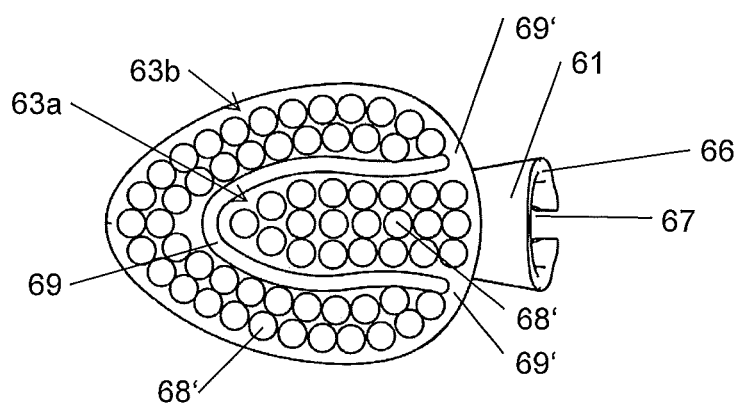
Figure 16A:
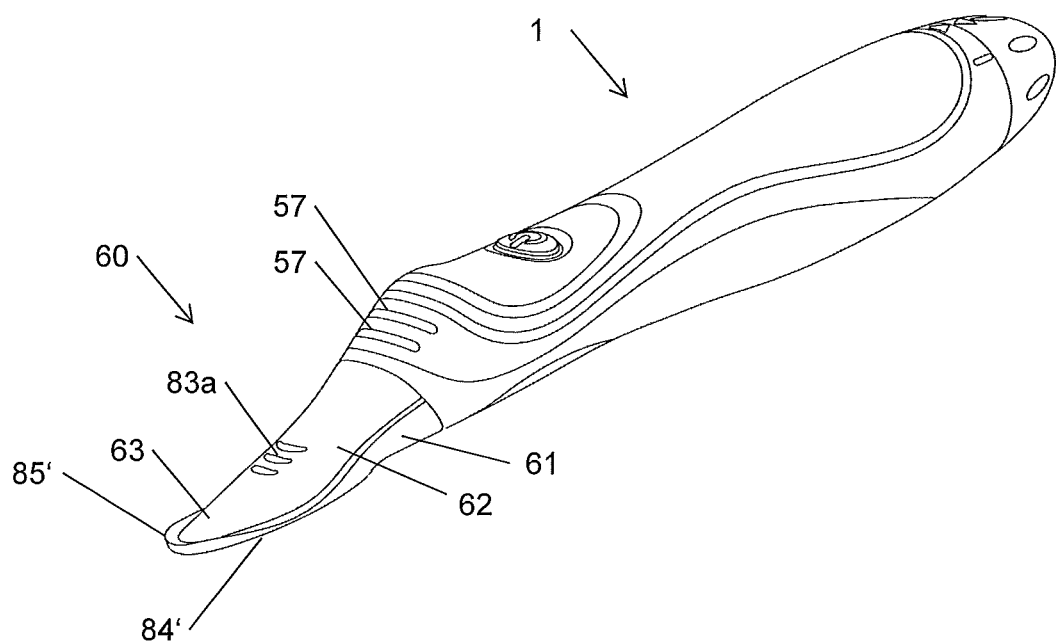
FIG. 16a shows a perspective view of a thirteenth embodiment of a plug-on part according to the invention on a handle.
Figure 16B:
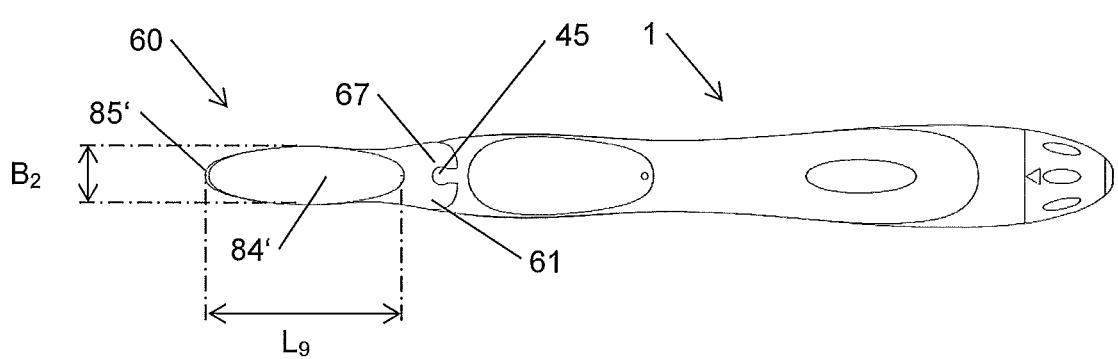
FIG. 16b shows a bottom view of the plug-on part according to the invention from FIG. 16a on a handle.
Figure 16C:
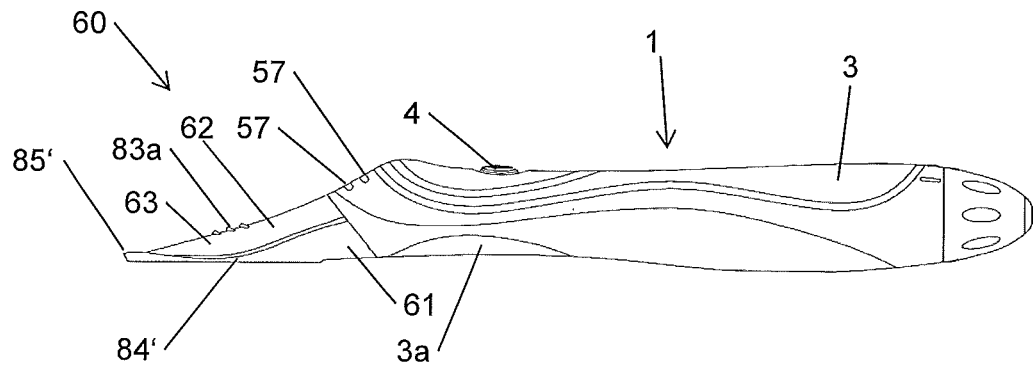
FIG. 16c shows a side view of the plug-on part according to the invention from FIG. 16a on a handle.
Figure 16D:
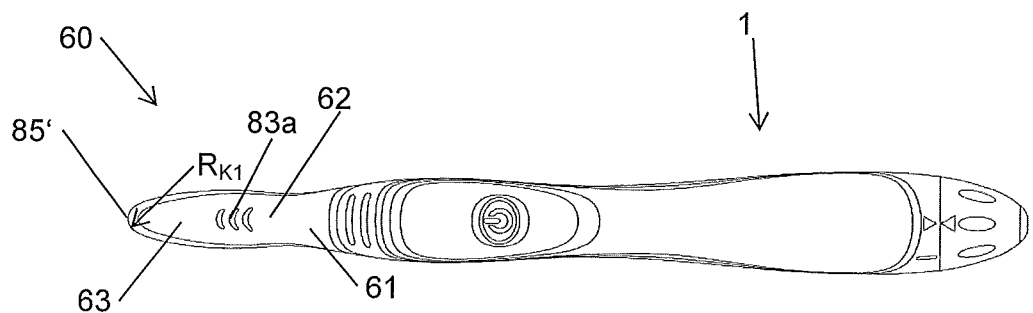
FIG. 16d shows a plan view of the plug-on part according to the invention from FIG. 16a on a handle.
Figure 16E:
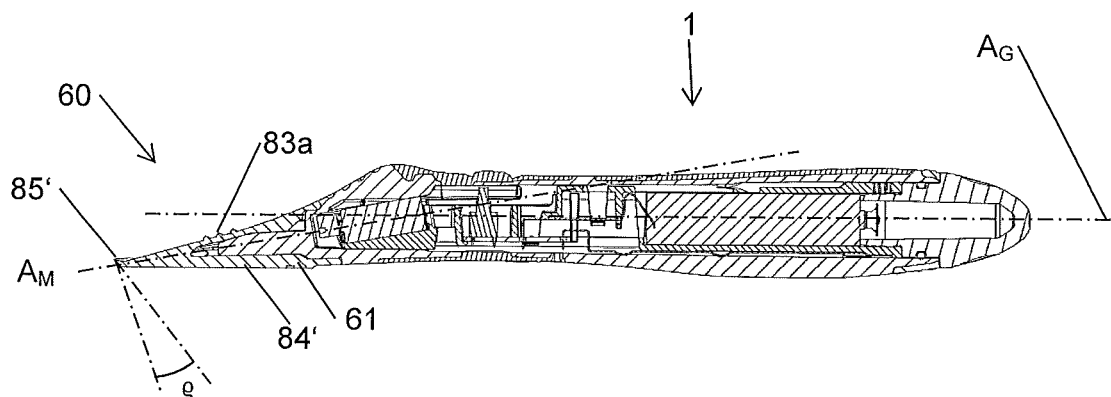
FIG. 16e shows a cross-sectional view of the plug-on part according to the invention from FIG. 16a on a handle.

It will be noted that the interface is only shown in stylized form in FIG. 15a.

Bristle tufts 68' are mounted on the static part or sub-region 63a and on the flexible part or sub-region 63b. In the variant shown, the ratio of bristle holes to bristle tufts is 21:44. The surface area of the static sub-region 63a in the variant shown measures about 550 mm$^2$ to 650 mm$^2$, and that of the flexible sub-region 63b measures between about 1100 mm$^2$ and 1300 mm$^2$.

FIGS. 16a to 16e show a further embodiment of a nail tool according to the invention.

The plug-on part 60 again has a base region 61, in which once again the recess 67 for receiving the cam 45 of the handle is formed.

On the underside of the nail tool, there is a first attachment with a work surface in the form of a grinding or polishing surface 84', which is preferably designed as a nail file, for example. The latter extends substantially over the neck region 62 and the head region 63 of the nail tool.

A treatment element 85' is arranged on the top face of the head region 63. This treatment element is designed as an edge or scraping edge for pushing back the cuticle. The edge is designed as a relatively sharp edge and an at least partially exposed edge in order to permit the treatment.

The edge defines (or the two surfaces leading/tapering to the edge define) an acute angle $\rho$.

The edge for the cuticle treatment is designed with a profile and extends from the abutment edge of the plug-on part about the front end and back to the abutment edge. The usable edge is mounted in the front region at the front end. The lateral elements are not usable.

Since the appliance has to be guided with particular precision for this application as a nail tool, structures 83a are mounted on the top and permit good positioning.

The structures 83a can be formed from hard and/or soft components and in the present case are shown, for example, as rib-like structures.

In this way, it is possible to significantly improve the gripping and guiding of the appliance. The webs 57 and the soft component of the front portion 3 can serve here as additional support for a guiding finger or guiding parts of the hand.

As regards the specific dimensions (angle $\rho$, width $B_2$ and length $L_9$), materials and other configurations, reference is also made to the above general description.

To make it easier to fit the plug-on part onto the handheld appliance and to remove it, the support body, i.e. the base body of the plug-on part, is narrowed in the neck region 62. The plug-on axis of the nail care plug-on part 60 is substantially parallel to the longitudinal axis $A_G$ of the handle, i.e. it can also have a slight inclination with respect to the longitudinal axis $A_G$ of the handle or can coincide with said axis.

Figure 17A:
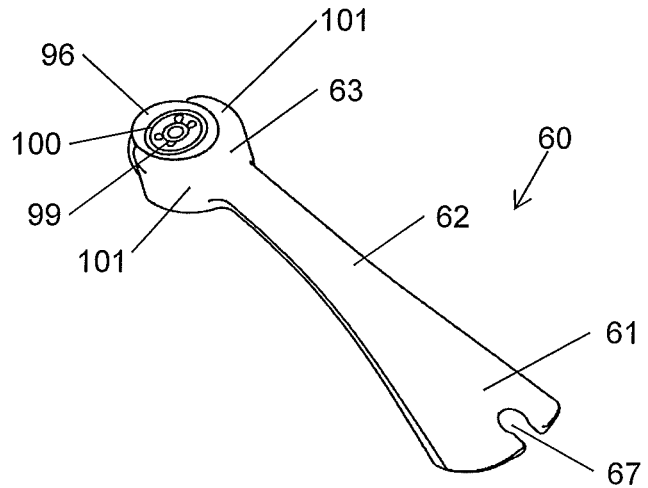
FIG. 17a shows a perspective view of a fourteenth embodiment of a plug-on part according to the invention.
Figure 17B:
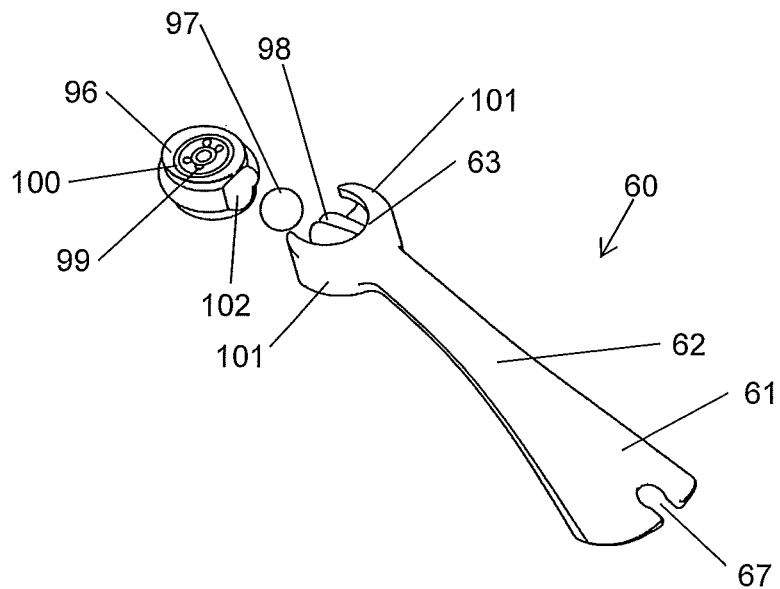
Figure 17C:
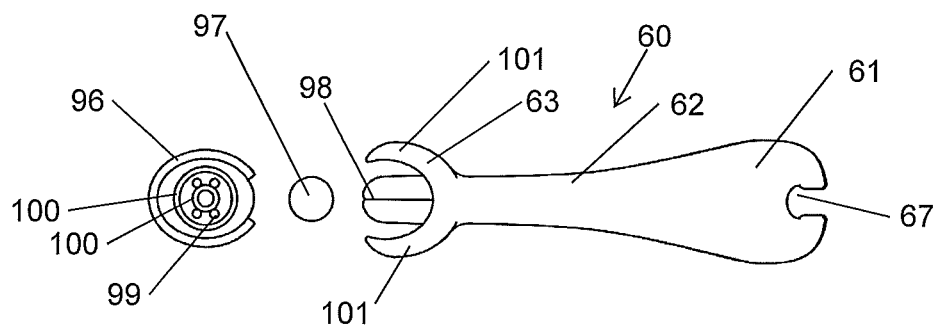
Figure 19A:
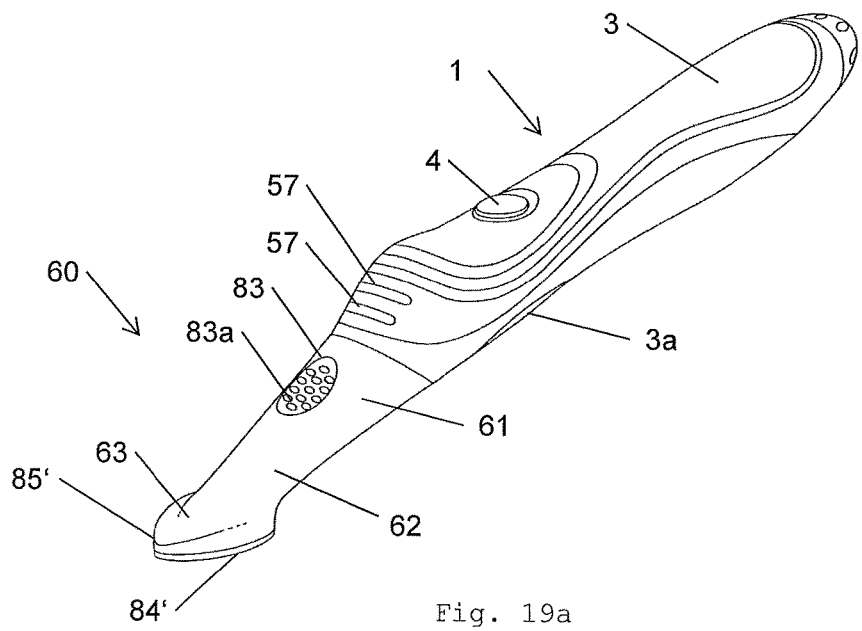
FIG. 19a shows a perspective view of a sixteenth embodiment of a plug-on part according to the invention.
Figure 19B:
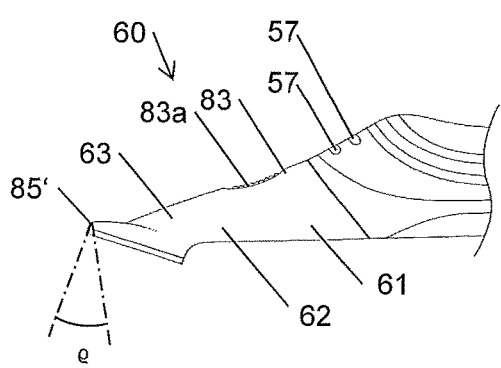
Figure 19C:
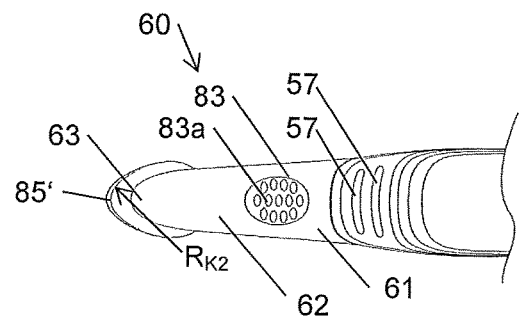
Figure 19D:
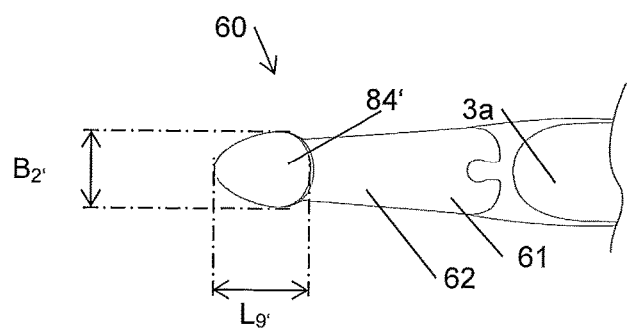

FIGS. 17*a* to 17*c* show a possible embodiment of a serum applicator plug-on part.

The plug-on part 60 again has a base region 61, in which once again the recess 67 for receiving the cam 45 of the handle is formed.

In the head region 63, a structure with two holding arms 101 is formed, with which it is possible to support an exchange part 96.

The exchange part 96 is for this purpose placed/clamped between the two holding arms 101. The holding arms 101 are designed such that they as it were form a matching geometry to the outer geometry of the exchange part 96 and are thus able to optimally hold said part. The holding arms 101 are moreover equipped with a degree of flexibility to permit the insertion and extraction of the exchange part 96.

A ball 97 with a liquid or viscous medium is introduced into the exchange part 96. By fitting the exchange part on the actual plug-on part 60, the ball 97 is squashed and the medium escapes. For this purpose, recesses through which the medium can escape are formed in the exchange part 96.

The exchange part 96 can be designed such that the carrier 97 of the medium, e.g. the ball, is already mounted directly in the part, or such that the user fits it himself. In the first case, exchange parts 96 are always required and purchased, whereas in the second case only the media 97 can be exchanged or replaced.

In addition to the recesses 99 for escape of fluid, the exchange part 96 preferably also has structures 100 which improve or assist the distribution of the fluid.

The actual plug-on part 60 has a spike 98, which interacts with the recess 102 of the exchange part 96. When the exchange part 96 is fitted in place, this spike 98 is introduced into the exchange part 96. When they are brought together, the ball 97 with the medium is squashed in the recess 102, and the medium flows through the recesses 99.

The recess 102 of the exchange part 96 is larger than the spike 98, but the difference in size is chosen only such that the carrier 97 of the medium can still be squashed.

FIGS. 18*a* to 18*d* show a nail care plug-on part 60 in the form of a nail brush. A brush is formed in the frontmost region of the plug-on part.

The brush can be used to polish the varnished nails or else to polish the untreated nails (polishing brush), and to clean the nails of dirt or grease, in particular under the nail margins (cleaning brush).

The brush consists of a bristle zone, which consists of injected or conventionally punched bristles. In addition, further elements as encapsulation bodies for example can be formed from hard and/or soft components.

The neck and head region is differently configured depending on the size of the brush.

The plug-on part 60 again has a base region 61, in which once again the recess 67 for receiving the cam 45 of the handle is formed.

A bristle zone 68 is formed in the head region 63, on the underside of the plug-on part 60.

To permit precise guiding, a grip hollow 83 with knobs 83*a* is provided on the top of the plug-on part 60. The grip hollow 83 and also the knobs 83*a* can be formed from hard and/or soft components.

FIGS. 19*a* to 19*d* show a further embodiment of a nail tool according to the invention.

The plug-on part 60 again has a base region 61, in which once again the recess 67 for receiving the cam 45 of the handle is formed.

On the underside of the nail tool, there is a first attachment with a work surface in the form of a grinding or polishing surface 84', which is preferably designed as a nail file, for example. The latter extends substantially over the head region 63 of the nail tool.

A treatment element 85' is arranged on the top face of the head region 63. This treatment element is designed as an edge or scraping edge for pushing back the cuticle. The edge is designed as a relatively sharp edge and an at least partially exposed edge in order to permit the treatment.

The edge and the two surfaces leading to the edge enclose an acute angle ρ.

The edge 85' for the cuticle treatment is designed with a profile and extends about the front end of the plug-on part 60. The usable edge is mounted in the front region at the front end.

Since the appliance has to be guided with particular precision for this application as a nail tool, structures 83*a* are mounted on the top in a grip hollow 83 and permit good positioning.

The structures 83*a* can be formed from hard and/or soft components and in the present case are shown, for example, as nipple-like structures.

In this way, it is possible to significantly improve the gripping and guiding of the appliance. The webs 57 and the soft component of the front portion 3 can serve here as additional support for a guiding finger or guiding parts of the hand.

As regards the specific dimensions, materials and other configurations, reference is also made to the above general description. Generally speaking, in this embodiment of the nail care plug-on part 60, the head region 63 is slightly shorter (length $L_{9'}$), wider (width $B_{2'}$) and, particularly in the region of the edge 85', slightly less curved (i.e. greater radius of curvature) than in FIG. 16 for example.

The radius of curvature $R_{K1}$ in FIG. 16 at the front end measures between 2 mm and 4 mm, preferably between 2.5 mm and 3.5 mm, whereas the radius of curvature $R_{K2}$ in FIG. 19 at the front end measures between 3 mm and 5 mm, preferably between 3.5 mm and 4.5 mm.

To make it easier to fit the plug-on part onto the handheld appliance and to remove it, the support body, i.e. the base body of the plug-on part, is less wide in the neck region 62 than the first attachment 84.

LIST OF REFERENCE SIGNS

1 handle (=hand part and closure cap)
1*a* hard component
1*b* soft component
1*b'* further soft component
1*c* hand part (=hand body and interior)
1*d* hand body (=base body and encapsulation body)
2 switch portion (made of soft component 1*b'*)
3 front portion (made of soft component 1*b'*)
3*a* rear portion (made of soft component 1*b'*)
4 on/off switch symbol
5 base body (made of hard component)

6 first marking (triangular, on hand part, opposite 37 in the closed state)
7 second marking (dash-like, on hand part, opposite 37 in the unclosed state)
8 vent hole
9 ve membrane
10 flat spot
10a flat spot on the plug-on part
11 narrowed waist
12 carrier element
12a bevel of the carrier element
14 electric motor/vibration motor
15 eccentric element
17 carrier element—contact plate
18 motor compartment
18a cable feed-through
19 switch compartment
20 contact plate compartment (battery version) for the battery contact plate
21 battery compartment
21a accumulator compartment
22 socket compartment
23 terminal compartment
24 switch
25 printed circuit board
26 latching lugs
27 front motor stop
28 rear motor stop
29 seal (on the carrier element of the accumulator version)
30 socket
30a socket terminals (for the printed circuit board)
31 contact element of the socket
31b front stop of the socket
32 battery contact plate
33 contact tongue of the battery contact plate 32
34 sealing ring of the closure cap
35 closure cap
35a cap cavity (of the closure cap 35)
35b contact plate of the closure cap 35
35c spring plate element (of the closure cap 35)
36 notches
37 marking (triangular, opposite 6 in the closed state)
38 marking (triangular, on rear face/bottom)
39 battery
39a battery pole (cap side)
40 plug-like coupling structure of the handle
41 first stage (of the coupling structure of the hand part—at the free end)
42 second stage (of the coupling structure of the hand part—in the middle)
43 third stage (of the coupling structure of the hand part—bearing on stop surface)
44 stop surface of the hand part
45 cam
45a trunk
45b crown
46 base region of the plug-like coupling structure
47 upper sub-element (of the first stage 41 of the hand part)
48 lower sub-element (of the first stage 41 of the hand part)
49 groove between the upper and lower sub-elements 47, 48 of the first stage 41 of the hand part
50 angular groove (on the top of the plug-like coupling structure 40)
51 round groove (on the underside of the plug-like coupling structure 40)
52 transition region from the first to the second stage 42 of the plug-like coupling structure 40
53 circumferential recesses (of the second stage 42 of the plug-like coupling structure 40)
54 circumferential projections (of the second stage 42 of the plug-like coupling structure 40)
55 circumferential recesses (of the third stage 43 of the plug-like coupling structure 40)
56 circumferential projections (of the third stage 43 of the plug-like coupling structure 40)
57 webs
58 accumulator
60 plug-on part
61 base region of the plug-on part
62 neck region of the plug-on part
63 head region of the plug-on part
63' base surface (exit surface of bristles)
63a static sub-region
63b flexible sub-region
64 cleaning elements of the plug-on part (bristles or bristle tufts and/or soft elastic cleaning and massaging elements)
64' bristle tufts of the plug-on part
64" bristle tufts of the plug-on part
64''' bristle tufts of the plug-on part
65 carrier lamina (AFT) of the plug-on part
66 stop surface of the plug-on part
67 recess on the plug-on part
68 bristle zone
68' bristle tufts
69 recess
69' connection
70 socket-like coupling structure of the plug-on part
71 first stage of the coupling structure of the plug-on part (at the free end—corresponding to the third stage of the coupling structure of the hand part)
72 second stage of the coupling structure of the plug-on part (in the middle—corresponding to the second stage of the coupling structure of the hand part)
73 third stage of the coupling structure of the plug-on part (innermost—corresponding to the first stage of the coupling structure of the hand part)
74 angular ridge (on top/front of the plug-on part)
75 round ridge (on bottom/rear of the plug-on part)
76 circumferential recesses (of the first stage 71 of the socket-like coupling structure 70)
77 circumferential projections (of the first stage 71 of the socket-like coupling structure 70)
78 circumferential recesses (of the second stage 72 of the socket-like coupling structure 70)
79 circumferential projections (of the second stage 72 of the socket-like coupling structure 70)
80 ribs (of the third stage 73 of the socket-like coupling structure 70)
81 eight-shaped opening (of the third stage 73 of the socket-like coupling structure 70)
82 lateral grip hollows
83 grip hollow (top)
83a knobs of the grip hollow
84 first attachment (bottom)
84' work surface/grinding or polishing surface
85 second attachment (top)
85' treatment element/scraping edge (top)
86 treatment element (bottom)
87 treatment element (in sponge-like structure)
88 holding arms
89 dental floss 90 interdental brush
91 carrier element of the interdental brush
92 massage roller (cylinder)
93 rotation axis of the massage roller
94 wells of the massage roller
95 blade of the wet razor
96 exchange part
97 carrier of the medium
98 spike
99 recesses for the fluid outlet
100 structures
101 holding arm
102 recess
$A_G$ longitudinal axis of the handle
$A_K$ longitudinal axis of the plug-like coupling structure
$A_M$ rotation axis of the electric motor
$A_A$ longitudinal axis of the plug-on part (longitudinal axis of the socket-like coupling structure)
$A_B$ longitudinal axis of the head region of the plug-on part
$B_1$ width of the handle (max)
$B_2$ width of the work surface
$B_{2'}$ width of the work surface
$D_V$ diameter of the closure cap (max)
$H_1$ height of the handle (max)
$L_1$ length of the first stage
$L_2$ length of the second stage
$L_3$ length of the third stage (on the top)
$L_{3'}$ length of the third stage (on the underside)
$L_4$ total length of handle (hand part with closure cap)
$L_5$ total length of hand part (handle without closure cap)
$L_6$ length from stop edge to grip end without closure cap (front face or top)
$L_7$ length from stop edge to grip end without closure cap (rear face or underside)
$L_8$ length of closure cap
$L_9$ length of work surface
$L_{9'}$ length of work surface
$L_B$ length of bristles
R direction of insertion of carrier element
$R_{K1}$ radius of curvature
$R_{K2}$ radius of curvature
X interface
α angle of stop surface/$A_G$
$α_2$ angle of $A_G$/base surface
$α_3$ angle of $L_B$/$A_G$
β angle of $A_M$/$A_G$
$β_2$ angle of $A_M$/base surface
$β_3$ angle of $L_B$/$A_M$
φ angle of stop surface/$A_M$
Δ angle of plug-on part
ρ angle of edge or scraping edge

What is claimed is:

1. A toothbrush comprising a handle with a longitudinal axis, and a plug-on part which can be attached to the handle, wherein the handle comprises a hand body with a base body and the plug-on part comprises a base body, wherein a plug-shaped coupling structure protrudes from the handle, which plug-shaped coupling structure forms an interface with a substantially mirror-inverted socket-shaped coupling structure of the plug-on part, wherein the interface has at least two stages with different circumferential geometry wherein at least one of the stages comprises a rotation-preventing means between the handle and the plug-on part, and wherein a stop surface of the handle for the plug-on part extends obliquely with respect to the longitudinal axis of the handle, wherein the at least two stages are not concentrically arranged.

2. The toothbrush as claimed in claim 1, wherein one or more of the at least two stages has a substantially cylindrical shape with non-concentric axes.

3. The toothbrush as claimed in claim 1, wherein the at least two stages are not concentrically arranged as regards their diameter.

4. The toothbrush as claimed in claim 1, wherein a first stage of the at least two stages comprises two substantially round or circular sub-elements with different diameters.

5. The toothbrush as claimed in claim 4, wherein an upper sub-element has a greater diameter than a lower sub-element.

6. The toothbrush as claimed in claim 1, wherein a midpoint of a succeeding stage lies higher than a midpoint of a preceding stage seen from a free end of the plug-shaped coupling structure.

7. The toothbrush as claimed in claim 1, wherein at the front end or free end of the second stage, the cross section begins with a chamfer.

8. The toothbrush as claimed in claim 1, wherein the modulus of elasticity of the plug-shaped coupling structure is higher than the modulus of elasticity of the base body of the plug-on part.

9. The toothbrush as claimed in claim 1, wherein the modulus of elasticity of the plug-shaped coupling structure is higher than the modulus of elasticity of the socket-shaped coupling structure.

10. The toothbrush as claimed in claim 1, wherein the handle and/or the plug-on part comprise a soft component with a Shore A hardness value below 90.

11. The toothbrush as claimed in claim 10, wherein the soft component is a TPE-S.

12. The toothbrush as claimed in claim 10, wherein the soft component forms a material bond with the hard component by means of overmolding in a two-component or multi-component injection molding method.

13. The toothbrush as claimed in claim 1, wherein the plug-shaped coupling structure is formed from polypropylene, polyoxymethylene, polyethylene or polyethylene terephthalate.

14. The toothbrush as claimed in claim 1, wherein the base body of the hand body is formed from a hard component and the base body of the plug-on part is formed from a hard component, wherein the modulus of elasticity of the hard component of the base body of the hand body is between 1300 MPa and 2500 MPa, and the modulus of elasticity of the hard component of the base body of the plug-on part (is between 700 MPa and 1500 MPa.

15. A handle for a toothbrush as claimed in claim 1, to which a plug-on part can be attached, comprising a hand body with a base body, wherein a plug-shaped coupling structure protrudes from the handle, which plug-shaped coupling structure is configured to form an interface with a substantially mirror-inverted socket-shaped coupling structure of the plug-on part, wherein the plug-shaped coupling structure has at least two stages with different circumferential geometry, wherein at least one of the stages comprises a rotation-preventing means between the handle and the plug-on part, and wherein a stop surface of the handle for the plug-on part extends obliquely with respect to the longitudinal axis of the handle, wherein the at least two stages are not concentrically arranged.

16. The handle as claimed in claim 15, wherein one or more of the at least two stages has a substantially cylindrical shape with non-concentric axes.

17. The handle as claimed in claim 15, wherein a midpoint of a succeeding stage lies higher than a midpoint of a preceding stage seen from a free end of the plug-shaped coupling structure.

18. The handle as claimed in claim 15, wherein the handle comprises a thermoplastics selected from: acrylonitrile butadiene styrene, polystyrene, styrene acrylonitrile, polybutylene terephthalate, polyethylene terephthalate.

19. The handle as claimed in claim 15, wherein a cam is not arranged at a first stage of the at least two stages, seen from a free end of the plug-shaped coupling structure.

20. The handle as claimed in claim 15, wherein the stop surface and the longitudinal axis of the handle enclose an angle a of between 30° and 70°.

21. The handle as claimed in claim 15, wherein the longitudinal axis of the plug-shaped coupling structure is offset parallel to the longitudinal axis of the handle.

22. The handle as claimed in claim 15, wherein the longitudinal axis of the plug-shaped coupling structure is collinear to the longitudinal axis of the handle.

23. A toothbrush comprising a handle with a longitudinal axis, and a plug-on part which can be attached to the handle, wherein the handle comprises a hand body with a base body and the plug-on part comprises a base body, wherein a plug-shaped coupling structure protrudes from the handle and forms an interface with a substantially mirror-inverted socket-shaped coupling structure of the plug-on part, wherein the interface has at least two stages with different circumferential geometry, wherein a stop surface between the handle and the plug-on part extends obliquely with respect to the longitudinal axis of the handle, and wherein the handle has a cam which cooperates with a mirror-inverted recess of the plug-on part in the manner of a snap-fit connection, wherein the cam is not arranged at a first stage of the at least two stages, seen from a free end of the plug-shaped coupling structure.

24. The toothbrush as claimed in claim 23, wherein a material from which the cam is formed is harder than a material from which the recess is formed.

25. The toothbrush as claimed in claim 23, wherein the height of the cam is from 1 mm to 3 mm.

26. The toothbrush as claimed in claim 23, wherein the recess of the plug-on part has tolerances, with respect to the cam, of 0 to 0.4 mm.

27. The toothbrush as claimed in claim 23, wherein a pull-off weight of the snap-fit connection is between 2 kg and 6 kg.

28. The toothbrush as claimed in claim 27, wherein pull-off weight of the snap-fit connection is between 2 kg and 4 kg.

29. The toothbrush as claimed in claim 23, wherein the length of the plug-shaped coupling structure, measured from the free end to the starting point of the cam, is 20 mm to 40 mm.

30. The toothbrush as claimed in claim 23, wherein the plug-on part can be plugged onto the plug-shaped coupling structure only in one position.

31. The toothbrush as claimed in claim 23, wherein the handle or the hand body is formed from a hard component, and the plug-on part is formed from a hard component.

32. The toothbrush as claimed in claim 23, wherein the cam is tree-shaped.

33. A toothbrush comprising a handle with a longitudinal axis, and a plug-on part which can be attached to the handle, wherein the handle comprises a hand body with a base body and the plug-on part comprises a base body, wherein a plug-shaped coupling structure protrudes from the handle, which plug-shaped coupling structure forms an interface with a substantially mirror-inverted socket-shaped coupling structure of the plug-on part, wherein the interface has at least two stages with different circumferential geometry, wherein at least one of the stages comprises a rotation-preventing means between the handle and the plug-on part, and wherein a stop surface of the handle for the plug-on part extends obliquely with respect to the longitudinal axis of the handle, wherein the stop surface and the longitudinal axis of the handle enclose an angle a of between 30° and 70°.

34. The toothbrush as claimed in claim 33, wherein the dimension from the stop surface to the rear end of the handle is greater on a front face than on a rear face, such that the stop surface extends from a front rearward.

35. The toothbrush as claimed in claim 33, wherein the plug-shaped coupling structure of the handle and the mirror-inverted socket-shaped coupling structure of the plug-on part allow straight plugging-on.

36. The toothbrush as claimed in claim 33, wherein the longitudinal axis of the plug-shaped coupling structure is offset parallel to the longitudinal axis of the handle.

37. The toothbrush as claimed in claim 33, wherein the longitudinal axis of the plug-shaped coupling structure is collinear to the longitudinal axis AG of the handle.

38. The toothbrush as claimed in claim 33, wherein a longitudinal axis of the plug-on part designates the longitudinal axis of the socket-shaped coupling structure, the longitudinal axis of the plug-on part lying in a base region of the plug-on part, wherein a longitudinal axis of a head region of the plug-on part lies accordingly in the head region of the plug-on part and wherein an angle Δ lying between the longitudinal axis of the plug-on part and the longitudinal axis of the head region of the plug-on part is between 10° and 30°.

* * * * *